(12) United States Patent
Watanabe et al.

(10) Patent No.: US 12,195,654 B2
(45) Date of Patent: Jan. 14, 2025

(54) LUMINESCENT PARTICLE AND COMPOUND

(71) Applicant: FUJIFILM Corporation, Tokyo (JP)

(72) Inventors: Kousuke Watanabe, Kanagawa (JP);
Naoyuki Hanaki, Kanagawa (JP);
Kouitsu Sasaki, Kanagawa (JP);
Tomoaki Yoshioka, Kanagawa (JP);
Kazuhei Kaneko, Kanagawa (JP);
Yoshinori Kanazawa, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 757 days.

(21) Appl. No.: 17/407,146

(22) Filed: Aug. 19, 2021

(65) Prior Publication Data
US 2021/0380881 A1 Dec. 9, 2021

Related U.S. Application Data

(60) Division of application No. 16/282,327, filed on Feb. 22, 2019, now Pat. No. 11,136,500, which is a continuation of application No. PCT/JP2017/030054, filed on Aug. 23, 2017.

(30) Foreign Application Priority Data

Aug. 23, 2016 (JP) ................. 2016-162613
Mar. 10, 2017 (JP) ................. 2017-046742
Jul. 26, 2017 (JP) ................. 2017-144722

(51) Int. Cl.
| | | |
|---|---|---|
| C09K 11/66 | (2006.01) | |
| C07F 5/02 | (2006.01) | |
| C09B 23/00 | (2006.01) | |
| C09K 11/02 | (2006.01) | |
| C09K 11/06 | (2006.01) | |
| C09K 11/08 | (2006.01) | |

(52) U.S. Cl.
CPC ............. *C09K 11/665* (2013.01); *C07F 5/02* (2013.01); *C07F 5/022* (2013.01); *C09B 23/00* (2013.01); *C09K 11/02* (2013.01); *C09K 11/06* (2013.01); *C09K 11/0827* (2013.01); *C09K 2211/1044* (2013.01); *C09K 2211/188* (2013.01)

(58) Field of Classification Search
CPC ....... C09K 11/665; C09K 11/02; C09K 11/06; C09K 11/0827; C09K 2211/1044; C09K 2211/188; C07F 5/02; C07F 5/022; C09B 23/00
USPC ......................................................... 548/405
See application file for complete search history.

(56) References Cited

U.S. PATENT DOCUMENTS

| | | | |
|---|---|---|---|
| 4,680,274 A | 7/1987 | Sakai et al. | |
| 5,326,692 A | 7/1994 | Brinkley et al. | |
| 5,433,896 A | 7/1995 | Kang et al. | |
| 5,573,909 A | 11/1996 | Singer et al. | |
| 5,670,381 A | 9/1997 | Jou et al. | |
| 5,723,218 A | 3/1998 | Haugland et al. | |
| 5,948,593 A | 9/1999 | Misawa et al. | |
| 6,005,113 A | 12/1999 | Wu et al. | |
| 7,662,555 B2 | 2/2010 | Isobe | |
| 10,816,469 B2 | 10/2020 | Kasagi et al. | |
| 11,091,692 B2 | 8/2021 | Kanazawa et al. | |
| 11,136,500 B2 | 10/2021 | Watanabe et al. | |
| 11,519,860 B2 | 12/2022 | Chiku et al. | |
| 11,674,954 B2 | 6/2023 | Chiku et al. | |
| 11,733,244 B2 | 8/2023 | Chiku et al. | |
| 11,821,896 B2 | 11/2023 | Chiku et al. | |
| 2006/0172357 A1 | 8/2006 | Yang et al. | |
| 2007/0154890 A1 | 7/2007 | Isobe | |
| 2009/0261269 A1 | 10/2009 | Horii et al. | |
| 2011/0054187 A1 | 3/2011 | Rurack et al. | |

(Continued)

FOREIGN PATENT DOCUMENTS

| | | |
|---|---|---|
| CN | 1902490 | 1/2007 |
| CN | 1944540 | 4/2007 |

(Continued)

OTHER PUBLICATIONS

"Search Report of Europe Counterpart Application", issued on Apr. 11, 2022, p. 1-p. 8.

(Continued)

*Primary Examiner* — Kristin A Vajda
(74) *Attorney, Agent, or Firm* — JCIPRNET

(57) ABSTRACT

An object of the present invention is to provide a luminescent particle having an emission maximum wavelength in a long wavelength range of 680 nm or longer and exhibiting a high quantum yield; and a compound having an emission maximum wavelength in a long wavelength range of 680 nm or longer and exhibiting a high quantum yield in the particles. According to the present invention, provided is a luminescent particle containing at least one kind of compound represented by Formula (1) (definitions of substituents in the formula are as set forth in the description) and a particle.

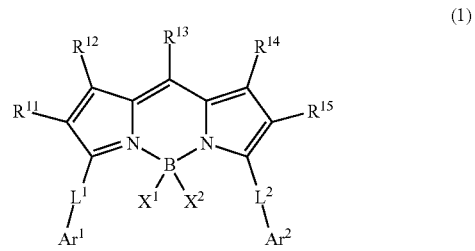

(1)

2 Claims, 1 Drawing Sheet

(56) References Cited

U.S. PATENT DOCUMENTS

| | | |
|---|---|---|
| 2013/0078738 A1 | 3/2013 | Watanabe et al. |
| 2014/0295468 A1 | 10/2014 | Kasagi et al. |
| 2015/0051101 A1 | 2/2015 | Hoshino et al. |
| 2015/0171328 A1 | 6/2015 | Bura et al. |
| 2016/0069909 A1 | 3/2016 | Nakamura et al. |
| 2016/0370289 A1 | 12/2016 | Hikage et al. |
| 2018/0372638 A1 | 12/2018 | Kasagi et al. |
| 2019/0185745 A1 | 6/2019 | Watanabe et al. |
| 2020/0018765 A1 | 1/2020 | Chiku et al. |
| 2020/0025748 A1 | 1/2020 | Chiku et al. |
| 2020/0025770 A1 | 1/2020 | Chiku et al. |
| 2020/0025771 A1 | 1/2020 | Chiku et al. |
| 2020/0033334 A1 | 1/2020 | Chiku et al. |
| 2020/0096445 A1 | 3/2020 | Chiku et al. |
| 2020/0378962 A1 | 12/2020 | Chiku et al. |
| 2021/0364524 A1 | 11/2021 | Kanazawa et al. |
| 2021/0380881 A1 | 12/2021 | Watanabe et al. |

FOREIGN PATENT DOCUMENTS

| | | |
|---|---|---|
| CN | 102174144 | 9/2011 |
| CN | 103033492 | 4/2013 |
| CN | 105143234 | 12/2015 |
| CN | 105462576 | 4/2016 |
| CN | 106008581 | 10/2016 |
| EP | 0820489 | 7/2001 |
| EP | 2966080 | 1/2016 |
| EP | 2995952 | 3/2016 |
| JP | 860256057 | 12/1985 |
| JP | H0472564 | 3/1992 |
| JP | H06508210 | 9/1994 |
| JP | H07508309 | 9/1995 |
| JP | H08503547 | 4/1996 |
| JP | H10153599 | 6/1998 |
| JP | H10226172 | 8/1998 |
| JP | H10508897 | 9/1998 |
| JP | H11337551 | 12/1999 |
| JP | 2000206115 | 7/2000 |
| JP | 2000221196 | 8/2000 |
| JP | 2001021563 | 1/2001 |
| JP | 3442777 | 9/2003 |
| JP | 2007127438 | 5/2007 |
| JP | 2008527332 | 7/2008 |
| JP | 2008190946 | 8/2008 |
| JP | 2008249361 | 10/2008 |
| JP | 2010019553 | 1/2010 |
| JP | 2010112748 | 5/2010 |
| JP | 2010190880 | 9/2010 |
| JP | 2012047684 | 3/2012 |
| JP | 2012199541 | 10/2012 |
| JP | 2014196283 | 10/2014 |
| JP | 2014235081 | 12/2014 |
| JP | 2015072249 | 4/2015 |
| JP | 2016057145 | 4/2016 |
| KR | 20140137676 | 12/2014 |
| WO | 9221769 | 12/1992 |
| WO | 9323492 | 11/1993 |
| WO | 9629367 | 9/1996 |
| WO | 2013146694 | 10/2013 |
| WO | 2014013205 | 1/2014 |
| WO | 2015129361 | 9/2015 |
| WO | 2017150516 | 9/2017 |
| WO | 2018021376 | 2/2018 |
| WO | 2018021377 | 2/2018 |
| WO | 2018038137 | 3/2018 |
| WO | 2018038138 | 3/2018 |
| WO | 2018181796 | 10/2018 |
| WO | 2018181798 | 10/2018 |
| WO | 2018181800 | 10/2018 |

OTHER PUBLICATIONS

"Office Action of China Counterpart Application", issued on Mar. 3, 2022, with English translation thereof, p. 1-p. 18.

"Office Action of China Counterpart Application" with English translation thereof, issued on Jun. 13, 2022, p. 1-p. 14.

"Office Action of Japan Application No. 2020-571226, corresponding to related U.S. Appl. No. 17/393,578" with English translation thereof, issued on Aug. 2, 2022, p. 1-p. 10.

"Office Action of China Related Application, application No. 201880022538.9", issue on May 13, 2022, pp. 1-40.

"Office Action of China Related Application, application No. 201880022541.0", issue on May 11, 2022, pp. 1-29.

"Office Action of China Related Application, application No. 201880022543.X", issue on Apr. 25, 2022, pp. 1-17.

"International Search Report (Form PCT/ISA/210) of PCT/JP2018/013409," mailed on Jul. 3, 2018, with English translation thereof, pp. 1-5.

"Written Opinion of the International Searching Authority (Form PCT/ISA/237) of PCT/JP2018/013409," mailed on Jul. 3, 2018, with English translation thereof, pp. 1-10.

"International Preliminary Report on Patentability (Form PCT/IB/373) of PCT/JP2018/013409," issued on Oct. 1, 2019, pp. 1.

Jun Wang et al., "Synthesis, structure and photophysical properties of near-infrared 3,5-diarylbenzoBODIPY fluorophores", RSC Advances, May 23, 2016, pp. 52180-52188, Issue 57.

"Search Report of Europe Related Application, Application No. 18774205.1", issued on Feb. 10, 2020, p. 1-p. 10.

"Office Action of Japan Related Application, Application No. 2019510174", issued on Jul. 21, 2020, with English translation thereof, p. 1-p. 4.

"Office Action of Europe Related Application, Application No. 18774205.1", issued on Feb. 16, 2021, p. 1-p. 6.

"Office Action of Related U.S. Appl. No. 16/585,406", issued on Oct. 14, 2021, p. 1-p. 29.

Chloe Grazon et al., "Ultrabright BODIPY-Tagged Polystyrene Nanoparticles: Study of Concentration Effect on Photophysical Properties", The Journal of Physical Chemistry C, Jun. 4, 2014, pp. 13945-13952, vol. 118.

"Office Action of Europe Related Application, Application No. 18774876.9", issued on Feb. 15, 2021, p. 1-p. 6.

"Office Action of Japan Related Application, Application No. 2019510170", issued on Jul. 21, 2020, with English translation thereof, p. 1-p. 4.

"International Preliminary Report on Patentability (Form PCT/IB/373) of PCT/JP2018/013407," issued on Oct. 1, 2019, p. 1.

"International Preliminary Report On Patentability (Form PCT/IB/373) of PCT/JP2018/013405," issued on Oct. 1, 2019, p. 1.

"International Search Report (Form PCT/ISA/210) of PCT/JP2018/013405," mailed on Jun. 26, 2018, with English translation thereof, pp. 1-5.

"International Search Report (Form PCT/ISA/210) of PCT/JP2018/013407," mailed on Jul. 3, 2018, with English translation thereof, pp. 1-5.

"Office Action of Europe Related Application, Application No. 18777743.8", issued on Feb. 16, 2021, p. 1-p. 6.

"Office Action of Korea Related Application, Application No. 20197028408", issued on Jan. 14, 2021, with English translation thereof, p. 1-p. 8.

"Office Action of Korea Related Application, Application No. 20197028399", issued on Jan. 2, 2021, with English translation thereof, p. 1-p. 9.

"Office Action of Japan Related Application, Application No. 2019510172", issued on Jul. 21, 2020, with English translation thereof, p. 1-p. 6.

"Search Report of Europe Related Application, Application No. 18774876.9", issued on Feb. 10, 2020, p. 1-p. 10.

"Search Report of Europe Related Application, Application No. 18777743.8", issued on Feb. 12, 2020, p. 1-p. 9.

"Written Opinion of the International Searching Authority (Form PCT/ISA/237) of PCT/JP2018/013405," mailed on Jun. 26, 2018, with English translation thereof, pp. 1-9.

"Written Opinion of the International Searching Authority (Form PCT/ISA/237) of PCT/JP2018/013407," mailed on Jul. 3, 2018, with English translation thereof, pp. 1-12.

"Office Action of U.S. Related Application, U.S. Appl. No. 16/583,870", issued on Sep. 23, 2021, p. 1-p. 34.

(56) References Cited

OTHER PUBLICATIONS

"Office Action of U.S. Related Application, U.S. Appl. No. 16/583,870", issued on Feb. 8, 2022, p. 1-p. 17.
"Notice of allowance of U.S. Related Application, U.S. Appl. No. 16/585,406", issued on Mar. 17, 2022, p. 1-p. 16.
"Office Action of U.S. Related Application, U.S. Appl. No. 16/584,079", issued on Apr. 22, 2022, p. 1-p. 36.
"Office Action of China Related Application, Application No. 201880022530.2", issued on Jul. 6, 2022, with partial English translation thereof, p. 1-p. 22.
"Office Action of China Related Application, Application No. 201880022481.2", issued on Jun. 1, 2022, with partial English translation thereof, p. 1-p. 28.
"Office Action of China Related Application, Application No. 201880022600.4", issued on Jun. 13, 2022, with partial English translation thereof, p. 1-p. 23.
"Notice of allowance of U.S. Related Application, U.S. Appl. No. 16/583,870", issued on Jun. 2, 2022, p. 1-p. 12.
"Notice of allowance of U.S. Related Application, U.S. Appl. No. 16/585,406", issued on Aug. 24, 2022, p. 1-p. 15.
"Office Action of U.S. Related Application, U.S. Appl. No. 16/584,079", issued on Sep. 19, 2022, p. 1-p. 18.
Farbstoffchemie, "Theorie der Farbigkeit", Mar. 13, 2024, Available at: http://www.bhbrand.de/.
Yoshihiro Yamaguchi et al., "How the π Conjugation Length Affects the Fluorescence Emission Efficiency", Journal of the American Chemical Society, Sep. 25, 2008, pp. 13867-13869.
"Office Action of Europe Counterpart Application, Application No. 17843616.8", issued on Feb. 22, 2024, p. 1-p. 16.
Decision of Refusal of China Counterpart Application, Application No. 201880022541.0, with English translation thereof, issued on Jan. 5, 2023, pp. 1-20.
Decision of Refusal of China Counterpart Application, Application No. 201880022543.X, with English translation thereof, issued on Jan. 9, 2023, pp. 1-12.
Decision of Refusal of China Counterpart Application, Application No. 201880022538.9, with English translation thereof, issued on Jan. 9, 2023, pp. 1-31.
Office Action of China Counterpart Application, Application No. 201980014801.4, with English translation thereof, issued on Dec. 16, 2022, pp. 1-44.
Office Action of Japan Counterpart Application, Application No. 2020571226, with English translation thereof, issued on Jan. 24, 2023, pp. 1-4.
Posthuma-Trumpie et al., "Development of a competitive lateral flow Immunoassay for progesterone: influence of coating conjugates and buffer components," Anal Bioanal Chem (2008), vol. 392, Sep. 2008, pp. 1215-1223.
"Office Action of Japan Counterpart Application" with English translation thereof, issued on Jul. 21, 2020, p. 1-p. 6.
"International Search Report (Form PCT/ISA/210) of PCT/JP2018/013406," mailed on Jun. 26, 2018, with English translation thereof, pp. 1-5.
"International Preliminary Report pn Patentability(Form PCT/IB/373) of PCT/JP2018/013406," issued on Oct. 1, 2019, with English translation thereof, pp. 1-14.
"Written Opinion of the International Searching Authority (Form PCT/ISA/237)" of PCT/JP2018/013406, mailed on Jun. 26, 2018, with English translation thereof, pp. 1-12.
"Search Report of Europe Counterpart Application", issued on Feb. 10, 2020, p. 1-p. 10.
"Office Action of Europe Counterpart Application", issued on Feb. 15, 2021, p. 1-p. 6.
"Office Action of Korea Counterpart Application" with English translation thereof, issued on Jan. 29, 2021, p. 1-p. 8.
Yukie Suda et al., "Multi-thiophene-substituted NIR boron-dibenzopyrromethene dyes: synthesis and their spectral properties," Tetrahedron, vol. 71, Mar. 2015, pp. 4174-4182.
"Office Action of Europe Counterpart Application", issued on Feb. 15, 2021, p. 1-p. 7.
"Office Action of Japan Counterpart Application" with English translation thereof, issued on Jul. 21, 2020, p. 1-p. 4.
"Search Report of Europe Counterpart Application", issued on Feb. 10, 2020, p. 1-p. 11.
"Written Opinion of the International Searching Authority (Form PCT/ISA/237)" of PCT/JP2018/013410, mailed on Jun. 26, 2018, with English translation thereof, pp. 1-10.
"International Search Report (Form PCT/ISA/210) of PCT/JP2018/013410," mailed on Jun. 26, 2018, with English translation thereof, pp. 1-5.
"International Preliminary Report on Patentability(Form PCT/IB/373) of PCT/JP2018/013410," issued on Oct. 1, 2019, with English translation thereof, pp. 1-12.
"International Preliminary Report on Patentability (Form PCT/IPEA/409) of PCT/JP2020/004222," completed on Feb. 22, 2021, with English translation thereof, pp. 1-10.
"International Search Report (Form PCT/ISA/210) of PCT/JP2020/004222," mailed on Apr. 21, 2020, with English translation thereof, pp. 1-5.
"Office Action of Japan Counterpart Application" with English translation thereof, issued on Apr. 13, 2021, p. 1-p. 4.
"International Preliminary Report on Patentability(Form PCT/IB/373) of PCT/JP2019/006705," issued on Aug. 27, 2020, with English translation thereof, pp. 1-11.
"International Search Report (Form PCT/ISA/210) of PCT/JP2019/006705," mailed on May 21, 2019, with English translation thereof, pp. 1-5.
Atsushi Nagai et al., "Aromatic Ring-Fused BODIPY-Based Conjugated Polymers Exhibiting Narrow Near-Infrared Emission Bands," Macromolecules, vol. 43, Dec. 2019, pp. 193-200.
David Wild, "Logit-Log and Four-Parameter Log-Logistic Methods," The Immunoassay Handbook, Third Edition, 2005, pp. 1-4.
"Search Report of Europe Counterpart Application, Application No. 23204869.4", issued on Mar. 7, 2024, p. 1-p. 19.
Office Action issued Jan. 18, 2022 in U.S. Appl. No. 16/585,306.
Yu Rong et al., "Multicolor Fluorescent Semiconducting Polymer Dots with Narrow Emissions and High Brightness", ACS Nano, Jan. 2, 2013, pp. 376-384.
Alina Brzeczek et al., "Systematic elongation of thienyl linkers and their effect on optical and electrochemical properties in Carbazole-BODIPY donor-acceptor systems", RSC Advances, Apr. 2016, pp. 36500-36509.
International Search Report and Written Opinion dated Oct. 10, 2017 from the International Searching Authority in International Application No. PCT/JP2017/030054, corresponds to U.S. Appl. No. 16/282,327.
International Preliminary Report on Patentability dated Feb. 26, 2019 from the International Bureau in International Application No. PCT/JP2017/030054, corresponds to U.S. Appl. No. 16/282,327.
Huaxia Shi et al., "Tumor-targeting, enzyme-activated nanoparticles for simultaneous cancer diagnosis and photodynamic therapy", Journal of Materials Chemistry B, vol. 4, No. 1, Jan. 1, 2016, pp. 113-120.
Yan-Wei Wang et al., "Dihydronaphthalene-Fused Boron-Dipyrromethene (BODIPY) Dyes: Insight into the Electronic and Conformational Tuning Modes of BODIPY Fluorophores", Chemistry—A European Journal, vol. 16, No. 9, Feb. 19, 2010, pp. 2887-2903.
Yu-Zhe Chen et al., "Water-soluble, membrane-permeable organic fluorescent nanoparticles with large tunability in emission wavelenghts and Stokes shifts", Chemical Communications, vol. 49, No. 52, Jan. 1, 2013, pp. 5877-5879.
Lijuan Jiao et al., "Long wavelength red fluorescent dyes from 3,5-diiodo-BODIPYs", Organic & Biomolecular Chemistry, vol. 8, No. 11, Apr. 14, 2010, pp. 2517-2519.
Zeya Feng et al., "Regioselective and Stepwise Syntheses of Functionalized BODIPY Dyes through Palladium-Catalyzed Cross-Coupling Reactions and Direct C—H Arylations", The Journal of Organic Chemistry, vol. 81, No. 15, Jun. 30, 2016, pp. 6281-6291.
Ning Zhao et al., "Stepwise Polychlorination of 8-Chloro-BODIPY and Regioselective Functionalization of 2,3,5,6,8-Pentachloro-BODIPY", The Journal of Organic Chemistry, vol. 80, No. 16, Aug. 21, 2015, pp. 8377-8383.

(56) References Cited

OTHER PUBLICATIONS

B. Kucukoz et al., "Enhancement of two photon absorption properties and intersystem crossing by charge transfer in pentaaryl boron-dipurromethene (BODIPY) derivatives", Physical Chemistry Chemical Physics, vol. 18, No. 19, Apr. 19, 2016, pp. 13546-13553.
Lyubov N. Sobenina et al., "Synthesis and Optical Properties of Difluorobora-s-diazaindacene Dyes with Trifluoromethyl Substituents", European Journal of Organic Chemistry, vol. 2013, No. 19, May 10, 2013, pp. 4107-4118.
Search Report of Europe Application 17843616.8, issued on Jun. 14, 2019, corresponds to U.S. Appl. No. 16/282,327.
Office Action of Japan Application 2018-535725, with English translation thereof, issued Jan. 7, 2020, corresponds to U.S. Appl. No. 16/282,327.
Office Action of Korean Application 10-2019-7005239, with English translation thereof, issued Jul. 15, 2020, corresponds to U.S. Appl. No. 16/282,327.
Cesar F. A. Gomez-Duran et al., "Near-IR BODIPY Dyes a la Carte-Programmed Orthogonal Functionalization of Rationally Designed Building Blocks", Chemistry—A European Journal, vol. 22, No. 3, Nov. 26, 2015, pp. 1048-1061.
Shilei Zhu et al., "Highly water-soluble neutral near-infrared emissive BODIPY polymeric dyes", Journals of Materials Chemistry, vol. 22, Dec. 2011, pp. 271-2790.
Office Action of Europe Application 17843616.8 issued on Nov. 19, 2020, corresponds to U.S. Appl. No. 16/282,327.
Bartelmess et al., "Synthesis and Characterization of Far-Red/NIR-Fluoroescent BODIPY Dyes, Solid-State Fluorescence and Application as Fluorescent Tags Attached to Carbon Nano-onions", Chem. Eu. J., 2015, vol. 21, pp. 9727-9732.
Office Action of Korean Application 10-2019-7005239, with English translation thereof, issued Jan. 12, 2021, corresponds to U.S. Appl. No. 16/282,327.
Office Action of China Application 201780051809.9, with partial English translation thereof, issued May 31, 2021, corresponds to U.S. Appl. No. 16/282,327.
O. Galangau et al., "Electrochromic and electrofluorochromic properties of a new boron dipyrromethene-ferrocene conjugate", Electrochimica Acta, vol. 87, Dec. 2013, pp. 809-815.
Wenbo Hu et al., "Engineering Lysosome-Targeting BODIPY Nanoparticles for Photoacoustic Imaging and Photodynamic Therapy and Near-Infrared Light", ACS Appl Mater Interfaces, Apr. 2016, vol. 8, pp. 12039-12047.
Office Action issued Feb. 8, 2021 in U.S. Appl. No. 16/282,327.
Extended European Search Report dated Mar. 19, 2021 from the European Patent Office in Application No. 19756950.2, corresponds to U.S. Appl. No. 16/999,138.
Office Action issued Apr. 22, 2022 in U.S. Appl. No. 16/585,758.
"Office Action of Europe Counterpart Application", issued on Jun. 12, 2023, p. 1-p. 17.
"Office Action of U.S. Related Application, U.S. Appl. No. 17/393,578", issued on May 22, 2024, p. 1-p. 39.
"Office Action of Related U.S. Appl. No. 16/999,138", issued on Feb. 1, 2024, pp. 1-68.
Yuji Yamada et al., "Size Determination of Latex Particles by Electron Microscopy", Aerosol Science and Technology, vol. 4, Jul. 1984, pp. 227-232.
"Office Action of Related U.S. Appl. No. 16/585,306", issued on Jun. 6, 2022, pp. 1-35.
"Office Action of China Related Application No. 201980014801.4", with English translation thereof, issue on Apr. 15, 2023, pp. 1-43.
"Office Action of China Counterpart Application", issued on Aug. 5, 2022, with Partial English translation thereof, p. 1-p. 14.
"Office Action of Related U.S. Appl. No. 16/585,306", issued on Mar. 6, 2023, pp. 1-24.
"Office Action of China Related Application, application No. 201880022541.0" with English translation thereof, issued on Aug. 26, 2022, p. 1-p. 22.
"Office Action of China Related Application, application No. 201880022538.9" with English translation thereof, issued on Sep. 15, 2022, p. 1-p. 35.
"Office Action of U.S. Related Application, U.S. Appl. No. 16/585,758", issued on Sep. 23, 2022, pp. 1-32.
"Office Action of U.S. Related Application, U.S. Appl. No. 16/585,231", issued on Oct. 19, 2022, pp. 1-32.
"Office Action of U.S. Related Application, U.S. Appl. No. 16/585,306", issued on Oct. 19, 2022, pp. 1-28.
"Office Action of U.S. Related Application, U.S. Appl. No. 16/585,758", issued on Dec. 7, 2021, pp. 1-38.
"Office Action of Europe Related Application, application No. 19756950.2-1118", issued on Oct. 24, 2022, p. 1-p. 7.
"Office Action of Europe Counterpart Application", issued on Feb. 16, 2021, p. 1-p. 7.
Olivier Galangau et al., "Rational design of visible and NIR distyryl-BODIPY dyes from a novel fluorinated platform," Organic & Biomolecular Chemistry, Jun. 2010, pp. 4546-4553.
Junchao Xu et al., "meso-C6F5 substituted BODIPYs with distinctive spectroscopic properties and their application for bioimaging in living cells," Tetrahedron, vol. 70, Sep. 2014, pp. 5800-5805.
"International Search Report (Form PCT/ISA/210) of PCT/JP2018/013408," mailed on Jul. 3, 2018, with English translation thereof, pp. 1-5.
"Written Opinion of the International Searching Authority (Form PCT/ISA/237)" of PCT/JP2018/013408, mailed on Jul. 3, 2018, with English translation thereof, pp. 1-10.
"International Preliminary Report on Patentability(Form PCT/IB/373) of PCT/JP2018/013408," issued on Oct. 1, 2019, with English translation thereof, pp. 1-12.
Mandy Hecht et al., "Fluorinated Boron-Dipyrromethene (BODIPY) Dyes: Bright and Versatile Probes for Surface Analysis," ChemistryOpen, Feb. 2013, pp. 25-38.
"Office Action of Korea Counterpart Application" with English translation thereof, issued on Jan. 14, 2021, p. 1-p. 9.
"Office Action of Related U.S. Appl. No. 16/999,138", issue on Jun. 20, 2024, pp. 1-45.
"Office Action of US Co-pending U.S. Appl. No. 17/393,578", issued on Aug. 8, 2024, pp. 1-16.
"Office Action of Europe Counterpart Application", issued on Sep. 3, 2024, pp. 1-4.
"Final Office Action of co-pending U.S. Appl. No. 17/393,578", issued on Oct. 24, 2024, pp. 1-11.

LUMINESCENT PARTICLE AND COMPOUND

CROSS-REFERENCE TO RELATED APPLICATIONS

This application is a divisional application of and claims the priority benefits of U.S. application Ser. No. 16/282,327, filed on Feb. 22, 2019, now allowed, which is a Continuation of PCT International Application No. PCT/JP2017/030054 filed on Aug. 23, 2017, which claims priority under 35 U.S.C § 119(a) to Japanese Patent Application No. 2016-162613 filed on Aug. 23, 2016, Japanese Patent Application No. 2017-046742 filed on Mar. 10, 2017 and Japanese Patent Application No. 2017-144722 filed on Jul. 26, 2017. Each of the above applications is hereby expressly incorporated by reference, in its entirety, into the present application.

BACKGROUND OF THE INVENTION

1. Field of the Invention

The present invention relates to a luminescent particle containing a compound having a specific structure and a novel compound useful as a dye.

2. Description of the Related Art

A fluorescence detection method is widely used as a highly sensitive and easy measurement method for quantifying a protein, an enzyme, an inorganic compound, or the like. The fluorescence detection method is a method of confirming the presence of a substance to be measured by detecting the fluorescence emitted in the case where excitation light of a specific wavelength is irradiated to a sample considered to contain a substance to be measured which is excited by the light of a specific wavelength to emit fluorescence. In the case where the substance to be measured is not a fluorescent substance, for example, the presence of the substance to be measured can be confirmed by bring a substance in which a substance specifically binding to the substance to be measured is labeled with a fluorescent dye into contact with a sample, and then detecting the fluorescence emitted in the case where excitation light is irradiated in the same manner as described above.

JP3442777B discloses fluorescent microparticles produced by blending an initial donor dye having a preferable excitation peak and a final receptor dye having a preferable luminescence peak in polymer microparticles. In JP3442777B, it is described that a polyazaindacene dye is used as the dye.

Olivier Galangau et al., Org. Biomol. Chem., 2010, Vol. 8, pp. 4546 to 4553 discloses that a novel distyryl BODIPY® (registered trademark, abbreviation of boron-dipyrromethene) dye is designed and synthesized, and the synthesized distyryl BODIPY® dye has been analyzed for absorption and emission spectra in a chloromethane solution.

SUMMARY OF THE INVENTION

The fluorescent microparticles described in JP3442777B have a preferable effective Stokes shift, but have a problem of low quantum yield. In Olivier Galangau et al., Org. Biomol. Chem., 2010, Vol. 8, pp. 4546 to 4553, absorption and emission spectra of a dye solution are analyzed, but there is no description about incorporation of a dye into particles.

An object of the present invention is to provide a luminescent particle having an emission maximum wavelength in a long wavelength range of 680 nm or longer and exhibiting a high quantum yield; and a compound having an emission maximum wavelength in a long wavelength range of 680 nm or longer and exhibiting a high quantum yield in the particles.

As a result of extensive studies to achieve the foregoing object, the present inventors have found that a luminescent particle having an emission maximum wavelength in a long wavelength range of 680 nm or longer and exhibiting a high quantum yield can be produced by producing a luminescent particle using a novel compound having a specific structure. The present invention has been completed based on these findings.

That is, according to the present invention, the following inventions are provided.

[1] A luminescent particle containing at least one kind of compound represented by Formula (1) and a particle:

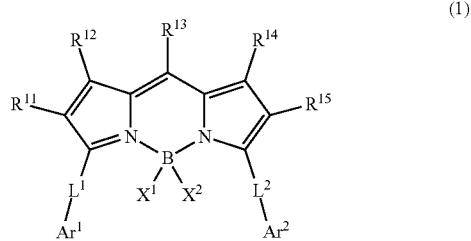

(1)

in the formula, $R^{11}$ to $R^{15}$ each independently represent a hydrogen atom, a halogen atom, an alkyl group, an aryl group, a heterocyclic group, an ethenyl group, an ethynyl group, an amino group, an acyl group, an alkoxy group, an aryloxy group, an alkylthio group, or an arylthio group, each of which may have a substituent, and at least three of $R^{11}$ to $R^{15}$ represent atoms or groups other than hydrogen atoms; $X^1$ and $X^2$ each independently represent a halogen atom, an alkyl group, an aryl group, a heterocyclic group, a hydroxy group, an alkoxy group, an aryloxy group, an alkylthio group, an arylthio group, an ethenyl group, or an ethynyl group, each of which may have a substituent, and $X^1$ and $X^2$ may be bonded to each other to form a ring; $Ar^1$ and $Ar^2$ each independently represent an aryl group or a heterocyclic group, each of which may have a substituent; and $L^1$ and $L^2$ each independently represent any one of Formula (L-1), Formula (L-2), Formula (L-3) or Formula (L-4);

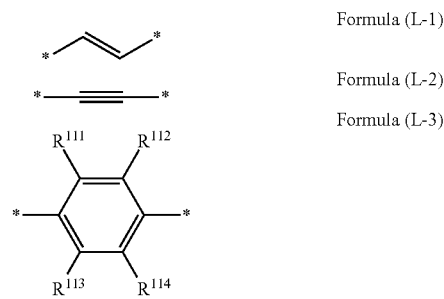

Formula (L-1)

Formula (L-2)

Formula (L-3)

Formula (L-4)

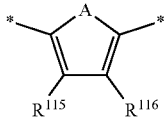

in the formulae, $R^{111}$ to $R^{116}$ each independently represent a hydrogen atom, a halogen atom, an alkyl group, an aryl group, a heterocyclic group, an ethenyl group, an ethynyl group, an amino group, an acyl group, an alkoxy group, an aryloxy group, an alkylthio group, or an arylthio group, each of which may have a substituent; and A represents —O—, —S—, or —NH—.

[2] The luminescent particle according to [1], in which the particle is a latex particle.

[3] The luminescent particle according to [1] or [2], in which the particle has a carboxyl group.

[4] The luminescent particle according to any one of [1] to [3], which has an average particle diameter of 30 to 500 nm.

[5] The luminescent particle according to any one of [1] to [4], in which the compound represented by Formula (1) is a compound represented by Formula (2):

(2)

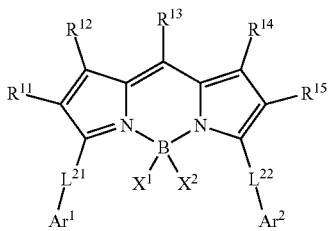

in the formula, $R^{11}$ to $R^{15}$, $X^1$, $X^2$, $Ar^1$, and $Ar^2$ are as defined in Formula (1), and $L^{21}$ and $L^{22}$ each independently represent a group represented by Formula (L-1) or Formula (L-2):

Formula (L-1)

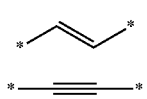

Formula (L-2)

[6] The luminescent particle according to any one of [1] to [4], in which the compound represented by Formula (1) is a compound represented by Formula (3):

(3)

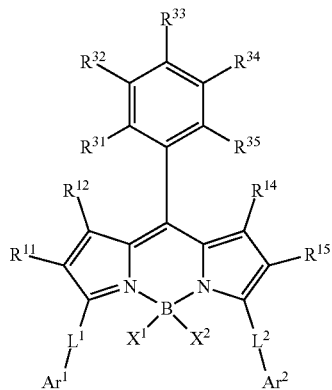

in the formula, $R^{11}$, $R^{12}$, $R^{14}$, $R^{15}$, $A^{r1}$, $A^{r2}$, $L^1$, and $L^2$ are as defined in Formula (1), provided that at least two of $R^{11}$, $R^{12}$, $R^{14}$, and $R^{15}$ are atoms or groups other than hydrogen atoms; $R^{31}$ to $R^{35}$ each independently represent a hydrogen atom, a halogen atom, an alkyl group, an aryl group, a heterocyclic group, an ethenyl group, an ethynyl group, an amino group, an acyl group, a cyano group, an alkoxy group, an aryloxy group, an alkylthio group, or an arylthio group, each of which may have a substituent; and any one of $R^{31}$, $R^{32}$, $R^{34}$ or $R^{35}$ is a group consisting of two or more atoms.

[7] The luminescent particle according to any one of [1] to [4], in which the compound represented by Formula (1) is a compound represented by Formula (4):

(4)

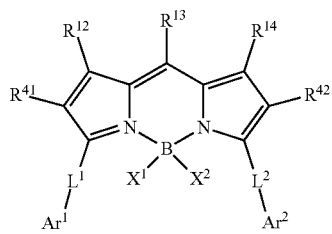

in the formula, $R^{12}$, $R^{13}$, $R^{14}$, $X^1$, $X^2$, $Ar^1$, $Ar^2$, $L^1$, and $L^2$ are as defined in Formula (I), provided that at least one of $R^{12}$, $R^{13}$, $R^{14}$ is an atom or group other than a hydrogen atom; and $R^{41}$ and $R^{42}$ each independently represent an aryl group, a heterocyclic group, an ethenyl group, or an ethynyl group, each of which may have a substituent.

[8] The luminescent particle according to any one of [1] to [5] and [7], in which the compound represented by Formula (4) is a compound represented by Formula (7):

(7)

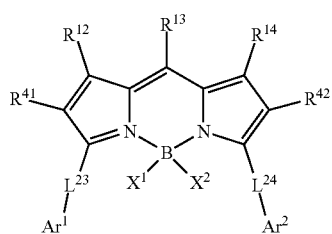

in the formula, $R^{12}$, $R^{13}$, $R^{14}$, $R^{41}$, $R^{42}$, $X^1$, $X^2$, $Ar^1$, and $Ar^2$ are as defined in Formula (4), provided that at least one of $R^{12}$, $R^{13}$ or $R^{14}$ is an atom or group other than a hydrogen atom; and $L^{23}$ and $L^{24}$ each independently represent a group represented by Formula (L-1) or (L-2).

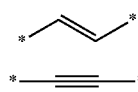

Formula (L-1)

Formula (L-2)

[9] The luminescent particle according to any one of [1] to [5], [7] and [8], in which the compound represented by Formula (7) is a compound represented by Formula (8):

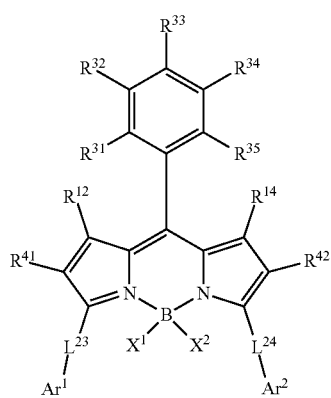

(8)

in the formula, $R^{12}$, $R^{14}$, $R^{41}$, $R^{42}$, $X^1$, $X^2$, $Ar^1$, $Ar^2$, $L^{23}$, and $L^{24}$ are as defined in Formula (7); $R^{31}$ to $R^{35}$ each independently represent a hydrogen atom, a halogen atom, an alkyl group, an aryl group, a heterocyclic group, an ethenyl group, an ethynyl group, an amino group, an acyl group, a cyano group, an alkoxy group, an aryloxy group, an alkylthio group, or an arylthio group, each of which may have a substituent; and any one of $R^{31}$, $R^{32}$, $R^{33}$, $R^{34}$ or $R^{35}$ is a hydrogen atom.

[10] The luminescent particle according to any one of [1] to [5] and [7] to [9], in which the compound represented by Formula (8) is a compound represented by Formula (9):

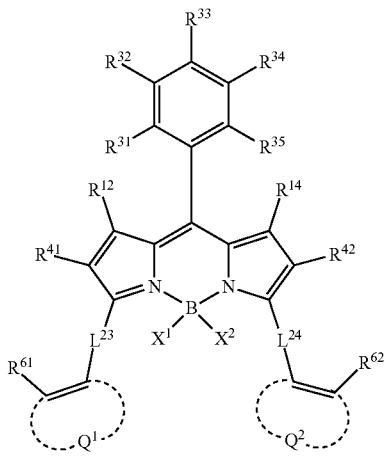

(9)

in the formula, $R^{12}$, $R^{14}$, $R^{41}$, $R^{42}$, $R^{31}$ to $R^{35}$, $X^1$, $X^2$, $Ar^1$, $Ar^2$, $L^{23}$, and $L^{24}$ are as defined in Formula (8); $R^{61}$ and $R^{62}$ each independently represent an alkyl group, an alkenyl group, an aryl group, a heteroaryl group, an amino group, an acyl group, an alkoxy group, an aryloxy group, an alkylthio group, or an arylthio group, each of which may have a substituent; $Q^1$ and $Q^2$ each independently represent an aromatic hydrocarbon ring or an aromatic heterocyclic ring, each of which may have a substituent; and $R^{61}$ and $Q^1$, and $R^{62}$ and $Q^2$ each may form a fused ring structure.

[11] The luminescent particle according to any one of [1] to [4], in which the compound represented by Formula (1) is a compound represented by Formula (5):

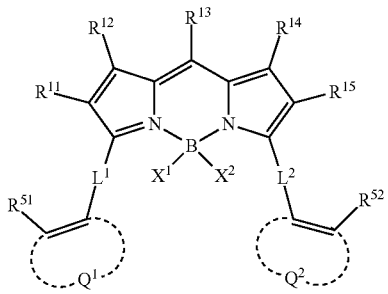

(5)

in the formula, $R^{11}$ to $R^{15}$, $X^1$, $X^2$, $L^1$, and $L^2$ are as defined in Formula (1); $R^{51}$ and $R^{52}$ each independently represent an alkyl group, an aryl group, a heteroaryl group, an amino group, an acyl group, an alkoxy group, an aryloxy group, an alkylthio group, or an arylthio group, each of which may have a substituent; and $Q^1$ and $Q^2$ each independently represent an aromatic hydrocarbon ring or an aromatic heterocyclic ring, each of which may have a substituent.

[12] The luminescent particle according to any one of [1] to [4] and [11], in which the compound represented by Formula (5) is a compound represented by Formula (6):

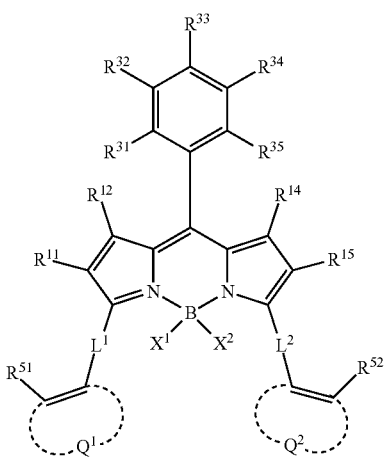

(6)

in the formula, $R^{11}$, $R^{12}$, $R^{14}$, $R^{15}$, $X^1$, $X^2$, $L^1$, and $L^2$ are as defined in Formula (5); $R^{31}$ to $R^{35}$ each independently represent a hydrogen atom, a halogen atom, an alkyl group, an aryl group, a heterocyclic group, an ethenyl group, an ethynyl group, an amino group, an acyl group, a cyano group, an alkoxy group, an aryloxy group, an alkylthio group, or an arylthio group, each of which may have a substituent, and any one of $R^{31}$, $R^{32}$, $R^{33}$, $R^{34}$ or $R^{35}$ is a hydrogen atom; $R^{51}$ and $R^{52}$ each independently represent an alkyl group, an aryl group, a heteroaryl group, an amino group, an acyl group, an alkoxy group, an aryloxy group, an alkylthio group, or an arylthio group, each of which may have a substituent; and $Q^1$ and $Q^2$ each independently represent an aromatic hydrocarbon ring or an aromatic heterocyclic ring, each of which may have a substituent.

[13] The luminescent particle according to any one of [1] to [12], in which the maximum emission wavelength is 650 nm or longer.

[14] A compound represented by Formula (3):

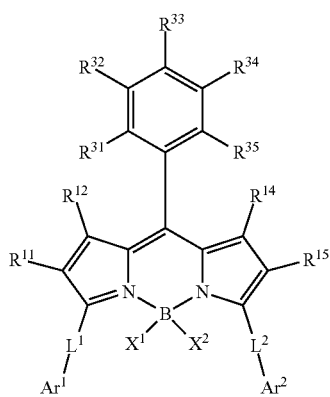

(3)

in the formula, $R^{11}$, $R^{12}$, $R^4$, and $R^{15}$ each independently represent a hydrogen atom, a halogen atom, an alkyl group, an aryl group, a heterocyclic group, an ethenyl group, an ethynyl group, an amino group, an acyl group, an alkoxy group, an aryloxy group, an alkylthio group, or an arylthio group, each of which may have a substituent, and at least two of $R^{11}$, $R^{12}$, $R^{14}$, and $R^{15}$ are atoms or groups other than hydrogen atoms; $X^1$ and $X^2$ each independently represent a halogen atom, an alkyl group, an aryl group, a heterocyclic group, a hydroxy group, an alkoxy group, an aryloxy group, an alkylthio group, an arylthio group, an ethenyl group, or an ethynyl group, each of which may have a substituent, and $X^1$ and $X^2$ may be bonded to each other to form a ring; $Ar^1$ and $Ar^2$ each independently represent an aryl group or a heterocyclic group, each of which may have a substituent; $R^{31}$ to $R^{35}$ each independently represent a hydrogen atom, a halogen atom, an alkyl group, an aryl group, a heterocyclic group, an ethenyl group, an ethynyl group, an amino group, an acyl group, a cyano group, an alkoxy group, an aryloxy group, an alkylthio group, or an arylthio group, each of which may have a substituent, and any one of $R^{31}$, $R^{32}$, $R^{34}$ or $R^{35}$ is a group consisting of two or more atoms; and $L^1$ and $L^2$ each independently represent any one of Formula (L-1), Formula (L-2), Formula (L-3) or Formula (L-4);

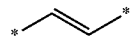

Formula (L-1)

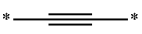

Formula (L-2)

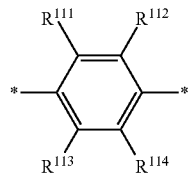

Formula (L-3)

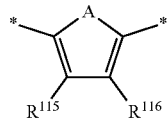

Formula (L-4)

in the formulae, $R^{111}$ to $R^{116}$ each independently represent a hydrogen atom, a halogen atom, an alkyl group, an aryl group, a heterocyclic group, an ethenyl group, an ethynyl group, an amino group, an acyl group, an alkoxy group, an aryloxy group, an alkylthio group, or an arylthio group, each of which may have a substituent; and A represents —O—, —S—, or —NH—.

[15] A compound represented by Formula (4):

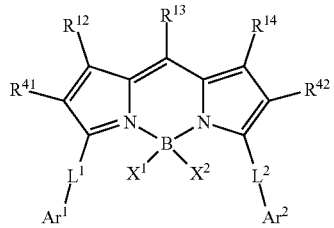

(4)

in the formula, $R^{12}$, $R^{13}$, and $R^{14}$ each independently represent a hydrogen atom, a halogen atom, an alkyl group, an aryl group, a heterocyclic group, an ethenyl group, an ethynyl group, an amino group, an acyl group, an alkoxy group, an aryloxy group, an alkylthio group, or an arylthio group, each of which may have a substituent, and at least one of $R^{12}$, $R^{13}$ or $R^{14}$ is an atom or group other than a hydrogen atom; $X^1$ and $X^2$ each independently represent a halogen atom, an alkyl group, an aryl group, a heterocyclic group, a hydroxy group, an alkoxy group, an aryloxy group, an alkylthio group, an arylthio group, an ethenyl group, or an ethynyl group, each of which may have a substituent, and $X^1$ and $X^2$ may be bonded to each other to form a ring; $Ar^1$ and $Ar^2$ each independently represent an aryl group or a heterocyclic group, each of which may have a substituent; $R^{41}$ and $R^{42}$ each independently represent an aryl group, a heterocyclic group, an ethenyl group, or an ethynyl group, each of which may have a substituent; and $L^1$ and $L^2$ each independently represent any one of Formula (L-1), (L-2), (L-3) or (L-4);

Formula (L-1)

Formula (L-2)

Formula (L-3)

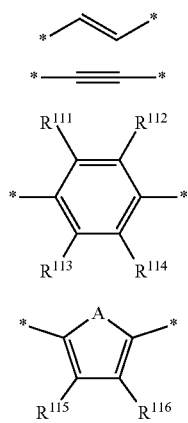

Formula (L-4)

in the formulae, $R^{111}$ to $R^{116}$ each independently represent a hydrogen atom, a halogen atom, an alkyl group, an aryl group, a heterocyclic group, an ethenyl group, an ethynyl group, an amino group, an acyl group, an alkoxy group, an aryloxy group, an alkylthio group, or an arylthio group, each of which may have a substituent; and A represents —O—, —S—, or —NH—.

[16] The compound according to [15], which is represented by Formula (7):

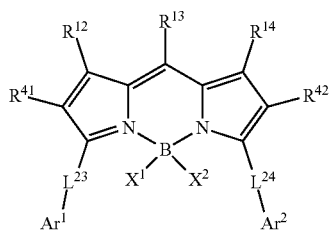

(7)

in the formula, $R^{12}$, $R^{13}$, $R^{14}$, $R^{41}$, $R^{42}$, $X^1$, $X^2$, $Ar^1$, and $Ar^2$ are as defined in Formula (4), provided that at least one of $R^{12}$, $R^{13}$ or $R^{14}$ is an atom or group other than a hydrogen atom; and $L^{23}$ and $L^{24}$ each independently represent a group represented by Formula (L-1) or Formula (L-2).

Formula (L-1)

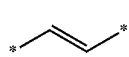

Formula (L-2)

[17] The compound according to [15] or [16], which is represented by Formula (8):

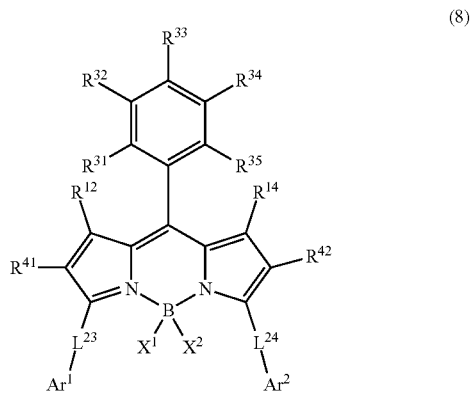

(8)

in the formula, $R^{12}$, $R^{14}$, $R^{41}$, $R^{42}$, $X^1$, $X^2$, $Ar^1$, $Ar^2$, $L^{23}$, and $L^{24}$ are as defined in Formula (7); and $R^{31}$ to $R^{35}$ each independently represent a hydrogen atom, a halogen atom, an alkyl group, an aryl group, a heterocyclic group, an ethenyl group, an ethynyl group, an amino group, an acyl group, a cyano group, an alkoxy group, an aryloxy group, an alkylthio group, or an arylthio group, each of which may have a substituent, and any one of $R^{31}$, $R^{32}$, $R^{33}$, $R^{34}$ or $R^{35}$ is a hydrogen atom.

[18] The compound according to any one of [15] to [17], which is represented by Formula (9):

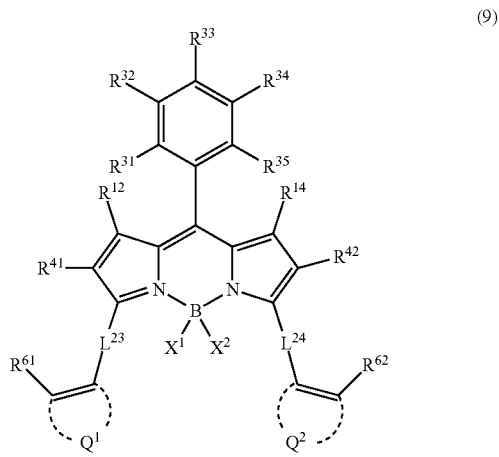

(9)

in the formula, $R^{12}$, $R^{14}$, $R^{41}$, $R^{42}$, $R^{31}$ to $R^{35}$, $X^1$, $X^2$, $Ar^1$, $Ar^2$, $L^{23}$, and $L^{24}$ are as defined in Formula (8); $R^{61}$ and $R^{62}$ each independently represent an alkyl group, an alkenyl group, an aryl group, a heteroaryl group, an amino group, an acyl group, an alkoxy group, an aryloxy group, an alkylthio group, or an arylthio group, each of which may have a substituent; $Q^1$ and $Q^2$ each independently represent an aromatic hydrocarbon ring or an aromatic heterocyclic ring, each of which may have a substituent; and $R^{61}$ and $Q^1$, and $R^{62}$ and $Q^2$ each may form a fused ring structure.

[19] A compound represented by Formula (6):

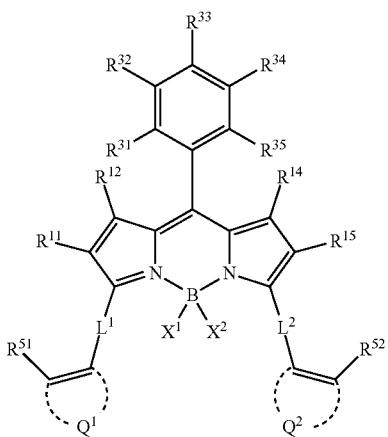

(6)

in the formula, $R^{11}$, $R^{12}$, $R^{14}$, and $R^{15}$ each independently represent a hydrogen atom, a halogen atom, an alkyl group, an aryl group, a heterocyclic group, an ethenyl group, an ethynyl group, an amino group, an acyl group, an alkoxy group, an aryloxy group, an alkylthio group, or an arylthio group, each of which may have a substituent, and at least two of $R^{11}$, $R^{12}$, $R^{14}$, and $R^{15}$ are atoms or groups other than hydrogen atoms; $X^1$ and $X^2$ each independently represent a halogen atom, an alkyl group, an aryl group, a heterocyclic group, a hydroxy group, an alkoxy group, an aryloxy group, an alkylthio group, an arylthio group, an ethenyl group, or an ethynyl group, each of which may have a substituent, and $X^1$ and $X^2$ may be bonded to each other to form a ring; $R^{31}$ to $R^{35}$ each independently represent a hydrogen atom, a halogen atom, an alkyl group, an aryl group, a heterocyclic group, an ethenyl group, an ethynyl group, an amino group, an acyl group, a cyano group, an alkoxy group, an aryloxy group, an alkylthio group, or an arylthio group, each of which may have a substituent, and any one of $R^{31}$, $R^{32}$, $R^{33}$, $R^{34}$ or $R^{35}$ is a hydrogen atom; $R^{51}$ and $R^{52}$ each independently represent an alkyl group, an aryl group, a heteroaryl group, an amino group, an acyl group, an alkoxy group, an aryloxy group, an alkylthio group, or an arylthio group, each of which may have a substituent; $Q^1$ and $Q^2$ each independently represent an aromatic hydrocarbon ring or an aromatic heterocyclic ring, each of which may have a substituent; and $L^1$ and $L^2$ each independently represent any one of Formula (L-1), Formula (L-2), Formula (L-3) or Formula (L-4);

Formula (L-1)

Formula (L-2)

Formula (L-3)

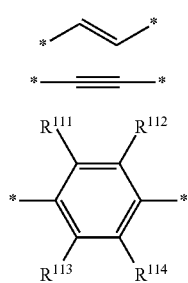

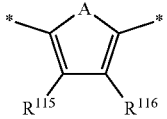

Formula (L-4)

in the formulae, $R^{111}$ to $R^{116}$ each independently represent a hydrogen atom, a halogen atom, an alkyl group, an aryl group, a heterocyclic group, an ethenyl group, an ethynyl group, an amino group, an acyl group, an alkoxy group, an aryloxy group, an alkylthio group, or an arylthio group, each of which may have a substituent; and A represents —O—, —S—, or —NH—.

The luminescent particle of the present invention has an emission maximum wavelength in a long wavelength range of 680 nm or longer and exhibits a high quantum yield and is useful in various assays. The compound of the present invention has an emission maximum wavelength in a long wavelength range of 680 nm or longer and exhibits a high quantum yield in the particles.

DESCRIPTION OF THE PREFERRED EMBODIMENTS

Figure 1:
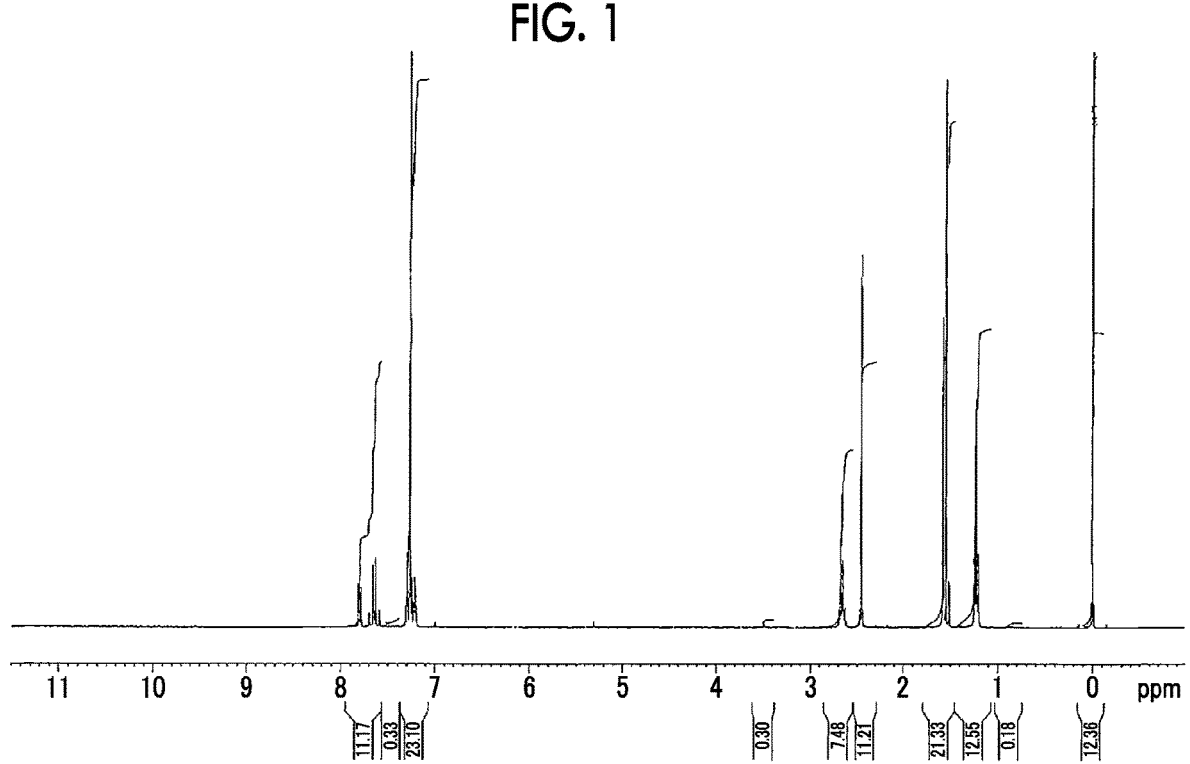
FIG. 1 shows a 400 MHz $^1$H NMR spectrum of Compound (4).

Hereinafter, embodiments of the present invention will be described in detail.

In the present specification, the numerical range indicated by using "to" means a range including numerical values described before and after "to" as a minimum value and a maximum value, respectively.

It is known that an ordinary dye compound is influenced by association in the case where the amount of incorporation into particles is increased, and therefore the quantum yield decreases (this is also referred to as concentration quenching). In particular, in the case of being incorporated into particles, a fluorescent dye compound having a long absorption wavelength of 650 nm or longer tends to exhibit concentration quenching, whereby it is difficult to maintain a quantum yield.

Inclusion of a conjugated substituent in the compound of the present invention makes it possible to emit light of long wavelength and inclusion of a plurality of substituents in the dipyrromethene skeleton makes it also possible to suppress a decrease in quantum yield in the polymer particles. As a factor of suppressing a decrease in quantum yield, suppression of intermolecular interaction (for example, π-π interaction) by a plurality of substituents projecting in a direction perpendicular to the dipyrromethene skeleton is considered. According to the compound of the present invention, it is possible to produce a luminescent particle (preferably a fluorescent particle, more preferably a fluorescent nanoparticle) having high luminance, particularly in the long wavelength range. In the case where the luminescent particle of the present invention is a fluorescent particle, the luminance refers to fluorescence intensity. According to the present invention, since the luminescence quantum yield is high in the region of the window of the living body (in the vicinity of 650 to 900 nm which is a near-infrared wavelength range which is easy to transmit through the living body), the sensitivity of sensing using luminescence can be improved.

[Luminescent Particle of Present Invention]

The luminescent particle of the present invention is a luminescent particle containing at least one kind of compound represented by Formula (1) and a particle.

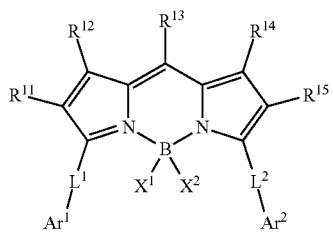

(1)

The meaning of each symbol in Formula (I) is as defined in the present specification.

In the present specification, the alkyl group may be linear, branched, cyclic or a combination thereof, and the number of carbon atoms in the linear or branched alkyl group is preferably 1 to 36, more preferably 1 to 18, still more preferably 1 to 12, and particularly preferably 1 to 6. The cyclic alkyl group may be, for example, a cycloalkyl group having 3 to 8 carbon atoms. Specific examples of the alkyl group include a methyl group, an ethyl group, an n-propyl group, an isopropyl group, an n-butyl group, an iso-butyl group, a sec-butyl group, a t-butyl group, an n-pentyl group, an n-hexyl group, an n-heptyl group, an n-octyl group, an n-nonyl group, an n-decyl group, an n-undecyl group, an n-dodecyl group, an n-tridecyl group, an n-tetradecyl group, an n-pentadecyl group, an n-hexadecyl group, an n-heptadecyl group, an n-octadecyl group, and a cyclohexyl group.

In the present specification, the aryl group is preferably an aryl group having 6 to 48 carbon atoms, more preferably an aryl group having 6 to 24 carbon atoms, and still more preferably an aryl group having 6 to 14 carbon atoms, examples thereof include a phenyl group, a naphthyl group, an anthryl group, a pyrenyl group, a phenanthrenyl group, a biphenyl group, and a fluorenyl group.

In the present specification, the heterocyclic group is preferably any of 5- to 7-membered substituted or unsubstituted, saturated or unsaturated, aromatic or non-aromatic, monocyclic or fused heterocyclic groups. The heterocyclic group is preferably a heterocyclic group having a ring-constituting atom selected from a carbon atom, a nitrogen atom, an oxygen atom and a sulfur atom and having at least one hetero atom selected from a nitrogen atom, an oxygen atom and a sulfur atom, and more preferably a 5- or 6-membered aromatic heterocyclic group having 3 to 30 carbon atoms. Examples of the heterocyclic group include a furyl group, a benzofuryl group, a dibenzofuryl group, a thienyl group, a benzothienyl group, a dibenzothienyl group, a pyridyl group, a pyrimidinyl group, a quinolyl group, an isoquinolyl group, an acridinyl group, a phenanthridinyl group, a pteridinyl group, a pyrazinyl group, a quinoxalinyl group, a pyrimidinyl group, a quinazolyl group, a pyridazinyl group, a cinnolinyl group, a phthalazinyl group, a triazinyl group, an oxazolyl group, a benzoxazolyl group, a thiazolyl group, a benzothiazolyl group, an imidazolyl group, a benzimidazolyl group, a pyrazolyl group, an indazolyl group, an isoxazolyl group, a benzisoxazolyl group, an isothiazolyl group, a benzisothiazolyl group, an oxadiazolyl group, a thiadiazolyl group, a triazolyl group, a tetrazolyl group, a furyl group, a thienyl group, a pyrrolyl group, an indolyl group, an imidazopyridinyl group, and a carbazolyl group.

In the present specification, the acyl group is preferably a linear or branched alkanoyl group having 2 to 15 carbon atoms, and examples thereof include an acetyl group, a propionyl group, a butyryl group, an isobutyryl group, a valeryl group, an isovaleryl group, a pivaloyl group, a hexanoyl group, a heptanoyl group, and a benzoyl group.

In the present specification, the alkoxy group is preferably an alkoxy group having 1 to 20 carbon atoms, and examples thereof include a methoxy group, an ethoxy group, a propoxy group, an n-butoxy group, a pentyloxy group, a hexyloxy group, and a heptyloxy group.

In the present specification, the aryloxy group is preferably an aryloxy group having 6 to 14 carbon atoms, and examples thereof include a phenoxy group, a naphthoxy group, and an anthryloxy group.

The alkylthio group is preferably an alkylthio group having 1 to 30 carbon atoms, and examples thereof include a methylthio group, an ethylthio group, and an n-hexadecylthio group.

The arylthio group is preferably an arylthio group having 6 to 30 carbon atoms, and examples thereof include a phenylthio group, a p-chlorophenylthio group, and an m-methoxyphenylthio group.

In the present specification, examples of the halogen atom include a fluorine atom, a chlorine atom, a bromine atom, and an iodine atom.

In the present specification, examples of the aromatic ring include aromatic hydrocarbon rings such as a benzene ring, a naphthalene ring, an anthracene ring, a phenanthrene ring, a pyrene ring, a perylene ring, and a terylene ring; aromatic heterocyclic rings such as an indene ring, an azulene ring, a pyridine ring, a pyrazine ring, a pyrimidine ring, a pyrazole ring, a pyrazolidine ring, a thiazolidine ring, an oxazolidine ring, a pyran ring, a chromene ring, a pyrrole ring, a pyrrolidine ring, a benzimidazole ring, an imidazoline ring, an imidazolidine ring, an imidazole ring, a pyrazole ring, a triazole ring, a triazine ring, a diazole ring, an indoline ring, a thiophene ring, a thienothiophene ring, a furan ring, an oxazole ring, an oxadiazole ring, a thiazine ring, a thiazole ring, an indole ring, a benzothiazole ring, a benzothiadiazole ring, a naphthothiazole ring, a benzoxazole ring, a naphthoxazole ring, an indolenine ring, a benzindolenine ring, a pyrazine ring, a quinoline ring, and a quinazoline ring; and fused aromatic rings such as a fluorene ring and a carbazole ring; among which aromatic rings having 5 to 16 carbon atoms (aromatic rings and fused rings containing aromatic rings) are preferable.

In addition, the aromatic ring may have a substituent, and the term "aromatic ring" means both an aromatic ring having a substituent and an aromatic ring having no substituent. As the substituent of the aromatic ring, the substituents described in Substituent group A to be mentioned later can be mentioned.

In the present specification, examples of the amino group include an amino group; an alkyl-substituted amino group such as a mono- or dimethylamino group, a mono- or diethylamino group, or a mono or di(n-propyl)amino group; an amino group substituted with an aromatic residue such as a mono- or diphenylamino group or a mono- or a dinaphthylamino group; an amino group substituted with one alkyl group and one aromatic residue, such as a monoalkylmonophenylamino group; a benzylamino group, an acetylamino group, and a phenylacetylamino group. Here, the aromatic residue means a group in which one hydrogen atom has been removed from an aromatic ring, and the aromatic ring is as described hereinabove.

The alkyl group, aryl group, heterocyclic group, ethenyl group, ethynyl group, amino group, acyl group, alkoxy group, aryloxy group, alkylthio group, or arylthio group represented by $R^{11}$ to $R^{15}$ may have a substituent. Examples of the substituent include the substituents described in Substituent group A below.

Substituent Group A:
 a sulfamoyl group, a cyano group, an isocyano group, a thiocyanato group, an isothiocyanato group, a nitro group, a nitrosyl group, a halogen atom, a hydroxy group, an amino group, a mercapto group, an amido group, an alkoxy group, an aryloxy group, an alkylthio group, an arylthio group, a carbamoyl group, an acyl group, an aldehyde group, a carbonyl group, an aryl group, an alkyl group, an alkyl group substituted with a halogen atom, an ethenyl group, an ethynyl group, a silyl group, and a trialkylsilyl group (such as a trimethylsilyl group).

The alkyl group, aryl group, heterocyclic group, hydroxy group, alkoxy group, aryloxy group, alkylthio group, arylthio group, ethenyl group, or ethynyl group represented by $X^1$ and $X^2$ may have a substituent. Examples of the substituent include the substituents described in Substituent group A.

The aryl group or heterocyclic group represented by $Ar^1$ and $Ar^2$ may have a substituent. Examples of the substituent include the substituents described in Substituent group A.

The alkyl group, aryl group, heterocyclic group, ethenyl group, ethynyl group, amino group, acyl group, alkoxy group, aryloxy group, alkylthio group, or arylthio group represented by $R^{111}$ to $R^{116}$ may have a substituent. Examples of the substituent include the substituents described in Substituent group A.

<Compound Represented by Formula (1)>

In Formula (1), $R^{11}$ to $R^{15}$ each independently represent a hydrogen atom, a halogen atom, an alkyl group, an aryl group, a heterocyclic group, an ethenyl group, an ethynyl group, an amino group, an acyl group, an alkoxy group, an aryloxy group, an alkylthio group, or an arylthio group, each of which may have a substituent. At least three of $R^{11}$ to $R^{15}$ represent atoms or groups other than hydrogen atoms, preferably at least four of $R^{11}$ to $R^{15}$ represent atoms or groups other than hydrogen atoms, and more preferably all of $R^{11}$ to $R^{15}$ represent atoms or groups other than hydrogen atoms.

$R^{11}$ and $R^{15}$ may be the same or different atoms or groups, but are preferably the same atoms or groups. $R^{12}$ and $R^{14}$ may be the same or different atoms or groups, but are preferably the same atoms or groups.

$R^{11}$ and $R^{15}$ preferably represent a hydrogen atom, a halogen atom, an alkyl group, an aryl group, a heterocyclic group, an ethenyl group, or an ethynyl group, more preferably an aryl group, a heterocyclic group, an ethenyl group, or an ethynyl group, still more preferably an aryl group or an ethynyl group, and particularly preferably an aryl group, each of which may have a substituent.

$R^{12}$ and $R^{14}$ preferably represent an alkyl group, which may have a substituent.

$R^{13}$ preferably represents an aryl group, which may have a substituent.

In Formula (1), $X^1$ and $X^2$ each independently represent a halogen atom, an alkyl group, an aryl group, a heterocyclic group, a hydroxy group, an alkoxy group, an aryloxy group, an alkylthio group, an arylthio group, an ethenyl group, or an ethynyl group, each of which may have a substituent, and $X^1$ and $X^2$ may be bonded to each other to form a ring.

$X^1$ and $X^2$ preferably represent a halogen atom or an alkoxy group and more preferably a halogen atom. $X^1$ and $X^2$ are still more preferably a fluorine atom, a methoxy group, an ethoxy group, an isopropyloxy group, or a t-butyloxy group, each of which is also preferably substituted with a fluorine atom or an alkoxy group.

In Formula (1), $Ar^1$ and $Ar^2$ each independently represent an aryl group or a heterocyclic group, each of which may have a substituent.

In Formula (1), $L^1$ and $L^2$ each independently represent any one of Formula (L-1), Formula (L-2), Formula (L-3) or Formula (L-4).

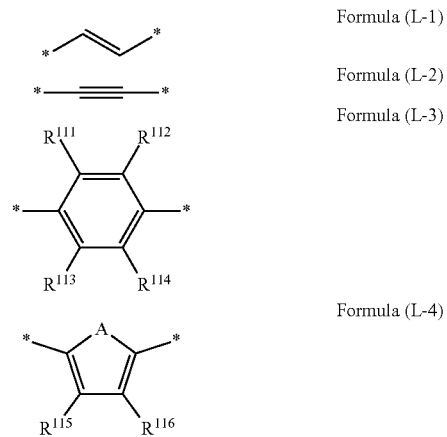

Formula (L-1)

Formula (L-2)

Formula (L-3)

Formula (L-4)

In the formulae, $R^{111}$ to $R^{116}$ each independently represent a hydrogen atom, a halogen atom, an alkyl group, an aryl group, a heterocyclic group, an ethenyl group, an ethynyl group, an amino group, an acyl group, an alkoxy group, an aryloxy group, an alkylthio group, or an arylthio group, each of which may have a substituent. A represents —O—, —S—, or —NH—.

$L^1$ and $L^2$ preferably represent any one of Formula (L-1) or Formula (L-2) and more preferably Formula (L-1).

$R^{111}$ to $R^{116}$ are preferably hydrogen atoms.

<As to Compound Represented by Formula (2)>

A preferred example of the compound represented by Formula (1) is a compound represented by Formula (2).

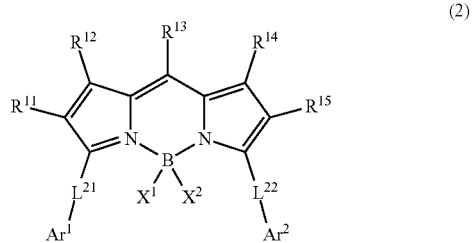

(2)

In the formula, $R^{11}$ to $R^{15}$, $X^1$, $X^2$, $Ar^1$, and $Ar^2$ are as defined in Formula (1), and the preferred ranges thereof are also the same as the preferred ranges in Formula (1). $L^{21}$ and $L^{22}$ each independently represent a group represented by Formula (L-1) or Formula (L-2). $L^{21}$ and $L^{22}$ preferably represent Formula (L-1).

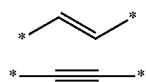

Formula (L-1)

Formula (L-2)

<As to Compound Represented by Formula (3)>

A preferred example of the compound represented by Formula (1) is a compound represented by Formula (3).

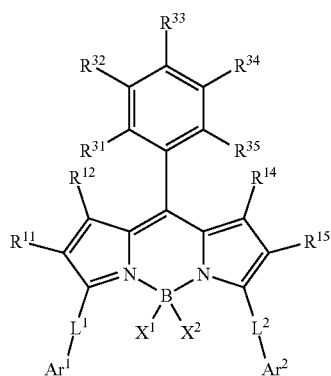

(3)

In Formula (3), $R^{11}$, $R^{12}$, $R^{14}$, $R^{15}$, $X^1$, $X^2$, $A^{r1}$, $A^{r2}$, $L^1$, and $L^2$ are as defined in Formula (1), and preferred ranges thereof are also the same as the preferred ranges in Formula (1). Provided that at least two of $R^{11}$, $R^{12}$, $R^{14}$ and $R^{15}$ are atoms or groups other than hydrogen atoms, preferably at least three of $R^{11}$, $R^{12}$, $R^{14}$ and $R^{15}$ are atoms or groups other than hydrogen atoms, and more preferably $R^{11}$, $R^{12}$, $R^{14}$ and $R^{15}$ are atoms or groups other than hydrogen atoms.

In Formula (3), $R^{31}$ to $R^{35}$ each independently represent a hydrogen atom, a halogen atom, an alkyl group, an aryl group, a heterocyclic group, an ethenyl group, an ethynyl group, an amino group, a cyano group, an acyl group, an alkoxy group, an aryloxy group, an alkylthio group, or an arylthio group, each of which may have a substituent (examples of the substituent include the substituents described in Substituent group A), and any one of $R^{31}$, $R^{32}$, $R^{34}$ or $R^{35}$ is a group consisting of two or more atoms. The group consisting of two or more atoms is preferably an alkyl group, an aryl group, an ethenyl group, an ethynyl group, an amino group, a cyano group, or an alkoxy group and more preferably an alkyl group. Among the alkyl groups, an alkyl group consisting only of carbon atoms and hydrogen atoms or an alkyl group substituted with a halogen atom is preferable; and an alkyl group having 1 to 6 carbon atoms and consisting only of carbon atoms and hydrogen atoms or an alkyl group substituted with a fluorine atom is more preferable; a methyl group, an isopropyl group, a t-butyl group, or a trifluoromethyl group is still more preferable; and a methyl group is particularly preferable.

<As to Compound Represented by Formula (4)>

A preferred example of the compound represented by Formula (1) is a compound represented by Formula (4).

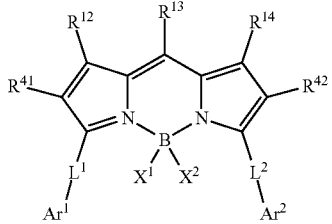

(4)

In Formula (4), $R^{12}$, $R^{13}$, $R^{14}$, $X^1$, $X^2$, $Ar^1$, $Ar^2$, $L^1$ and $L^2$ are as defined in Formula (1), and the preferred ranges thereof are also the same as the preferred ranges in Formula (1). Provided that at least one of $R^{12}$, $R^{13}$ or $R^{14}$ is an atom or group other than a hydrogen atom, preferably at least two of $R^{12}$, $R^{13}$ and $R^{14}$ are atoms or groups other than hydrogen atoms, and more preferably $R^{12}$, $R^{13}$, and $R^{14}$ are atoms or groups other than hydrogen atoms.

In Formula (4), $R^{41}$ and $R^{42}$ each independently represent an aryl group, a heterocyclic group, an ethenyl group, or an ethynyl group, each of which may have a substituent. Examples of the substituent include the substituents described in Substituent group A. $R^{41}$ and $R^{42}$ are each independently preferably an aryl group, an ethenyl group, or an ethynyl group, and from the viewpoint of improving a quantum yield, an aryl group is preferable, and from the viewpoint of increasing a wavelength, an ethenyl group or an ethynyl group is preferable. In the case of being an aryl group, it is preferred to have at least one substituent at the ortho or meta position of the aryl group, and it is more preferred to have at least one substituent at the ortho position of the aryl group. The number of the substituent for the aryl group is preferably 1 to 3 and more preferably 2 or 3. The substituent for the aryl group is preferably an alkyl group, more preferably a methyl group, an isopropyl group, or a t-butyl group, and still more preferably a methyl group.

<As to Compound Represented by Formula (7)>

A preferred example of the compound represented by Formula (4) is a compound represented by Formula (7).

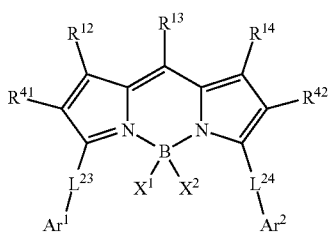

(7)

In Formula (7), $R^{12}$, $R^{13}$, $R^{14}$, $R^{41}$, $R^{42}$, $X^1$, $X^2$, $Ar^1$, $Ar^2$ are as defined in Formula (4), and the preferred ranges thereof are also the same as the preferred ranges in Formula (4). Provided that at least one of $R^{12}$, $R^{13}$ or $R^{14}$ is an atom or group other than a hydrogen atom, preferably at least two of $R^{12}$, $R^{13}$ and $R^{14}$ are atoms or groups other than hydrogen atoms, and more preferably $R^{12}$, $R^{13}$, and $R^{14}$ are atoms or groups other than hydrogen atoms. $L^{23}$ and $L^{24}$ are as defined in $L^{21}$ and $L^{22}$, and preferred ranges thereof are also the same as in $L^{21}$ and $L^{22}$.

<As to Compound Represented by Formula (8)>

A preferred example of the compound represented by Formula (7) is a compound represented by Formula (8).

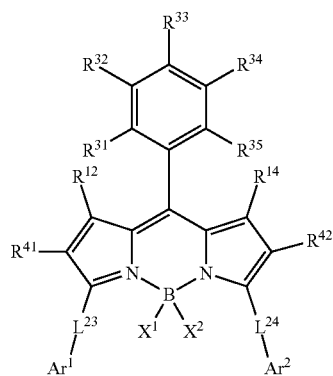
(8)

In Formula (8), $R^{12}$, $R^{14}$, $R^{41}$, $R^{42}$, $X^1$, $X^2$, $Ar^1$, $Ar^2$, $L^{23}$, and $L^{24}$ are as defined in Formula (7), and preferred ranges thereof are also the same as the preferred ranges in Formula (7). Provided that at least one of $R^{12}$ or $R^{14}$ is an atom or group other than a hydrogen atom, and preferably $R^{12}$ and $R^{14}$ are atoms or groups other than hydrogen atoms. $R^{31}$ to $R^{35}$ each independently represent a hydrogen atom, a halogen atom, an alkyl group, an aryl group, a heterocyclic group, an ethenyl group, an ethynyl group, an amino group, an acyl group, a cyano group, an alkoxy group, an aryloxy group, an alkylthio group, or an arylthio group, each of which may have a substituent, and any one of $R^{31}$, $R^{32}$, $R^{33}$, $R^{34}$ or $R^{35}$ is a hydrogen atom. $R^{31}$ to $R^{35}$ preferably represent a hydrogen atom, a halogen atom, an alkyl group, an aryl group, an amino group, a cyano group, an alkoxy group, or an aryloxy group, more preferably a hydrogen atom, a halogen atom, an alkyl group, an aryl group, an amino group, or a cyano group, more preferably a hydrogen atom, a fluorine atom, an alkyl group, or a cyano group, and particularly preferably a hydrogen atom or a fluorine atom. Most preferably, $R^{33}$ is a hydrogen atom, and $R^{31}$, $R^{32}$, $R^{34}$, and $R^{35}$ are fluorine atoms.

<As to Compound Represented by Formula (9)>

A preferred example of the compound represented by Formula (8) is a compound represented by Formula (9).

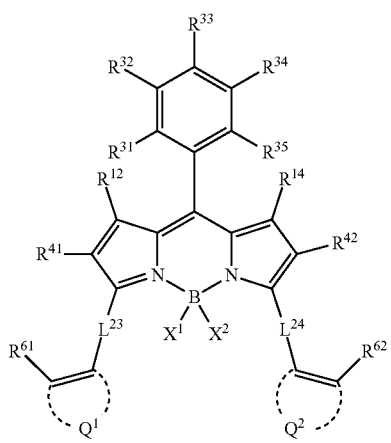
(9)

In Formula (9), $R^{12}$, $R^{14}$, $R^{41}$, $R^{42}$, $R^{31}$ to $R^{35}$, $X^1$, $X^2$, $Ar^1$, $Ar^2$, $L^{23}$, and $L^{24}$ are as defined in Formula (8) and preferred ranges thereof are also the same as the preferred ranges in Formula (8). Provided that at least one of $R^{12}$ or $R^{14}$ is an atom or group other than a hydrogen atom, and preferably $R^{12}$ and $R^{14}$ are atoms or groups other than hydrogen atoms. $R^{61}$ and $R^{62}$ each independently represent an alkyl group, an alkenyl group, an aryl group, a heteroaryl group, an amino group, an acyl group, an alkoxy group, an aryloxy group, an alkylthio group, or an arylthio group, each of which may have a substituent, $Q^1$ and $Q^2$ each independently represent an aromatic hydrocarbon ring or an aromatic heterocyclic ring, each of which may have a substituent, and $R^{61}$ and $Q^1$, and $R^{62}$ and $Q^2$ each may form a fused ring structure.

$R^{61}$ and $R^{62}$ preferably represent an alkyl group, an aryl group, a heteroaryl group, an amino group, an acyl group, an alkoxy group, or an aryloxy group, more preferably an alkyl group, an aryl group, a heteroaryl group, an amino group, an acyl group, an alkoxy group, or an aryloxy group, still more preferably an alkyl group, an aryl group, or an alkoxy group, and particularly preferably an alkyl group. Among the alkyl groups, a methyl group, an ethyl group, an isopropyl group, or a t-butyl group is preferable, and a methyl group is particularly preferable.

$Q^1$ and $Q^2$ each independently represent an aromatic hydrocarbon ring or an aromatic heterocyclic ring, each of which may have a substituent. Examples of the substituent include the substituents described in Substituent group A. $Q^1$ and $Q^2$ are each preferably an aromatic hydrocarbon ring, more preferably a benzene ring, a naphthalene ring, an anthracene ring, a phenanthrene ring, or a pyrene ring, still more preferably a benzene ring or a naphthalene ring, and particularly preferably a benzene ring.

As the group forming a fused ring structure with $R^{61}$ and $Q^1$ and the group forming a fused ring structure with $R^{62}$ and $Q^2$, a naphthalene ring and an anthracene ring are preferable.

As the group containing $R^{61}$ and forming $Q^1$ and the group containing $R^{62}$ and forming $Q^1$, a tolyl group, a xylyl group, or a mesityl group is preferable; a xylyl group or a mesityl group is more preferable; a xylyl group having methyl groups at both ends of the ortho position relative to the bonding position with $L^{23}$ or $L^{24}$, or a mesityl group having methyl groups at both ends of the ortho position and at the para position relative to the bonding position with $L^{23}$ or $L^{24}$ is still more preferable; and a mesityl group having methyl groups at both ends of the ortho position and at the para position relative to the bonding position with $L^{23}$ or $L^{24}$ is particularly preferable.

<As to Compound Represented by Formula (5)>

A preferred example of the compound represented by Formula (1) is a compound represented by Formula (5).

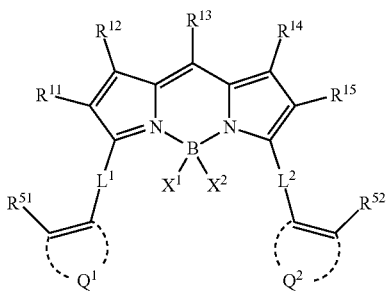
(5)

In Formula (5), $R^{11}$ to $R^{15}$, $X^1$, $X^2$, $L^1$, and $L^2$ are as defined in Formula (1), and the preferred ranges thereof are also the same as the preferred ranges in Formula (1).

In Formula (5), $R^{51}$ and $R^{52}$ each independently represent an alkyl group, an aryl group, a heteroaryl group, an amino group, an acyl group, an alkoxy group, an aryloxy group, an alkylthio group, or an arylthio group, each of which may have a substituent. Examples of the substituent include the substituents described in Substituent group A. $R^{51}$ and $R^{52}$ are each independently preferably an alkyl group, an aryl group, a heteroaryl group, an amino group, an acyl group, an alkoxy group, or an aryloxy group, more preferably an alkyl group, an aryl group, a heteroaryl group, an amino group, an acyl group, an alkoxy group, or an aryloxy group, and still more preferably an alkyl group or an alkoxy group. From the viewpoint of improving a quantum yield, it is preferably an alkyl group, more preferably a methyl group, an ethyl group, an isopropyl group, or a t-butyl group, and particularly preferably a methyl group. From the viewpoint of increasing a wavelength, it is preferably an alkoxy group, more preferably a methoxy group, an ethoxy group, an isopropyloxy group, or a t-butyloxy group, and particularly preferably a methoxy group.

$Q^1$ and $Q^2$ each independently represent an aromatic hydrocarbon ring or an aromatic heterocyclic ring, each of which may have a substituent. Examples of the substituent include the substituents described in Substituent group A. $Q^1$ and $Q^2$ are each preferably an aromatic hydrocarbon ring, more preferably a benzene ring, a naphthalene ring, an anthracene ring, a phenanthrene ring, or a pyrene ring, still more preferably a benzene ring or a naphthalene ring, and particularly preferably a benzene ring. As the group containing $R^{51}$ and forming $Q^1$ and the group containing $R^{52}$ and forming $Q^1$, a tolyl group, a xylyl group, or a mesityl group is preferable; a xylyl group or a mesityl group is more preferable; a xylyl group having methyl groups at both ends of the ortho position relative to the bonding position with $L^1$ or $L^2$, or a mesityl group having methyl groups at both ends of the ortho position and at the para position relative to the bonding position with $L^1$ or $L^2$ is still more preferable; and a mesityl group having methyl groups at both ends of the ortho position and at the para position relative to the bonding position with $L^1$ or $L^2$ is particularly preferable.

<As to Compound Represented by Formula (6)>

The compound represented by Formula (5) is more preferably a compound represented by Formula (6).

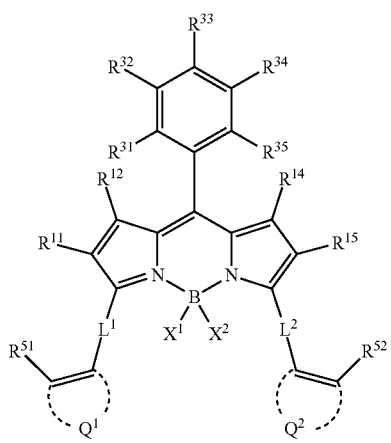

(6)

In Formula (6), $R^{11}$, $R^{12}$, $R^{14}$, $R^{15}$, $R^{51}$, $R^{52}$, $X^1$, $X^2$, $L^1$, $L^2$, $Q^1$, and $Q^2$ are as defined in Formula (5) and the preferred ranges thereof are also the same as the preferred ranges in Formula (5).

In the formula, $R^{11}$, $R^{12}$, $R^{14}$, and $R^{15}$ each independently represent a hydrogen atom, a halogen atom, an alkyl group, an aryl group, a heterocyclic group, an ethenyl group, an ethynyl group, an amino group, an acyl group, an alkoxy group, an aryloxy group, an alkylthio group, or an arylthio group, each of which may have a substituent, and at least two of $R^{11}$, $R^{12}$, $R^{14}$, and $R^{15}$ are atoms or groups other than hydrogen atoms. $X^1$ and $X^2$ each independently represent a halogen atom, an alkyl group, an aryl group, a heterocyclic group, a hydroxy group, an alkoxy group, an aryloxy group, an alkylthio group, an arylthio group, an ethenyl group, or an ethynyl group, each of which may have a substituent, and $X^1$ and $X^2$ may be bonded to each other to form a ring. $R^{31}$ to $R^{35}$ each independently represent a hydrogen atom, a halogen atom, an alkyl group, an aryl group, a heterocyclic group, an ethenyl group, an ethynyl group, an amino group, an acyl group, a cyano group, an alkoxy group, an aryloxy group, an alkylthio group, or an arylthio group, each of which may have a substituent, and any one of $R^{31}$, $R^{32}$, $R^{33}$, $R^{34}$ or $R^{35}$ is a hydrogen atom. $R^{31}$ to $R^{35}$ are as defined in Formula (8), and the preferred ranges thereof are also the same as the preferred ranges in Formula (8).

$R^{51}$ and $R^{52}$ each independently represent an alkyl group, an aryl group, a heteroaryl group, an amino group, an acyl group, an alkoxy group, an aryloxy group, an alkylthio group, or an arylthio group, each of which may have a substituent. $Q^1$ and $Q^2$ each independently represent an aromatic hydrocarbon ring or an aromatic heterocyclic ring, each of which may have a substituent.

$L^1$ and $L^2$ each independently represent any one of Formula (L-1), (L-2), (L-3) or (L-4).

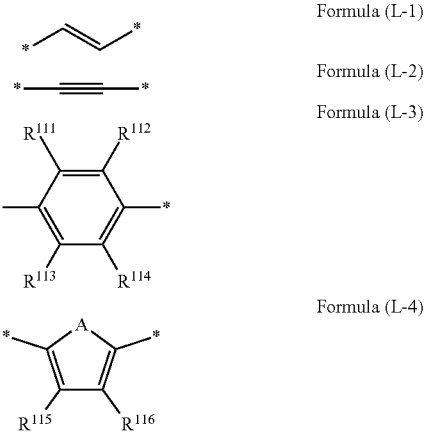

Formula (L-1)

Formula (L-2)

Formula (L-3)

Formula (L-4)

In the formulae, $R^{111}$ to $R^{116}$ each independently represent a hydrogen atom, a halogen atom, an alkyl group, an aryl group, a heterocyclic group, an ethenyl group, an ethynyl group, an amino group, an acyl group, an alkoxy group, an aryloxy group, an alkylthio group, or an arylthio group, each of which may have a substituent. A represents —O—, —S—, or —NH—.

$R^{11}$ and $R^{15}$ are each independently preferably an alkyl group, an aryl group, a heterocyclic group, an ethenyl group, an ethynyl group, or an amino group, more preferably that as defined in $R^{41}$ and $R^{42}$, that is, an aryl group, a heterocyclic group, an ethenyl group, or an ethynyl group, and still more preferably an aryl group, an ethenyl group, or an ethynyl group. From the viewpoint of improving a quantum yield, an aryl group is even more preferable, and from the viewpoint of increasing a wavelength, an ethenyl group or an ethynyl group is even more preferable. In the case of being an aryl group, it is preferred to have at least one substituent at the ortho or meta position of the aryl group, and it is more preferred to have at least one substituent at the ortho position. The number of the substituent for the aryl group is preferably 1 to 3 and more preferably 2 or 3. The substituent for the aryl group is preferably an alkyl group, more preferably a methyl group, an isopropyl group, or a t-butyl group, and still more preferably a methyl group.

<Specific Examples of Compounds Represented by Formulae (1) to (9)>

Specific examples of the compounds represented by Formulae (1) to (9) are shown below. Me represents a methyl group, Et represents an ethyl group, and iPr represents an isopropyl group.

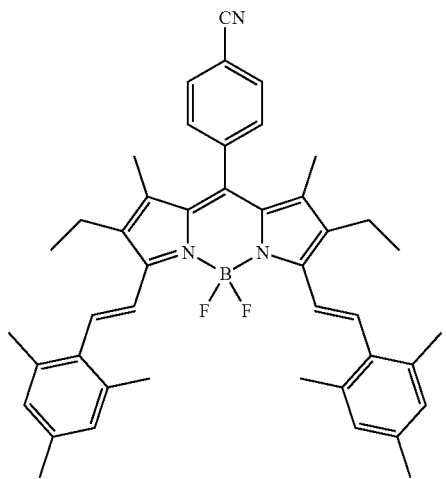

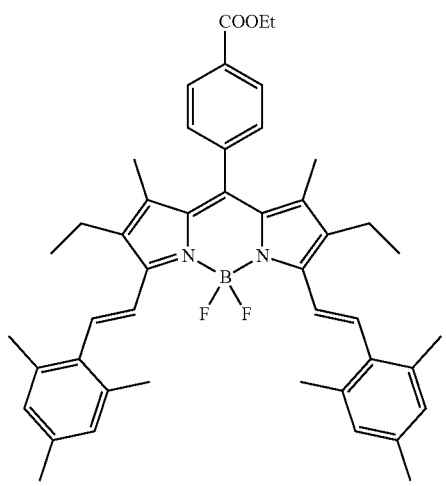

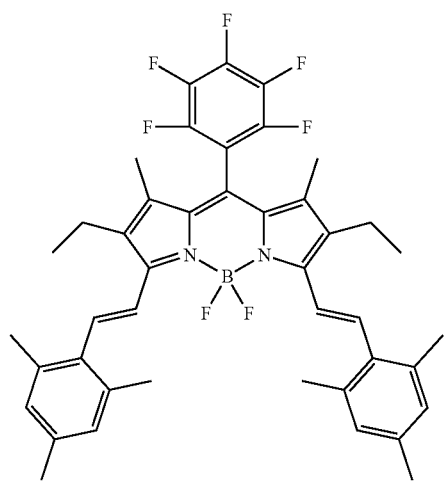

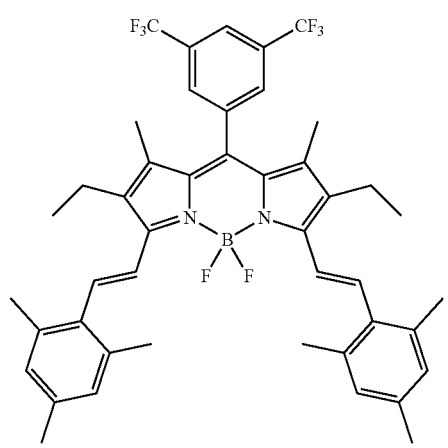

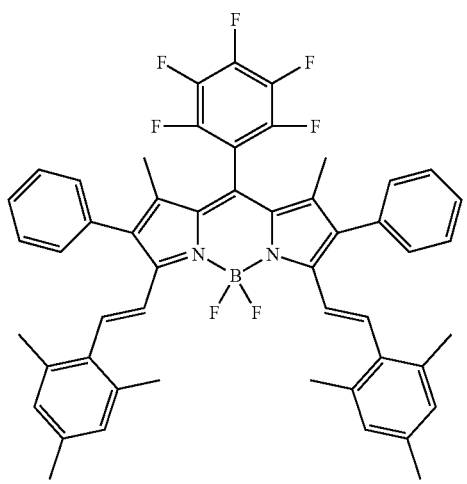

-continued
F-6
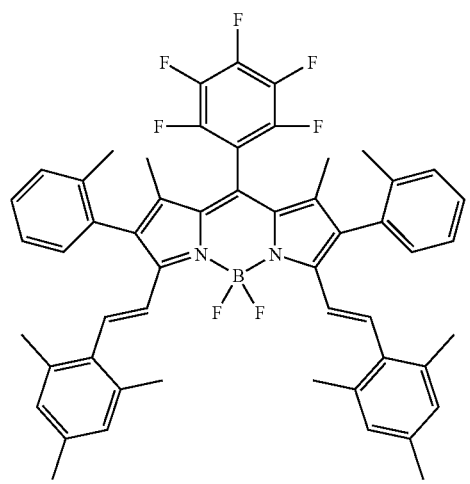
F-7
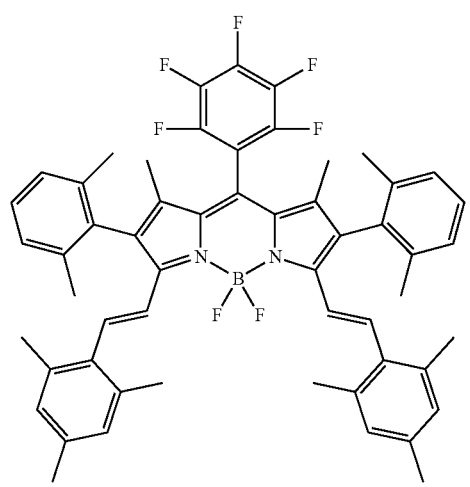
F-8
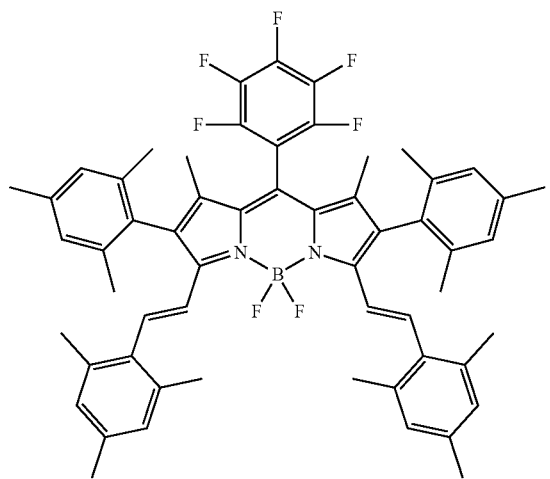
F-9
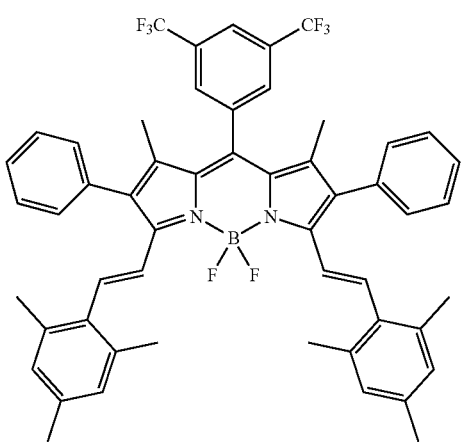
F-10
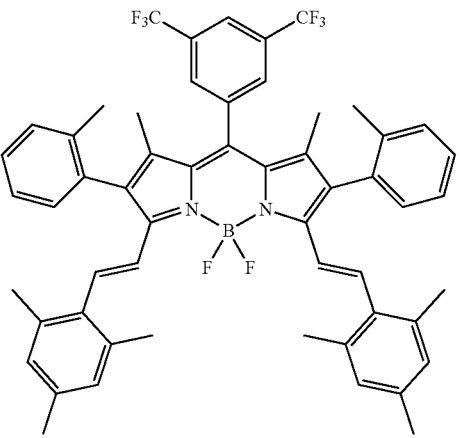
F-11
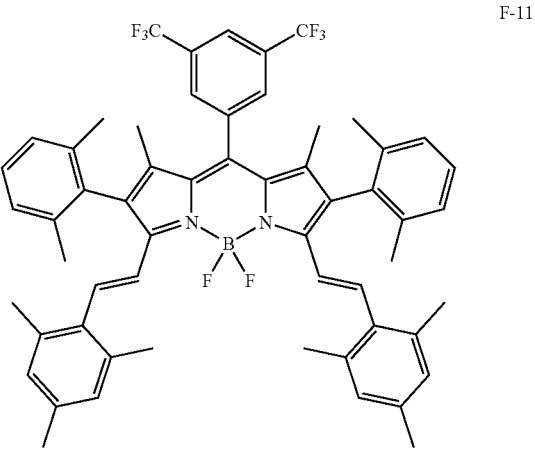

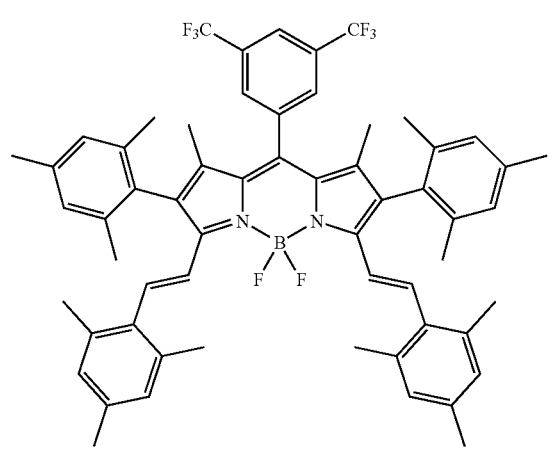
F-12
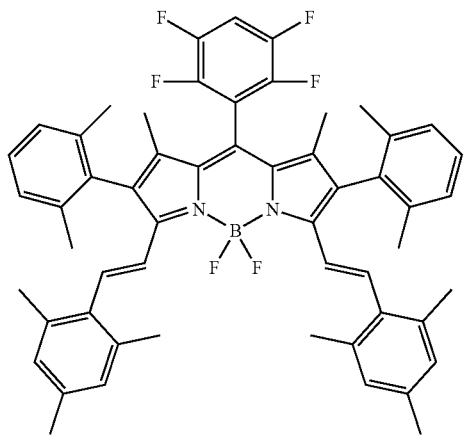
F-15
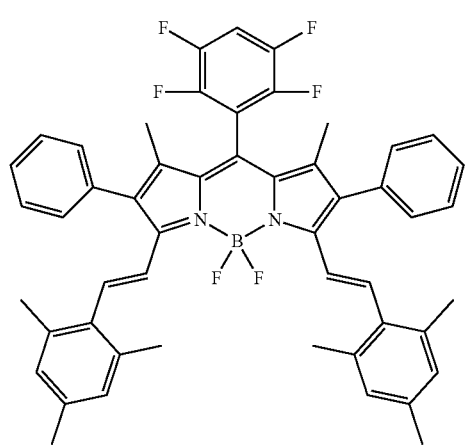
F-13
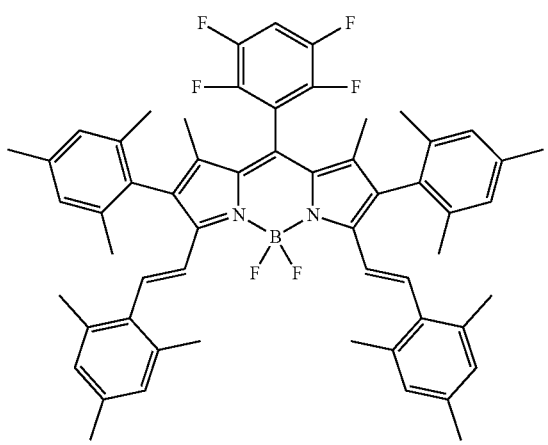
F-16
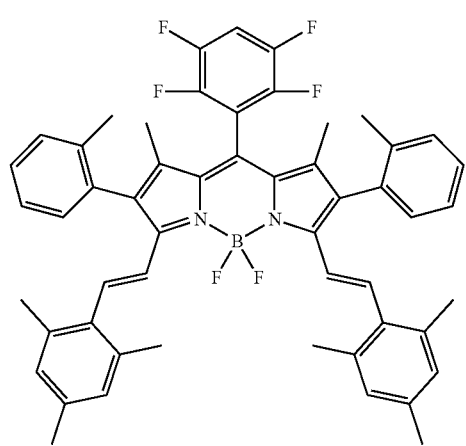
F-14
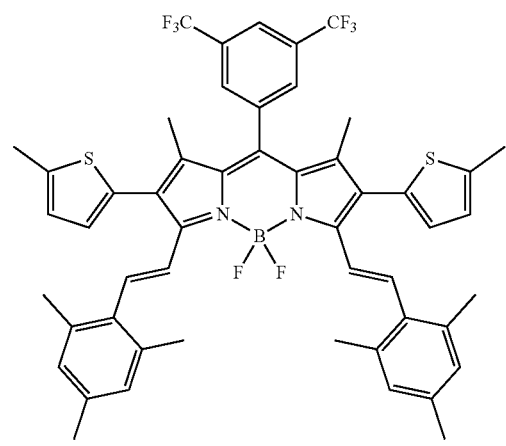
F-17

-continued
F-18
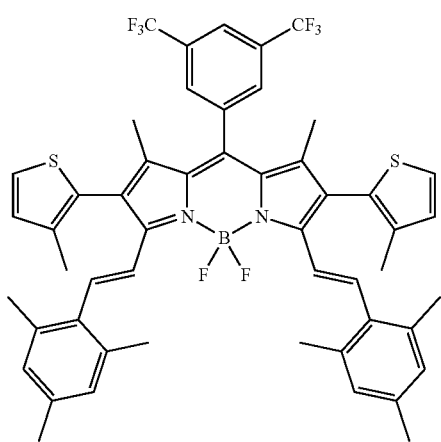
F-19
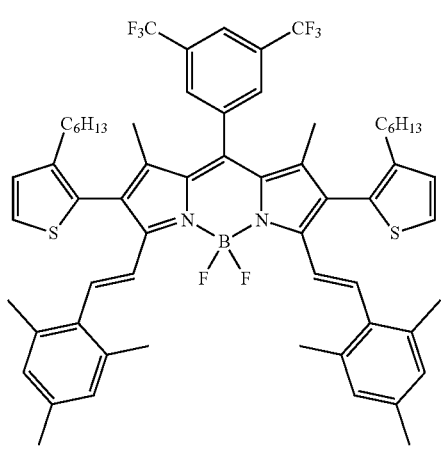
F-20
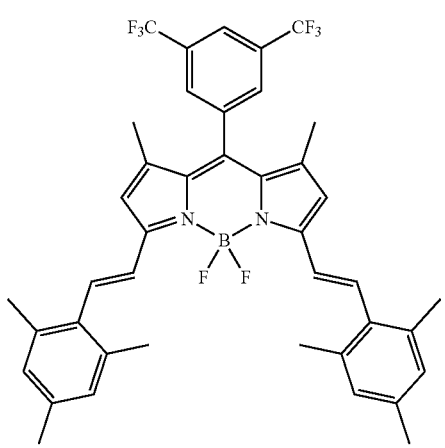
-continued
F-21
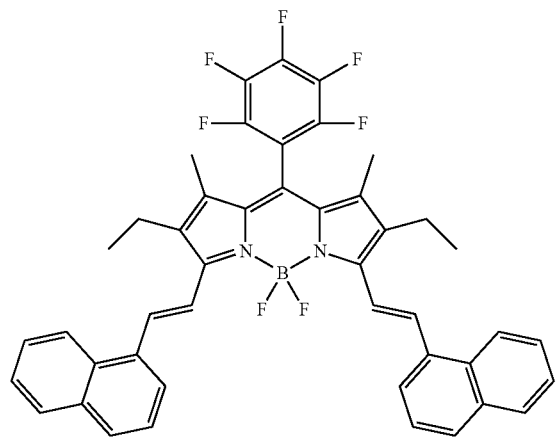
F-22
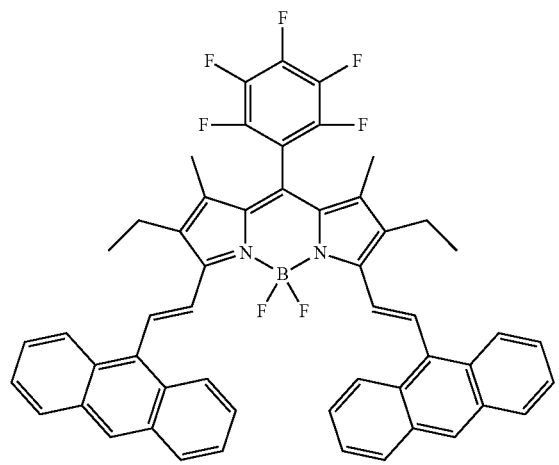
F-23
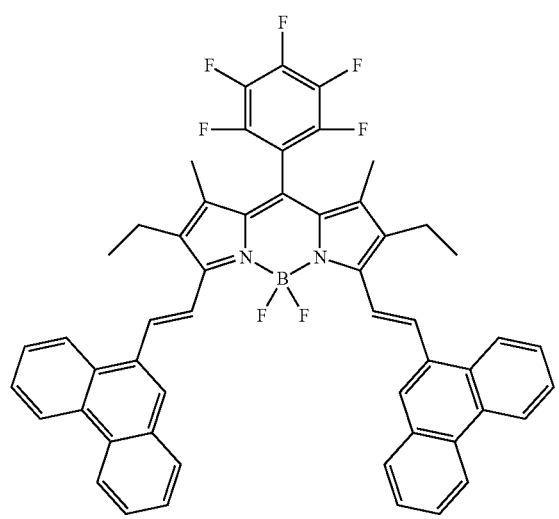

F-24
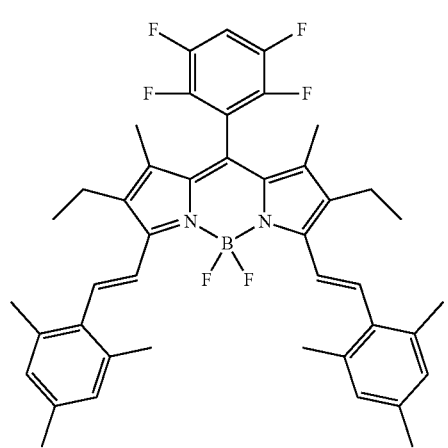
F-25
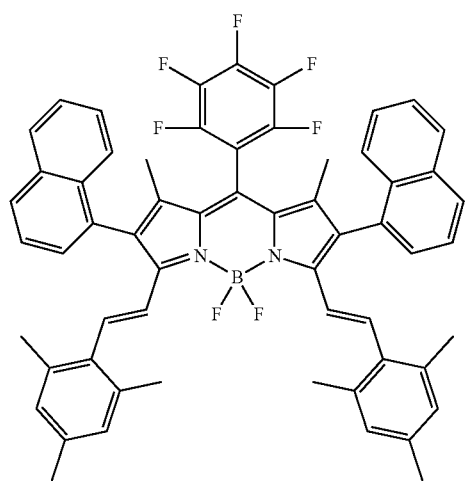
F-26
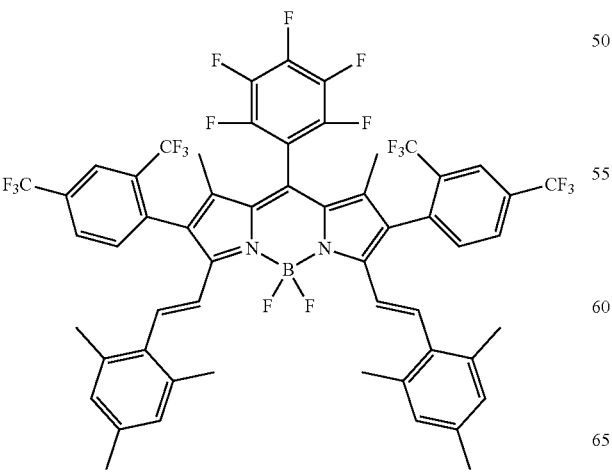
F-27
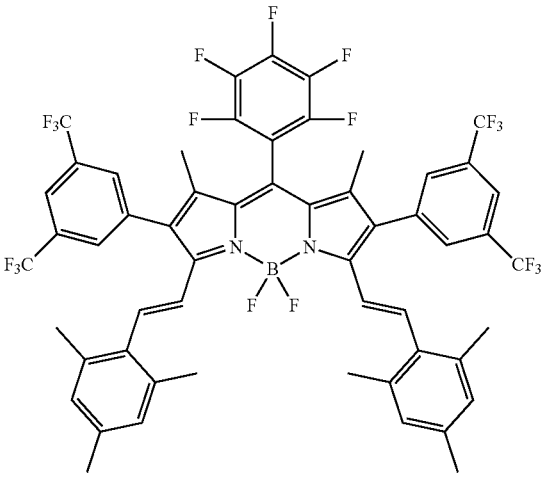
F-28
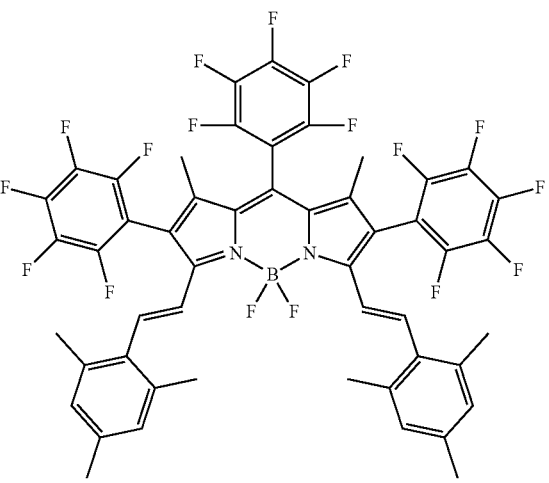
F-29
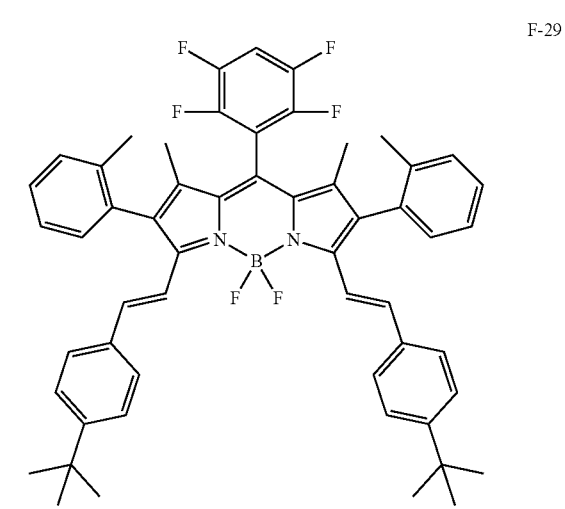

F-30
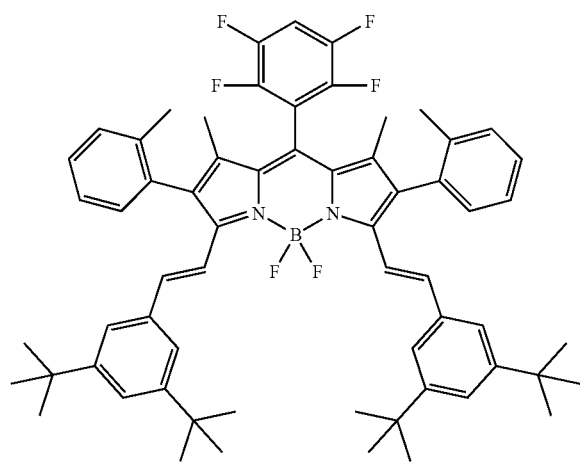
F-31
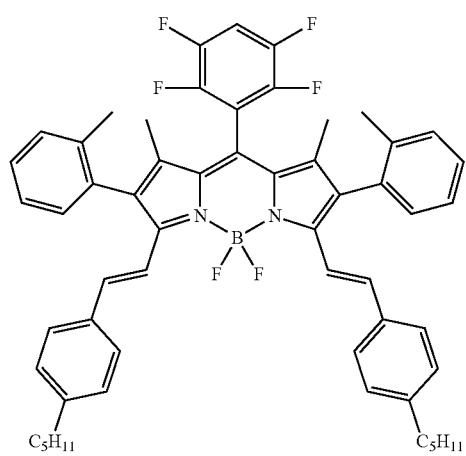
F-32
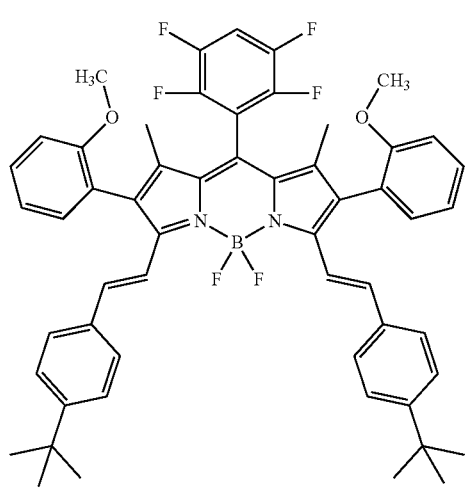
F-33
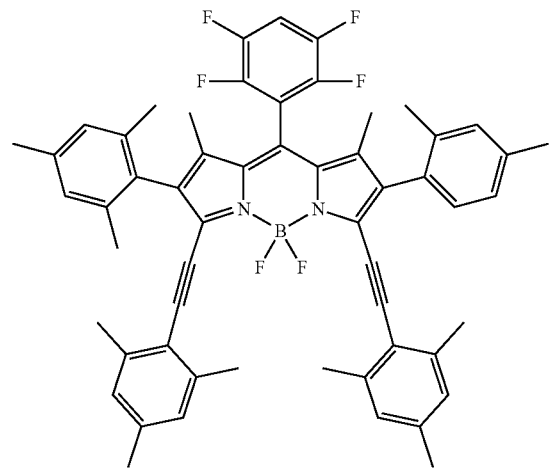
F-34
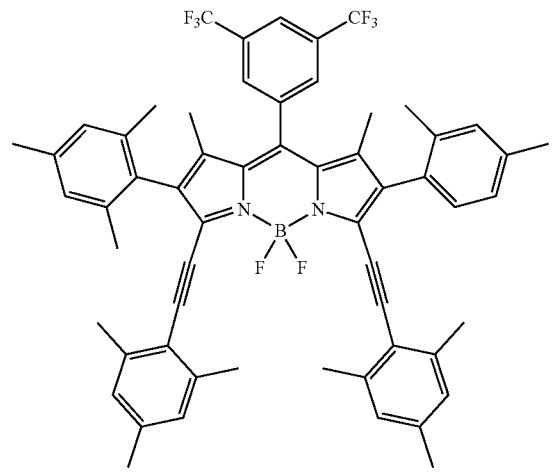
F-35
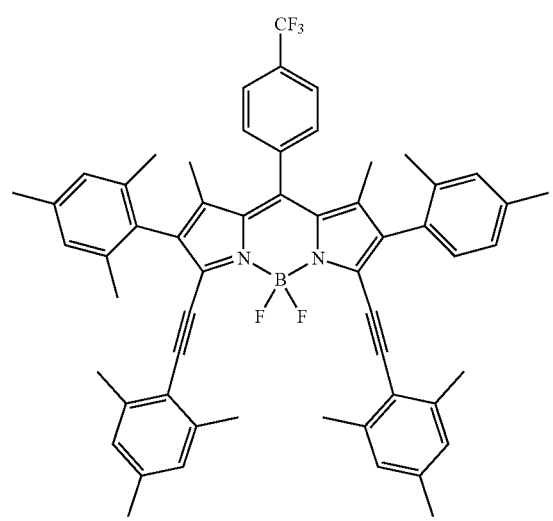

F-36
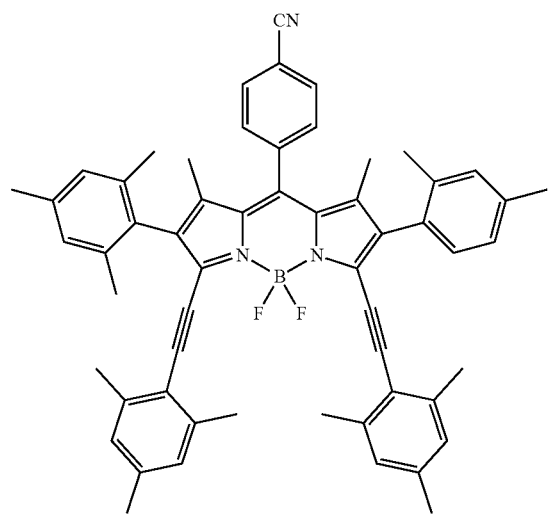
F-37
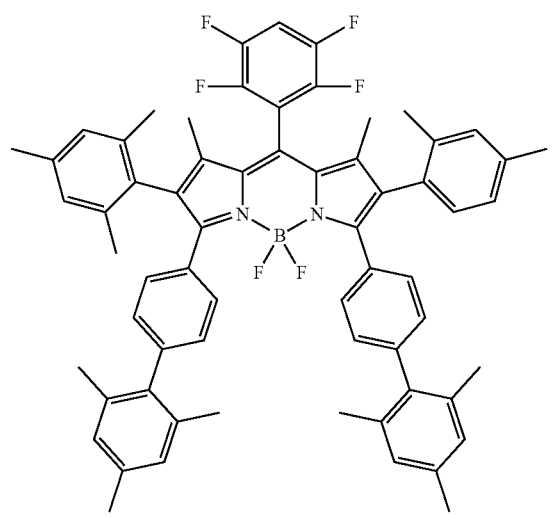
F-38
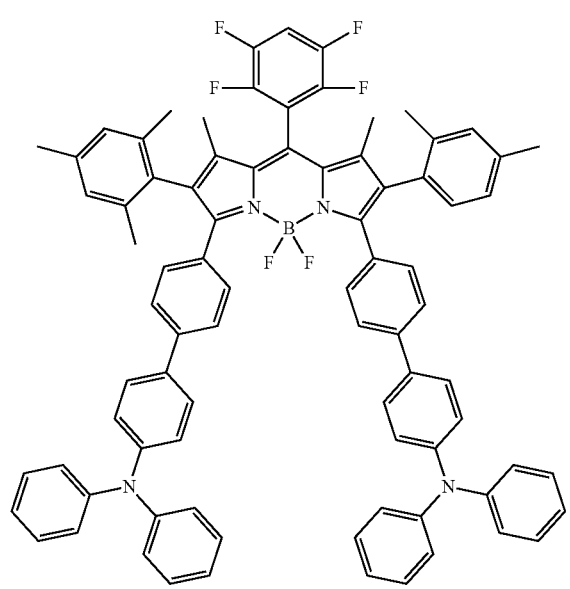
F-39
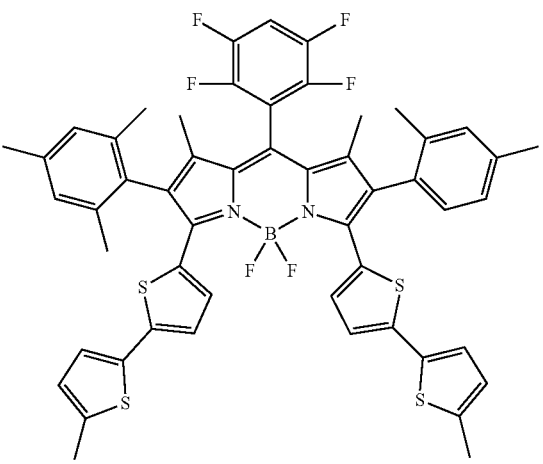
F-40
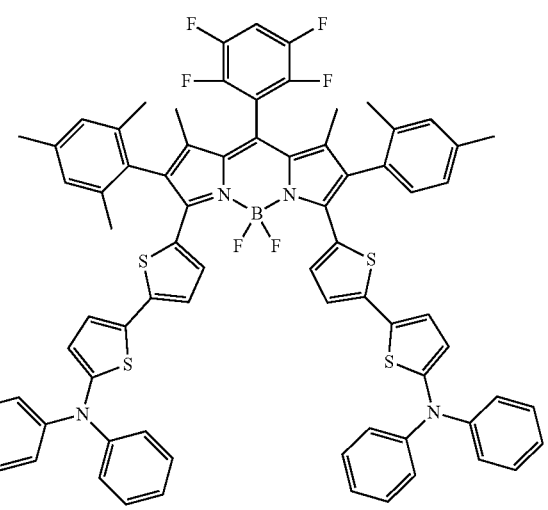
F-41
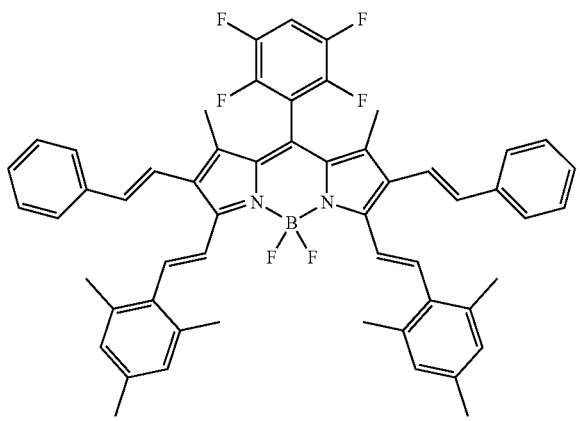

F-42
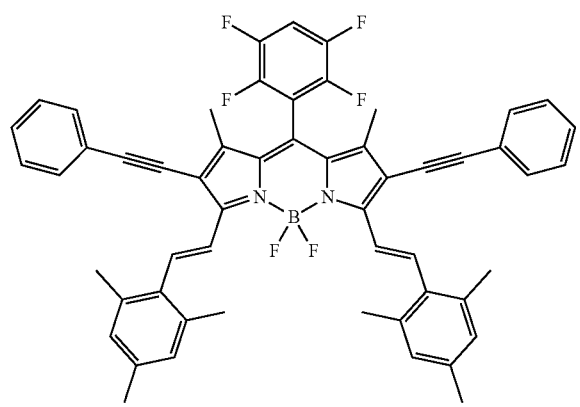
F-43
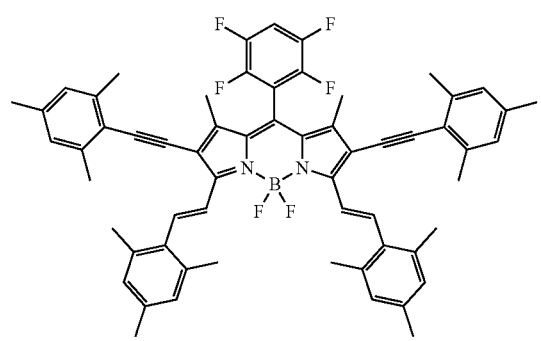
F-44
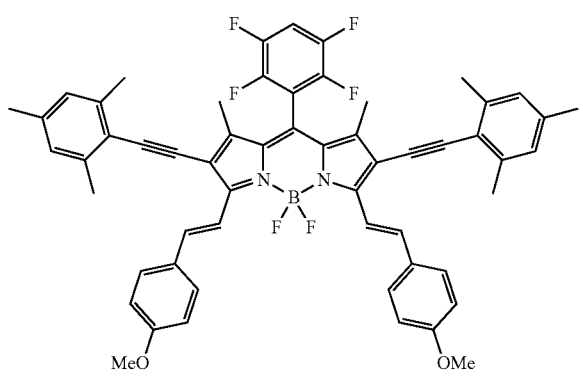
F-45
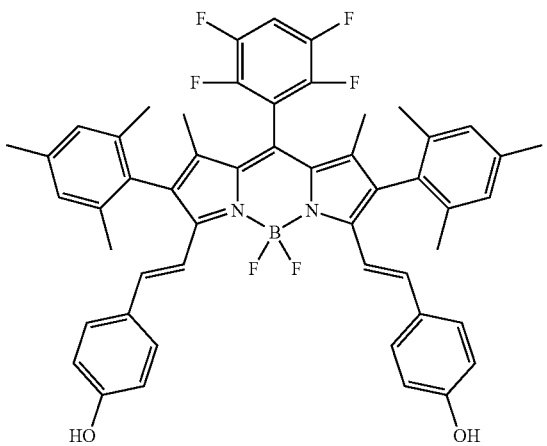
F-46
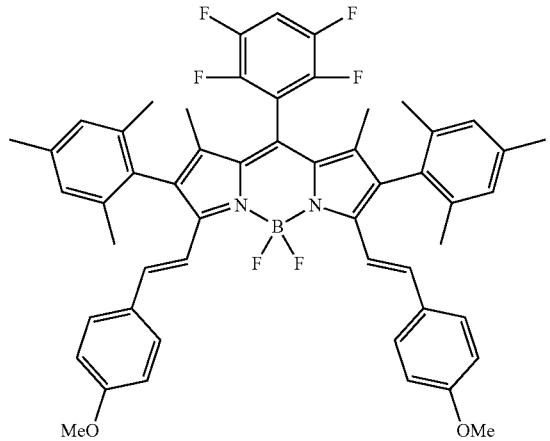
F-47
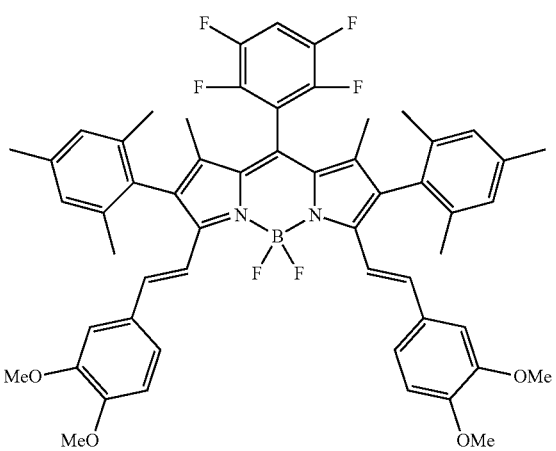
F-48

F-49
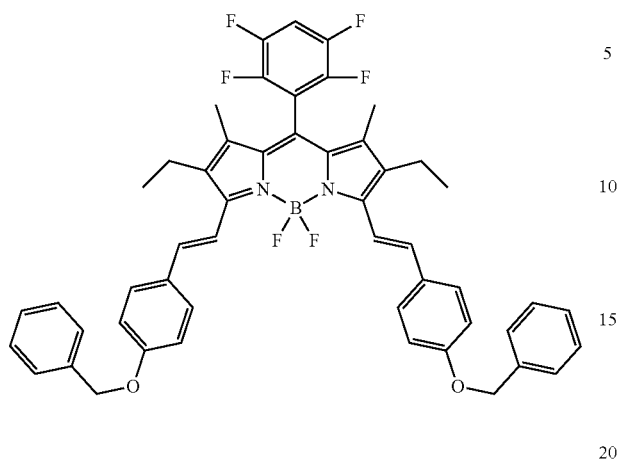
F-52
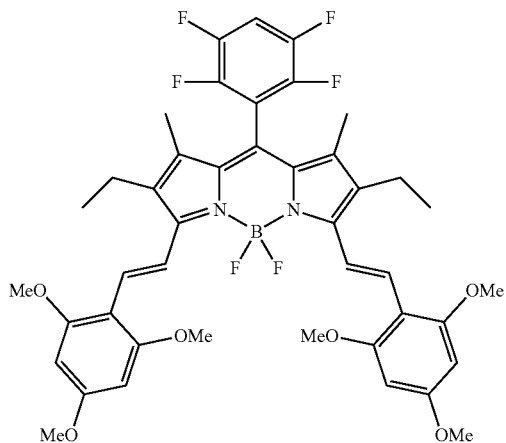
F-50
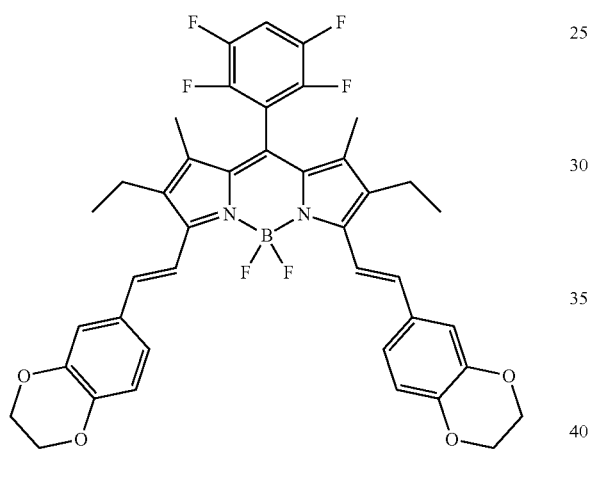
F-53
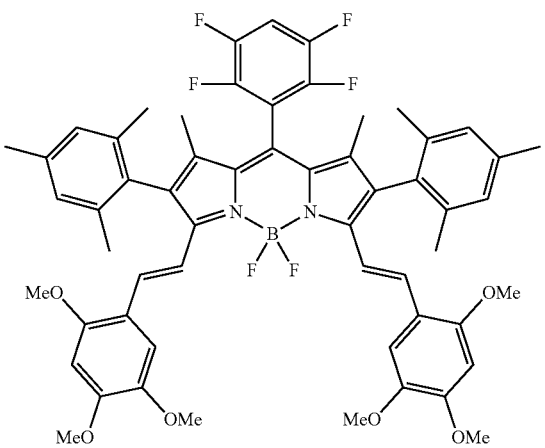
F-51
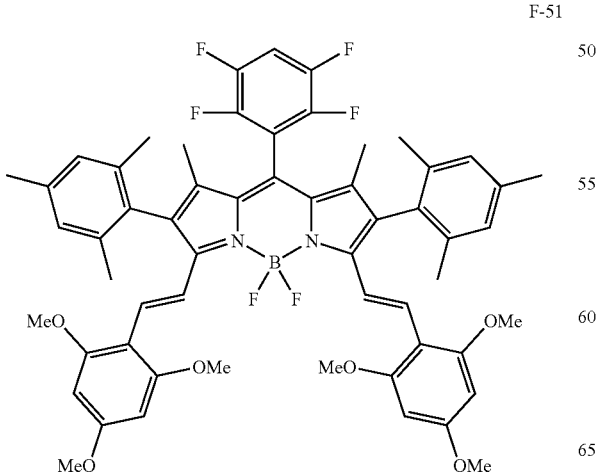
F-54
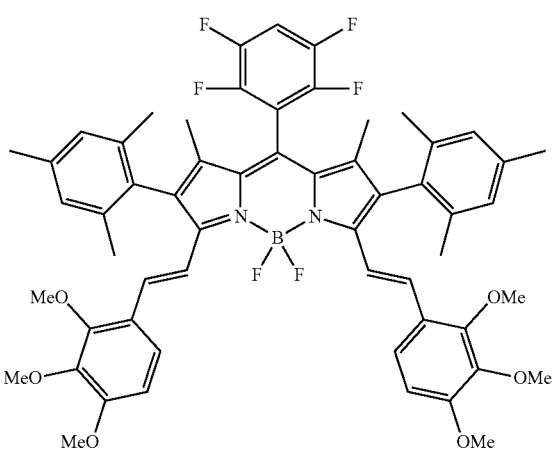

F-55
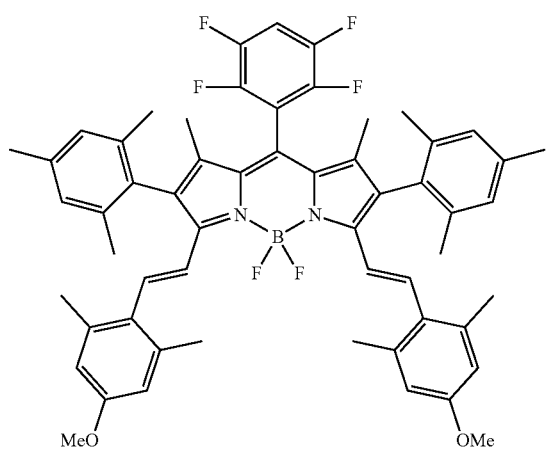
F-56
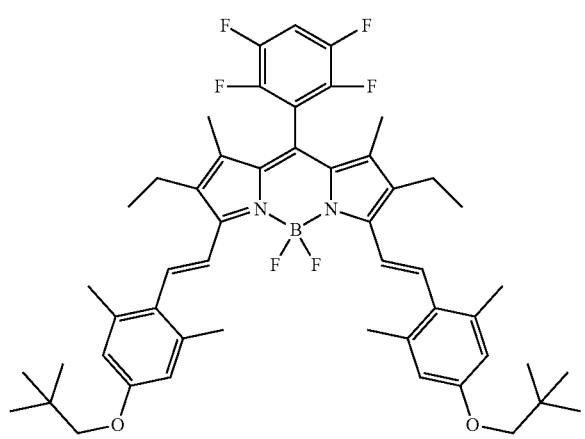
F-57
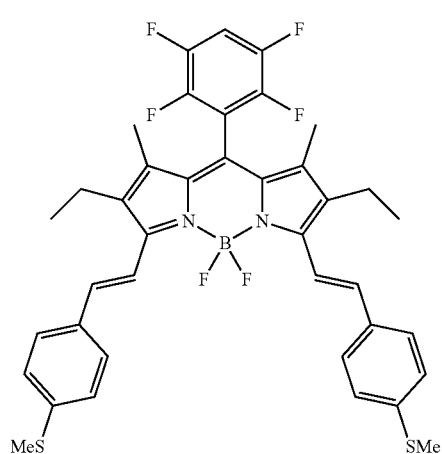
F-58
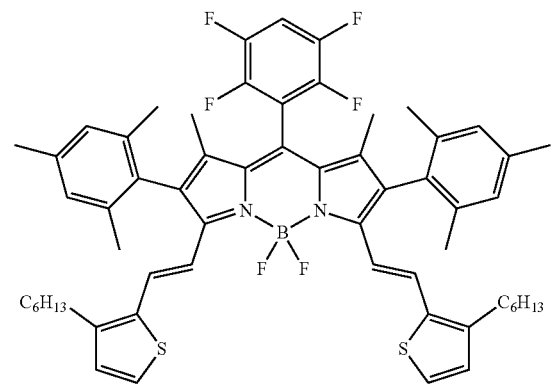
F-59
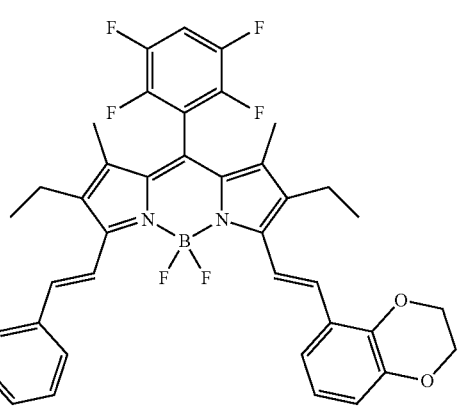
F-60
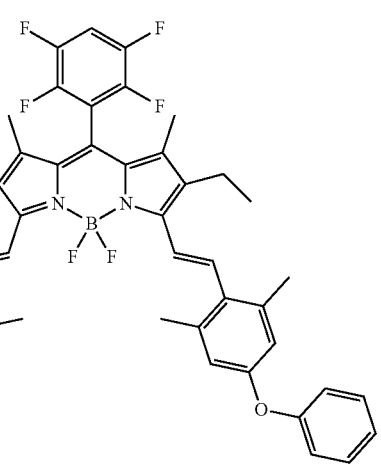

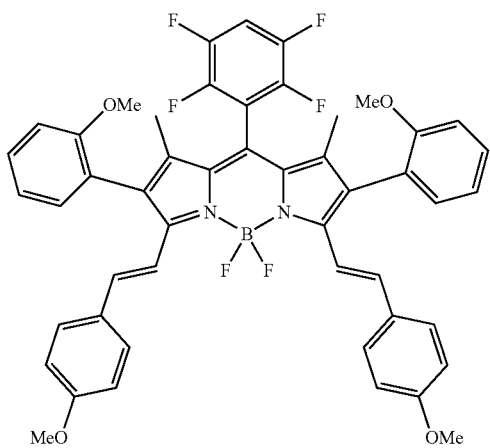
F-61
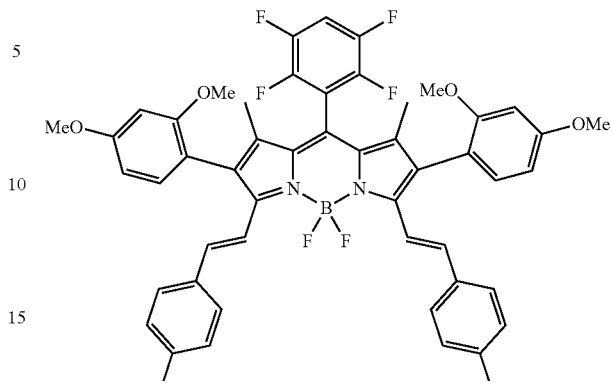
F-64
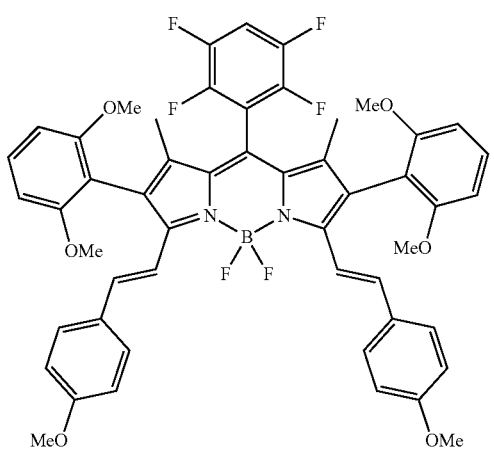
F-62
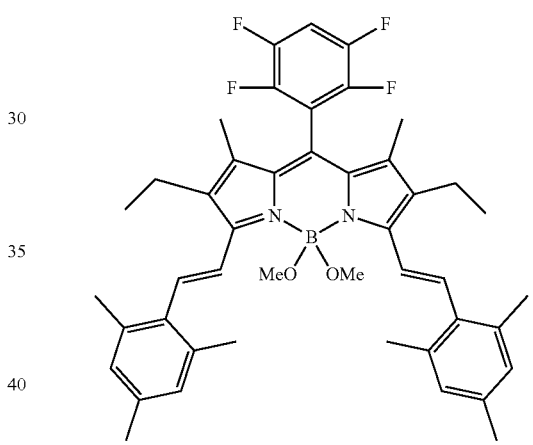
F-65
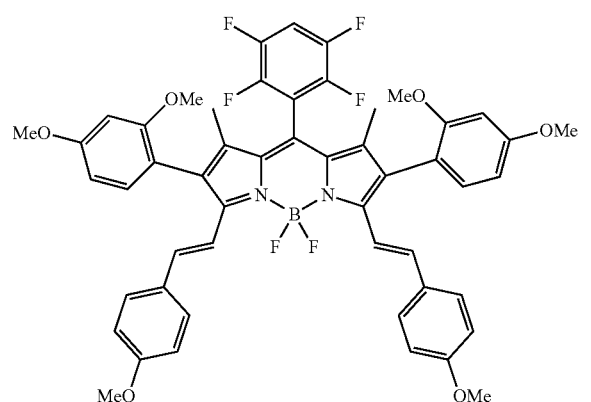
F-63
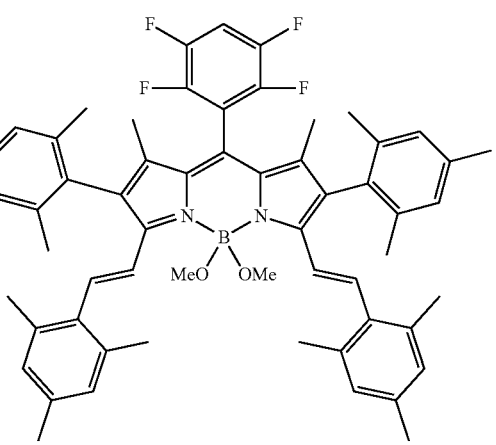
F-66

-continued
F-67
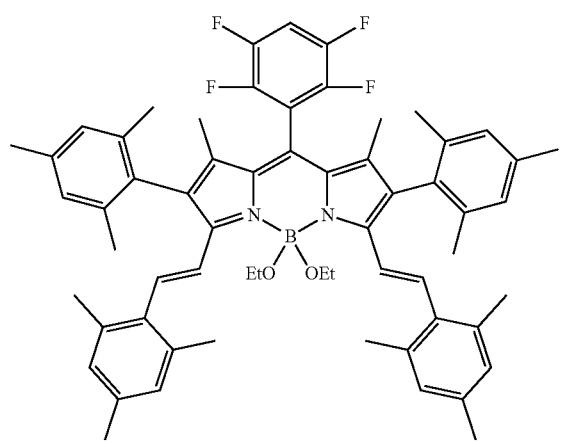
F-68
F-69
F-70
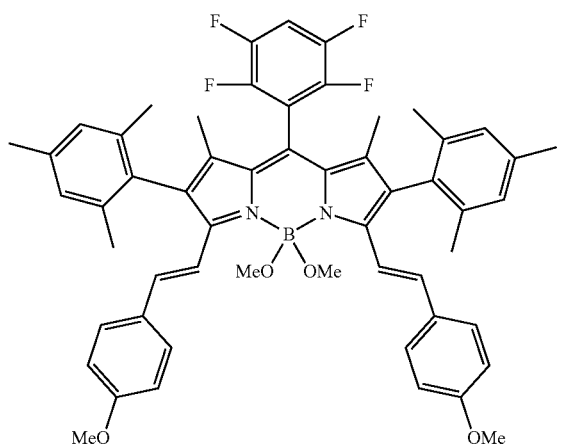
F-71
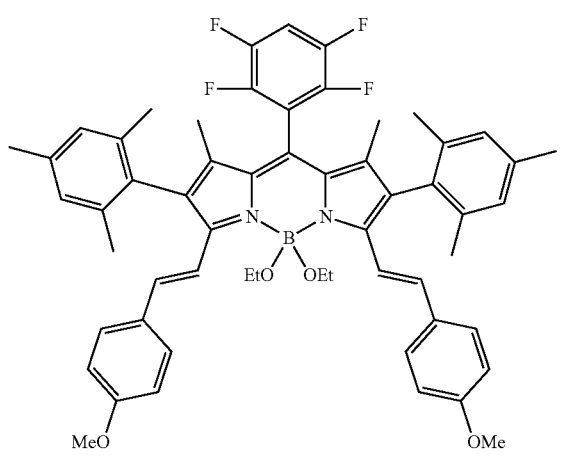
F-72
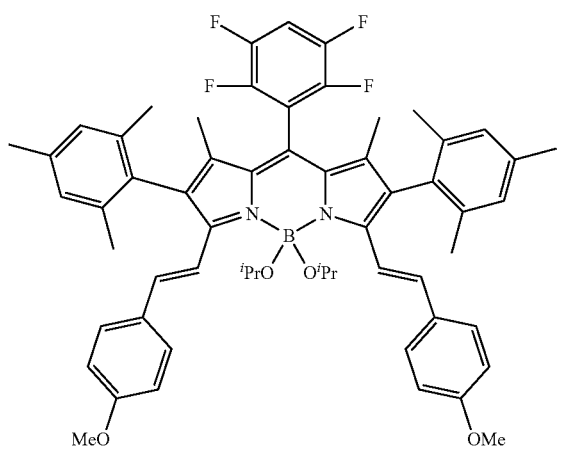

F-73
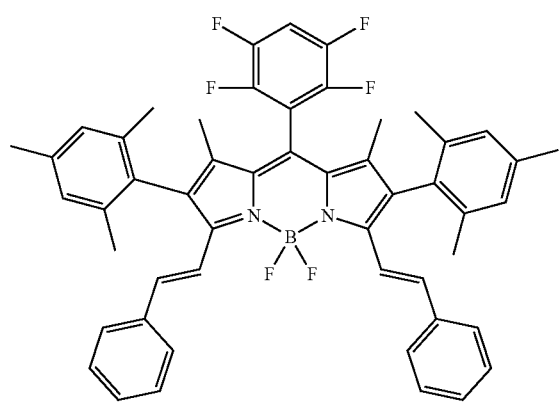
F-73
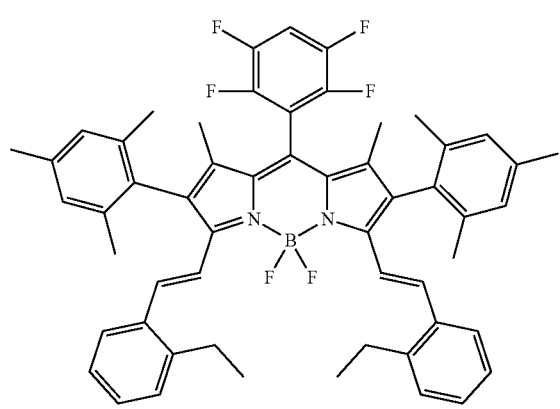
F-73
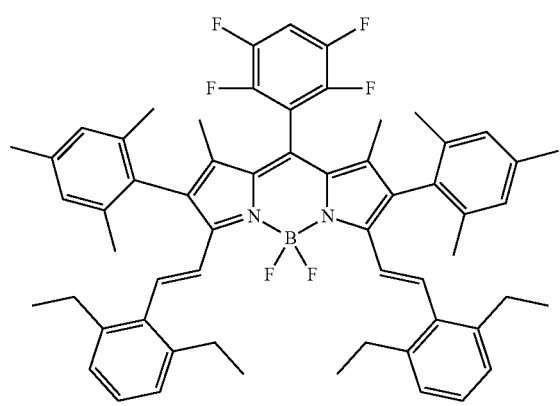
F-73
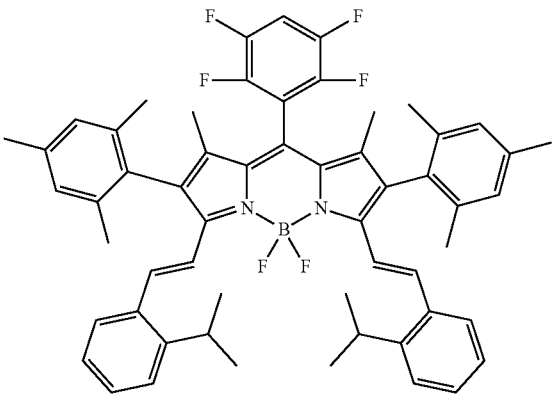
F-74
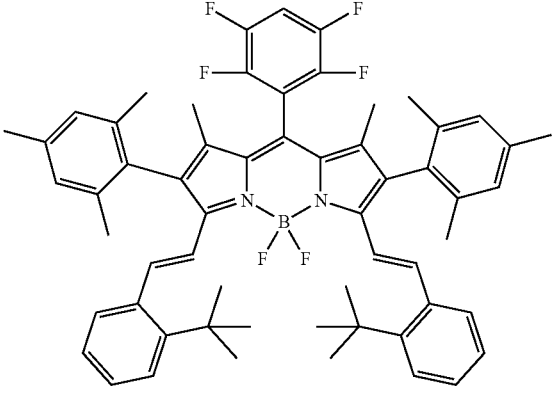
F-75
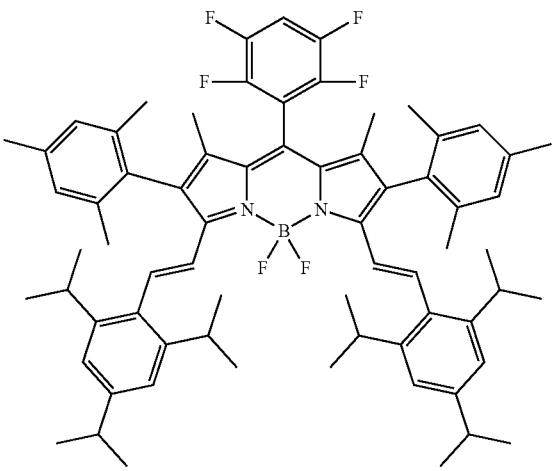

-continued
F-76
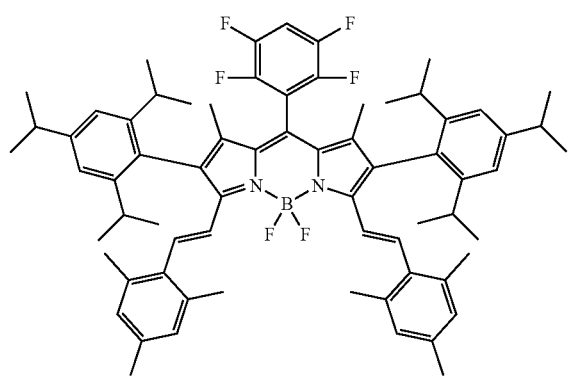
F-77
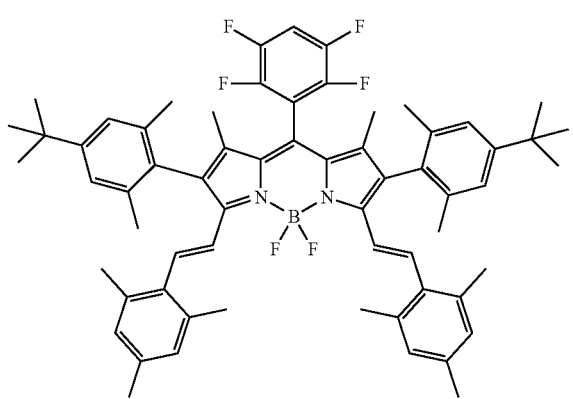
F-78
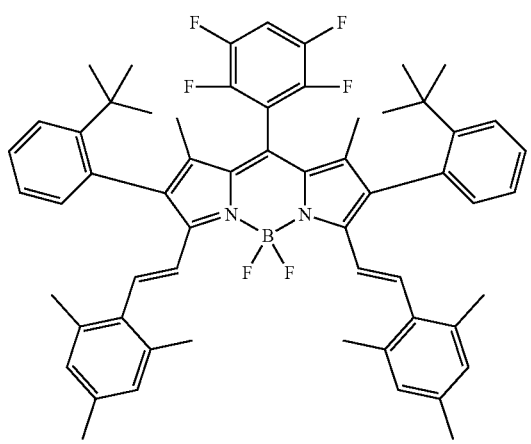
-continued
F-79
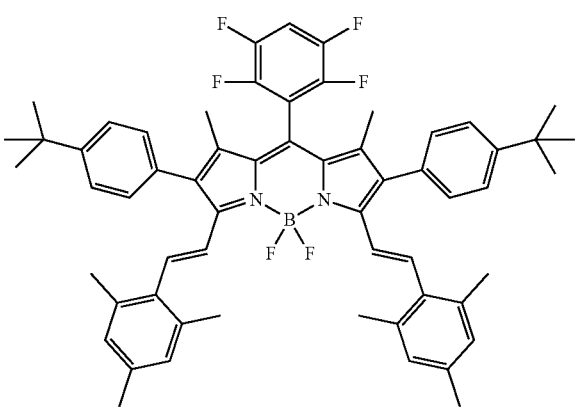
F-80
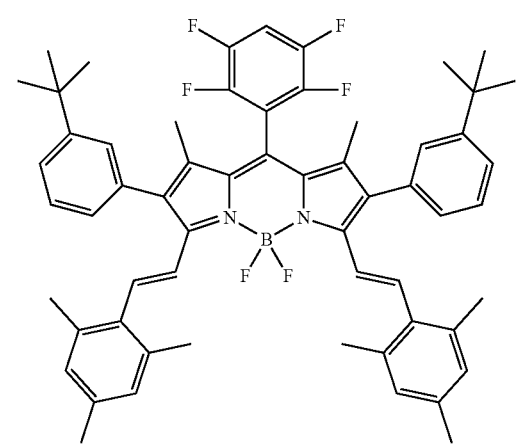
F-81
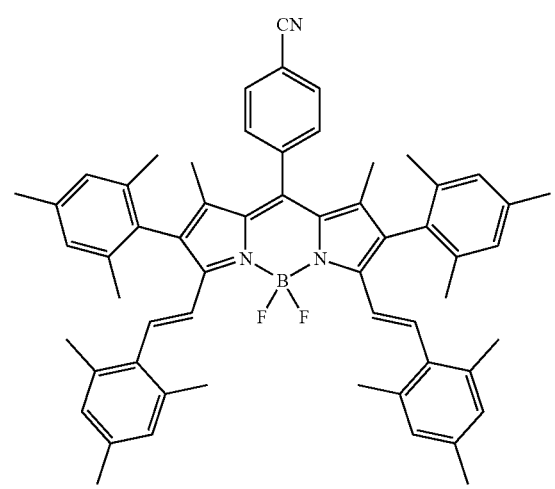

-continued
F-82
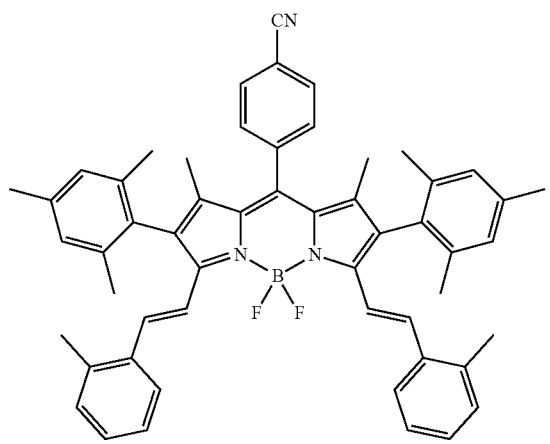
F-83
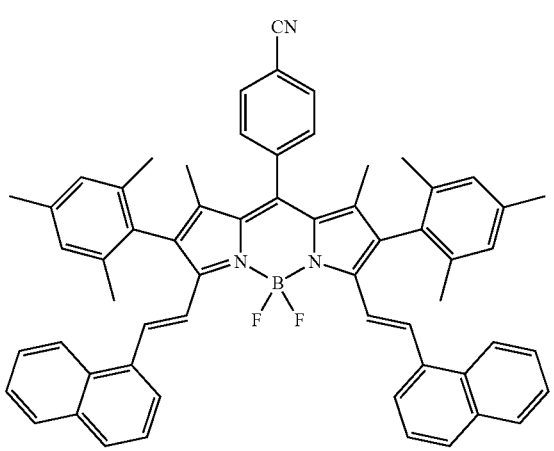
F-84
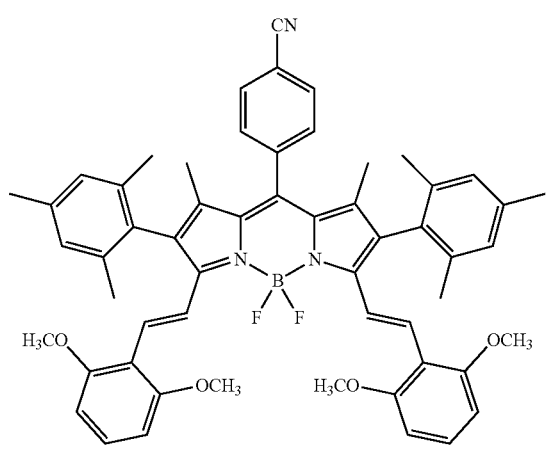
-continued
F-85
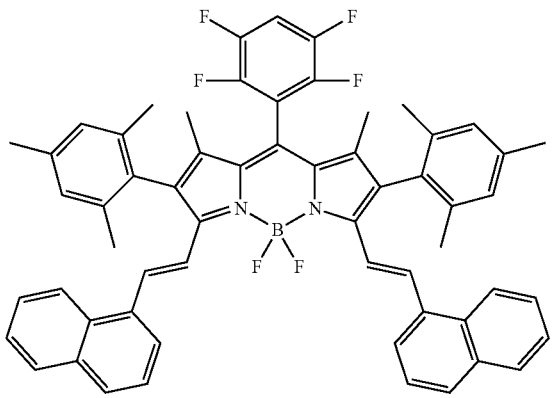
F-86
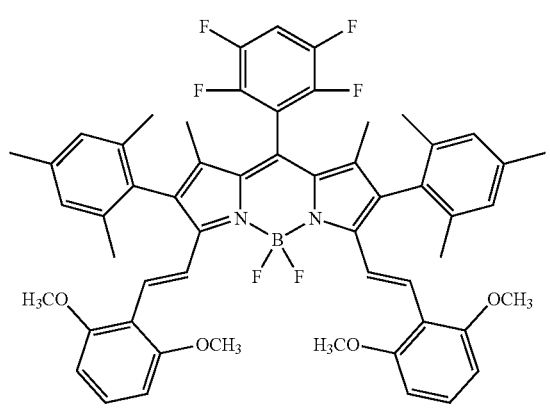
F-87
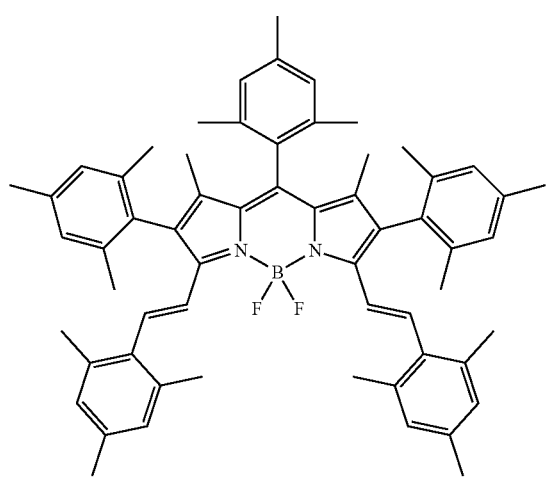

F-88
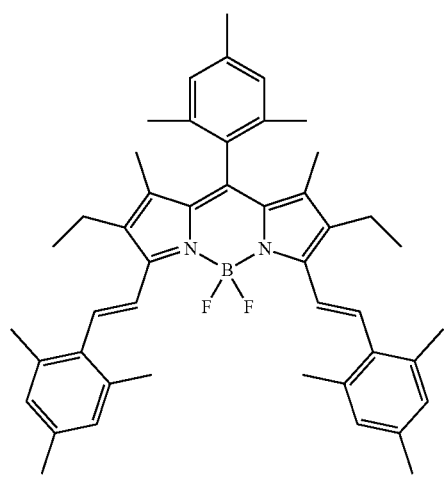
F-89
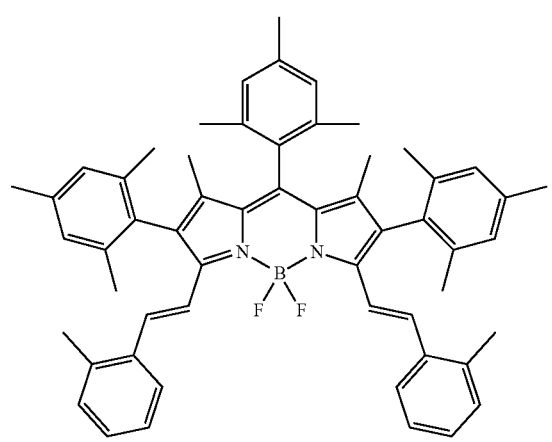
F-90
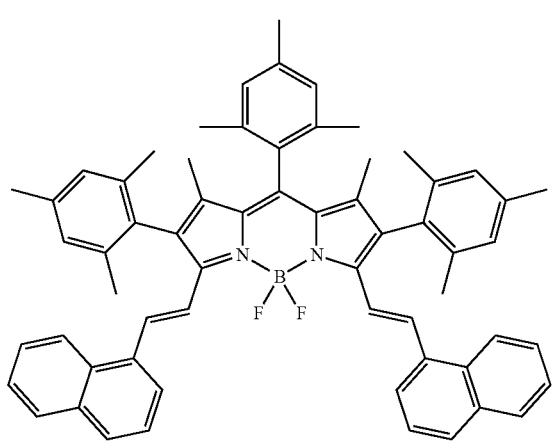
F-91
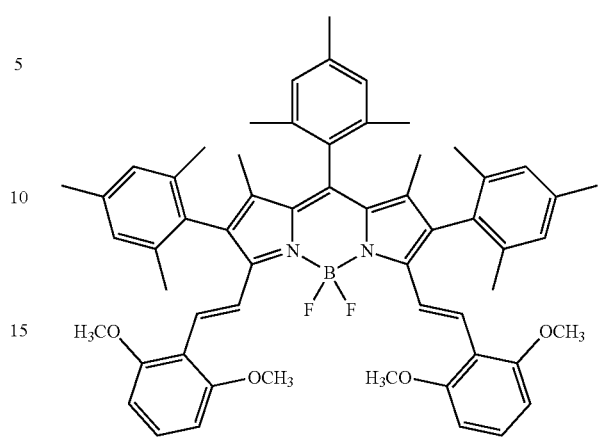
F-92
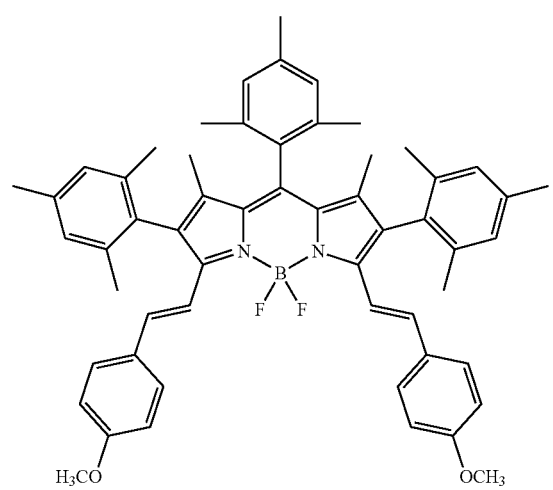
F-93
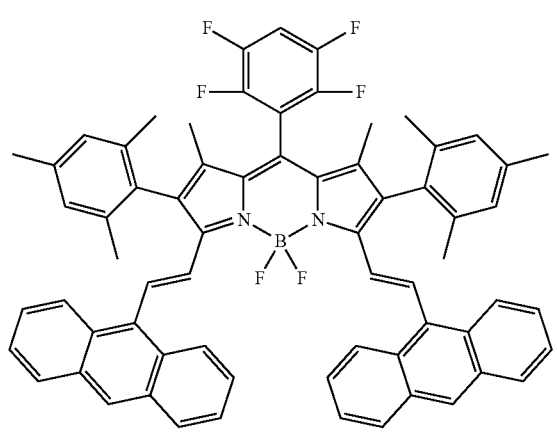

-continued

F-94
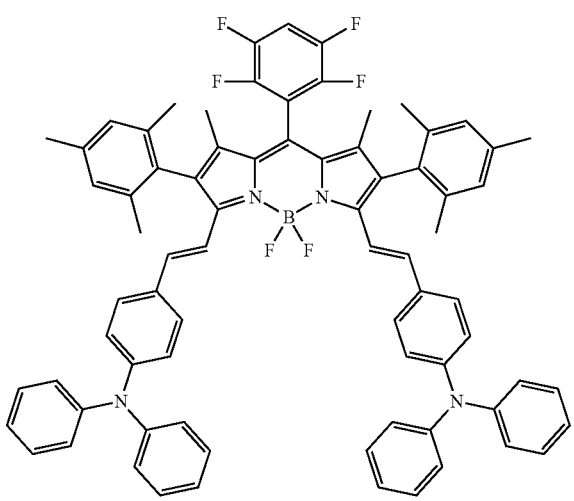

F-95
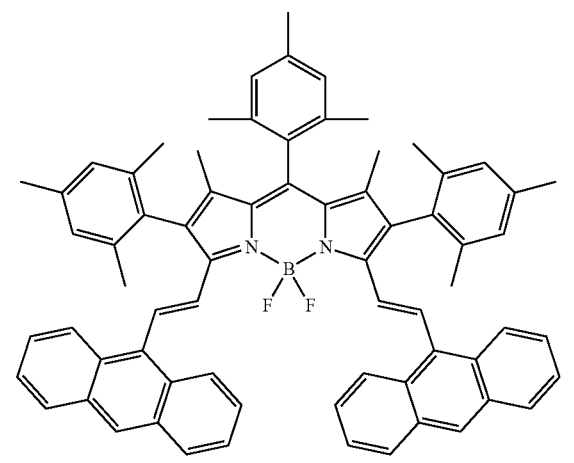

F-96
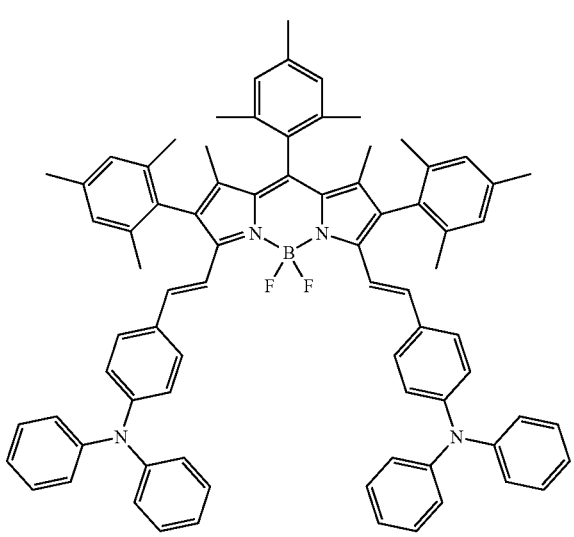

<Amount of Compounds Represented by Formulae (1) to (6)>

There is no particular limitation on the content of the compounds represented by Formulae (I) to (6) for the particles used in the present invention (that is, the particles before addition of the compounds represented by Formulae (1) to (6)) as long as the effect of the invention is not impaired, but it is preferably 0.5 μmol/g to 400 μmol/g, more preferably 1 μmol/g to 300 μmol/g, still more preferably 2 μmol/g to 200 μmol/g, and particularly preferably 3 μmol/g to 100 μmol/g. There is no particular limitation on the content of the compounds represented by Formulae (1) to (6) for the particles used in the present invention (that is, the particles before addition of the compounds represented by Formulae (1) to (6)) as long as the effect of the invention is not impaired, but it is preferably 0.1% by mass to 30% by mass, more preferably 0.2% by mass to 20% by mass, still more preferably 0.3% by mass to 10% by mass, and particularly preferably 0.4% by mass to 8% by mass.

In the luminescent particles of the present invention, at least one compound represented by Formulae (1) to (6) is used, but two or more compounds represented by Formulae (1) to (6) may be used. In the case where two or more compounds represented by Formulae (1) to (6) are used, it is preferred that the total amount of the compounds falls within the above range.

<Method for Producing Compounds Represented by Formulae (1) to (9)>

The compounds represented by Formulae (1) to (9) can be produced, for example, according to a synthesis scheme shown in Examples which will be described later.

As an example, the synthesis of Compound (1) is outlined below. 3-ethyl-2,4-dimethylpyrrole and trifluoroacetic acid are added to a mixture of 3,5-bis(trifluoromethyl)benzaldehyde and dichloromethane while cooling with water, followed by stirring at room temperature, chloranil is added while cooling with water, followed by stirring at room temperature, and diisopropylethylamine is added dropwise while cooling with water, followed by stirring at room temperature. Subsequently, a boron trifluoride-diethyl ether complex is added dropwise while cooling with water, and the reaction is carried out by stirring the mixture at room temperature, whereby Compound (1-A) can be synthesized. Subsequently, Compound (1-A), 115 mg of 2,4,6-trimethylbenzaldehyde, and dehydrated toluene are mixed and stirred at room temperature. Piperidine and one piece of p-toluenesulfonic acid monohydrate are added, and the mixture is stirred while distilling off the solvent. After allowing to cool, dehydrated toluene is added and the reaction is carried out by stirring the mixture while distilling off the solvent, whereby Compound (1) can be produced.

As another example, Compound (3) can be produced through Compound (3-A), Compound (3-B) and Compound (3-C) from 3,5-bis(trifluoromethyl)benzaldehyde and 2,4-dimethylpyrrole as starting compounds according to the synthesis scheme of <Synthesis Example 2> in Examples which will be described later.

Compound (1) and Compound (3) are within the definition of the compound represented by Formula (1). The compound represented by Formula (1) other than Compound (1) and Compound (3) can also be produced by substituting the compound used in the reaction with a compound having a substituent corresponding to the desired compound represented by Formula (1).

<Particles>

The luminescent particles of the present invention include particles. The material and form of the particles are not particularly limited, and for example, organic polymer particles such as polystyrene beads or inorganic particles such as silica gel and glass beads can be used. Specific examples of the material of the particles include a homopolymer obtained by polymerizing a monomer such as styrene, methacrylic acid, glycidyl (meth)acrylate, butadiene, vinyl chloride, vinyl acetate acrylate, methyl methacrylate, ethyl methacrylate, phenyl methacrylate, or butyl methacrylate; a copolymer obtained by polymerizing two or more monomers; and cellulose and a cellulose derivative. A latex in which the homopolymer or copolymer is uniformly suspended may also be used. Examples of the particles include other organic polymer powders, inorganic substance powders, microorganisms, blood cells, cell membrane fragments, liposomes, and microcapsules. Latex particles are preferred as particles.

In the case where latex particles are used, specific examples of the material of the latex include polystyrene, a styrene-acrylic acid copolymer, a styrene-methacrylic acid copolymer, a styrene-glycidyl (meth)acrylate copolymer, a styrene-styrene sulfonate copolymer, a methacrylic acid polymer, an acrylic acid polymer, an acrylonitrile-butadiene-styrene copolymer, a vinyl chloride-acrylic acid ester copolymer, and polyvinyl acetate acrylate. As the latex, a copolymer containing at least styrene as a monomer is preferable, and a copolymer of styrene and acrylic acid or methacrylic acid is particularly preferable. The method of preparing the latex is not particularly limited, and the latex can be prepared by any polymerization method. However, in the case where the luminescent particle of the present invention is used by labeling with an antibody, immobilization of the antibody becomes difficult in the case where a surfactant is present. Therefore, for the preparation of a latex, it is preferred to use emulsifier-free emulsion polymerization, that is, emulsion polymerization without using an emulsifier such as a surfactant, or it is preferred that a latex is prepared by emulsion polymerization using an emulsifier such as a surfactant and then the surfactant is removed or reduced by purification. The method for removing or reducing the surfactant is not particularly limited, but a purification method in which the operation of precipitating the latex by centrifugation and then removing the supernatant is repeated is preferable.

In the case where emulsifier-free emulsion polymerization is used in the preparation of the latex, the average particle diameter can be controlled in the range of 80 to 300 nm by changing the reaction temperature, the monomer composition ratio (for example, the ratio of styrene and acrylic acid), and the amount of polymerization initiator.

In the case where emulsion polymerization using a surfactant (for example, sodium dodecyl sulfate) is used in the preparation of the latex, the average particle diameter can be controlled in the range of 30 to 150 nm by changing the amount of the surfactant, the reaction temperature, the monomer composition ratio (for example, the ratio of styrene and acrylic acid), and the amount of the polymerization initiator.

<Luminescent Particle>

By including the compound represented by Formula (1), the luminescent particle of the present invention has an emission maximum wavelength in the long wavelength range of 680 nm or longer and exhibits a high quantum yield.

The emission maximum wavelength refers to a wavelength at which the absorbance becomes the largest in the absorption spectrum.

The emission maximum wavelength of the luminescent particle of the present invention is 650 nm or longer, preferably 680 nm or longer, more preferably 700 nm or longer, and particularly preferably 720 nm or longer. The upper limit of the emission maximum wavelength of the luminescent particle of the present invention is not particularly limited, but it is preferably 900 nm or less and more preferably 800 nm or less.

The emission maximum wavelength of the luminescent particle can be measured using a commercially available fluorescence spectrophotometer, for example, a fluorescence spectrophotometer RF-5300 PC (manufactured by Shimadzu Corporation).

The quantum yield of luminescent particles is the ratio of the number of photons emitted as fluorescence to the number of photons absorbed by luminescent particles.

The quantum yield of the luminescent particles of the present invention is preferably 0.25 or more, more preferably 0.4 or more, still more preferably 0.5 or more, even more preferably 0.6 or more, and particularly preferably 0.7 or more. The upper limit of the quantum yield is not particularly limited, but generally it is 1.0 or less.

The quantum yield of the luminescent particles of the present invention can be measured using a commercially available quantum yield measuring apparatus, for example, an absolute PL quantum yield measuring apparatus C9920-02 manufactured by Hamamatsu Photonics K.K.

(Method of Measuring Average Particle Diameter (Average Particle Size) of Luminescent Particles)

The average particle diameter of the luminescent particles of the present invention varies depending on the material of the particles, the concentration range for measuring the test substance, the measuring device, and the like, but it is preferably in the range of 0.001 to 10 μm (more preferably 0.01 to 1 μm), still more preferably in the range of 30 to 500 nm, even more preferably in the range of 50 to 300 nm, particularly preferably in the range of 80 to 200 nm, and most preferably in the range of 100 to 150 nm. The average particle diameter of the luminescent particles that can be used in the present invention can be measured with a commercially available particle size distribution meter or the like. As a method for measuring the particle size distribution, it is possible to use a method such as optical microscopy, confocal laser microscopy, electron microscopy, atomic force microscopy, static light scattering method, laser diffraction method, dynamic light scattering method, centrifugal sedimentation method, electric pulse measurement method, chromatography method, ultrasonic attenuation method, and the like are known, and devices corresponding to the respective principles are commercially available. Among these measurement methods, it is preferable to measure the average particle diameter of the luminescent particles using a dynamic light scattering method from the viewpoint of the particle size range and ease of measurement. Commercially available measuring apparatuses using dynamic light scattering include a NANOTRAC UPA (available from Nikkiso Co., Ltd.), a dynamic light scattering type particle size distribution measuring apparatus LB-550 (available from Horiba Seisakusho), a concentrated system particle size analyzer FPAR-1000 (available from Otsuka Electronics Co., Ltd.), and the like. In the present invention, the average particle diameter is obtained as a median diameter (d=50) measured at 25° C. under the conditions of a viscosity of 0.8872 CP and a refractive index of water of 1.330.

<Method for Producing Luminescent Particles>

The method for producing the luminescent particles of the present invention is not particularly limited, but the luminescent particles can be produced by mixing particles with at least one kind of compound represented by Formula (1). For example, the luminescent particles of the present invention can be produced by adding a compound represented by Formula (1) to particles such as latex particles. More specifically, the luminescent particles of the present invention can be produced by adding a solution containing a compound represented by Formula (1) to a dispersion liquid of particles containing at least one of water or a water-soluble organic solvent (tetrahydrofuran, methanol, or the like) and stirring the mixture.

<Dispersion Liquid>

According to the present invention, there is provided a dispersion liquid containing the above-mentioned luminescent particles of the present invention.

The dispersion liquid can be produced by dispersing the luminescent particles of the present invention in a dispersion medium. Examples of the dispersion medium include water, an organic solvent, and a mixture of water and an organic solvent. An alcohol such as methanol, ethanol, or isopropanol, an ether-based solvent such as tetrahydrofuran, or the like can be used as the organic solvent.

The solid content concentration of the luminescent particles in the dispersion liquid is not particularly limited, but it is generally 0.1% to 20% by mass, preferably 0.5% to 10% by mass, and more preferably 1% to 5% by mass.

<Utilization of Luminescent Particles>

The luminescent particles of the present invention can be used in a fluorescence detection method for quantifying a protein, an enzyme, an inorganic compound, or the like as an example of a specific fluorescence detection method.

[Compound of Present Invention]

The present invention further relates to a compound represented by Formula (3).

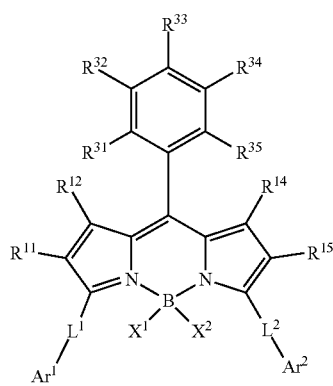

(3)

In the formula, $R^{11}$, $R^{12}$, $R^{14}$, and $R^{15}$ each independently represent a hydrogen atom, a halogen atom, an alkyl group, an aryl group, a heterocyclic group, an ethenyl group, an ethynyl group, an amino group, an acyl group, an alkoxy group, an aryloxy group, an alkylthio group, or an arylthio group, each of which may have a substituent, and at least two of $R^{11}$, $R^{12}$, $R^{14}$, and $R^{15}$ are atoms or groups other than hydrogen atoms. $X^1$ and $X^2$ each independently represent a halogen atom, an alkyl group, an aryl group, a heterocyclic group, a hydroxy group, an alkoxy group, an aryloxy group, an alkylthio group, an arylthio group, an ethenyl group, or an ethynyl group, each of which may have a substituent, and $X^1$ and $X^2$ may be bonded to each other to form a ring. $Ar^1$ and $Ar^2$ each independently represent an aryl group or a heterocyclic group, each of which may have a substituent. $R^{31}$ to $R^{35}$ each independently represent a hydrogen atom, a halogen atom, an alkyl group, an aryl group, a heterocyclic group, an ethenyl group, an ethynyl group, an amino group, an acyl group, a cyano group, an alkoxy group, an aryloxy group, an alkylthio group, or an arylthio group, each of which may have a substituent, and any one of $R^{31}$, $R^{32}$, $R^{34}$ or $R^{35}$ is a group consisting of two or more atoms.

$L^1$ and $L^2$ each independently represent any one of Formula (L-1), Formula (L-2), Formula (L-3) or Formula (L-4).

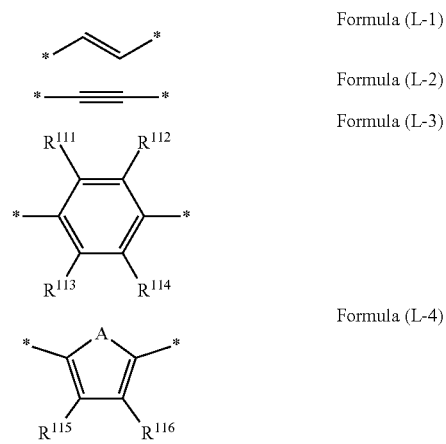

In the formulae, $R^{111}$ to $R^{116}$ each independently represent a hydrogen atom, a halogen atom, an alkyl group, an aryl group, a heterocyclic group, an ethenyl group, an ethynyl group, an amino group, an acyl group, an alkoxy group, an aryloxy group, an alkylthio group, or an arylthio group, each of which may have a substituent. A represents —O—, —S—, or —NH—.

The preferred range of each substituent in Formula (3) is as described in the present specification.

The present invention further relates to a compound represented by Formula (4).

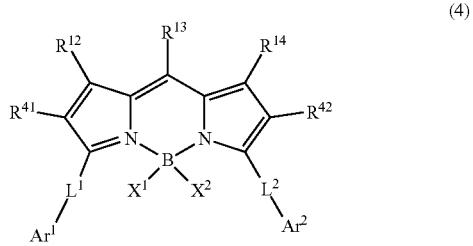

(4)

In the formula, $R^{12}$, $R^{13}$, and $R^{14}$ each independently represent a hydrogen atom, a halogen atom, an alkyl group, an aryl group, a heterocyclic group, an ethenyl group, an ethynyl group, an amino group, an acyl group, an alkoxy group, an aryloxy group, an alkylthio group, or an arylthio group, each of which may have a substituent, and at least one of $R^{12}$, $R^{13}$ or $R^{14}$ is an atom or group other than a hydrogen atom. $X^1$ and $X^2$ each independently represent a halogen atom, an alkyl group, an aryl group, a heterocyclic group, a hydroxy group, an alkoxy group, an aryloxy group, an alkylthio group, an arylthio group, an ethenyl group, or an ethynyl group, each of which may have a substituent, and $X^1$ and $X^2$ may be bonded to each other to form a ring. $Ar^1$ and $Ar^2$ each independently represent an aryl group or a heterocyclic group, each of which may have a substituent. $R^{41}$ and $R^{42}$ each independently represent an aryl group, a heterocyclic group, an ethenyl group, or an ethynyl group, each of which may have a substituent. $L^1$ and $L^2$ each independently represent any one of Formula (L-1), Formula (L-2), Formula (L-3) or Formula (L-4).

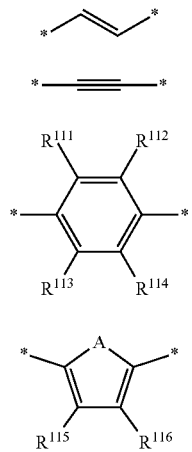

Formula (L-1)

Formula (L-2)

Formula (L-3)

Formula (L-4)

In the formulae, $R^{111}$ to $R^{116}$ each independently represent a hydrogen atom, a halogen atom, an alkyl group, an aryl group, a heterocyclic group, an ethenyl group, an ethynyl group, an amino group, an acyl group, an alkoxy group, an aryloxy group, an alkylthio group, or an arylthio group, each of which may have a substituent. A represents —O—, —S—, or —NH—. The preferred range of each substituent in Formula (4) is as described in the present specification.

The present invention further relates to a compound represented by Formula (7).

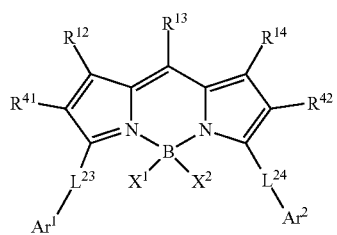

(7)

In the formula, $R^{12}$, $R^{13}$, $R^{14}$, $R^{41}$, $R^{42}$, $X^1$, $X^2$, $Ar^1$, and $Ar^2$ are as defined in Formula (4), provided that at least one of $R^{12}$, $R^{13}$ or $R^{14}$ is an atom or group other than a hydrogen atom. $L^{23}$ and $L^{24}$ each independently represent a group represented by Formula (L-1) or (L-2).

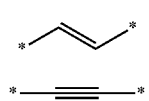

Formula (L-1)

Formula (L-2)

The preferred range of each substituent in Formula (7) is as described in the present specification.

The present invention further relates to a compound represented by Formula (8).

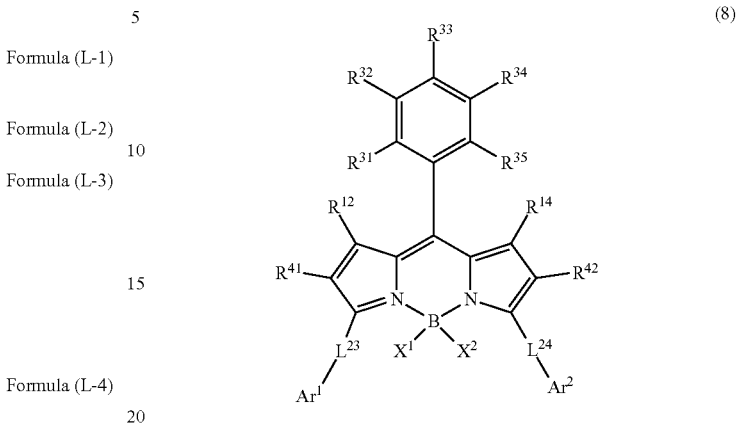

(8)

In the formula, $R^{12}$, $R^{14}$, $R^{41}$, $R^{42}$, $X^1$, $X^2$, $Ar^1$, $Ar^2$, $L^{23}$, and $L^{24}$ are as defined in Formula (7), $R^{31}$ to $R^{35}$ each independently represent a hydrogen atom, a halogen atom, an alkyl group, an aryl group, a heterocyclic group, an ethenyl group, an ethynyl group, an amino group, an acyl group, a cyano group, an alkoxy group, an aryloxy group, an alkylthio group, or an arylthio group, each of which may have a substituent, and any one of $R^{31}$, $R^{32}$, $R^{33}$, $R^{34}$ or $R^{35}$ is a hydrogen atom.

The preferred range of each substituent in Formula (8) is as described in the present specification.

The present invention further relates to a compound represented by Formula (9).

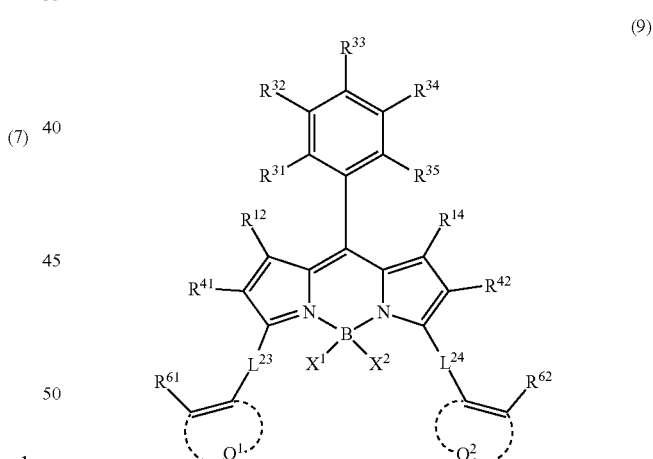

(9)

In the formula, $R^{12}$, $R^{14}$, $R^{41}$, $R^{42}$, $R^{31}$ to $R^{35}$, $X^1$, $X^2$, $Ar^1$, $Ar^2$, $L^{23}$, and $L^{24}$ are as defined in Formula (8), $R^{61}$ and $R^{62}$ each independently represent an alkyl group, an alkenyl group, an aryl group, a heteroaryl group, an amino group, an acyl group, an alkoxy group, an aryloxy group, an alkylthio group, or an arylthio group, each of which may have a substituent, $Q^1$ and $Q^2$ each independently represent an aromatic hydrocarbon ring or an aromatic heterocyclic ring, each of which may have a substituent, and $R^{61}$ and $Q^1$, and $R^{62}$ and $Q^2$ each may form a fused ring structure.

The preferred range of each substituent in Formula (9) is as described in the present specification.

The present invention further relates to a compound represented by Formula (6).

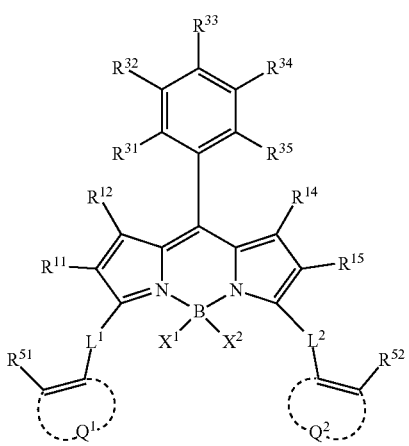

In the formula, $R^{11}$, $R^{12}$, $R^{14}$, and $R^{15}$ each independently represent a hydrogen atom, a halogen atom, an alkyl group, an aryl group, a heterocyclic group, an ethenyl group, an ethynyl group, an amino group, an acyl group, an alkoxy group, an aryloxy group, an alkylthio group, or an arylthio group, each of which may have a substituent, and at least two of $R^{11}$, $R^{12}$, $R^{14}$, and $R^{15}$ are atoms or groups other than hydrogen atoms. $X^1$ and $X^2$ each independently represent a halogen atom, an alkyl group, an aryl group, a heterocyclic group, a hydroxy group, an alkoxy group, an aryloxy group, an alkylthio group, an arylthio group, an ethenyl group, or an ethynyl group, each of which may have a substituent, and $X^1$ and $X^2$ may be bonded to each other to form a ring. $R^{31}$ to $R^{35}$ each independently represent a hydrogen atom, a halogen atom, an alkyl group, an aryl group, a heterocyclic group, an ethenyl group, an ethynyl group, an amino group, an acyl group, an alkoxy group, an aryloxy group, an alkylthio group, or an arylthio group, each of which may have a substituent and any one of $R^{31}$, $R^{32}$, $R^{33}$, $R^{34}$ or $R^{35}$ is a hydrogen atom. $R^{51}$ and $R^{52}$ each independently represent an alkyl group, an aryl group, a heteroaryl group, an amino group, an acyl group, an alkoxy group, an aryloxy group, an alkylthio group, or an arylthio group, each of which may have a substituent. $Q^1$ and $Q^2$ each independently represent an aromatic hydrocarbon ring or an aromatic heterocyclic ring, each of which may have a substituent.

$L^1$ and $L^2$ each independently represent any one of Formula (L-1), (L-2), (L-3) or (L-4).

In the formulae, $R^{111}$ to $R^{116}$ each independently represent a hydrogen atom, a halogen atom, an alkyl group, an aryl group, a heterocyclic group, an ethenyl group, an ethynyl group, an amino group, an acyl group, an alkoxy group, an aryloxy group, an alkylthio group, or an arylthio group, each of which may have a substituent. A represents —O—, —S—, or —NH—.

The preferred range of each substituent in Formula (6) is as described in the present specification.

The compound represented by Formula (6) can be produced by a method similar to the method described in the foregoing section <Method for producing compounds represented by Formulae (1) to (5)> in the present specification.

Hereinafter, the present invention will be described in more detail with reference to the Examples of the present invention. The materials, amounts of use, proportions, treatment contents, treatment procedures, and the like shown in the following Examples can be appropriately modified without departing from the spirit and scope of the present invention. Therefore, the scope of the present invention should not be interpreted restrictively by the following specific examples.

EXAMPLES

The terms have the following meanings.

TLC: thin layer chromatography

MS: mass spectrometry

ESI: electrospray ionization

NMR: nuclear magnetic resonance rt: room temperature

Me: methyl

Et: ethyl iPr: isopropyl

PL: photoluminescence

TEA: triethylamine

THF: tetrahydrofuran v/v: volume/volume

The structures of Compounds (1) to (12) and Comparative Compound (1) are shown below.

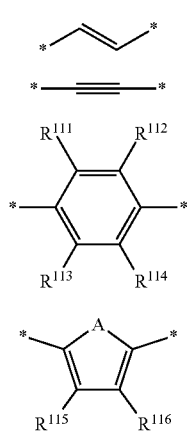

Formula (L-1)

Formula (L-2)

Formula (L-3)

Formula (L-4)

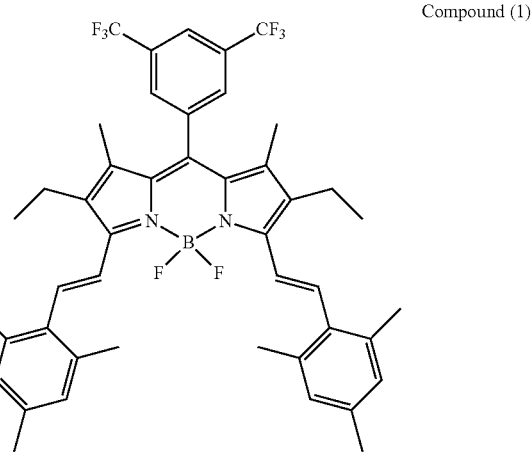

Compound (1)

Compound (2)
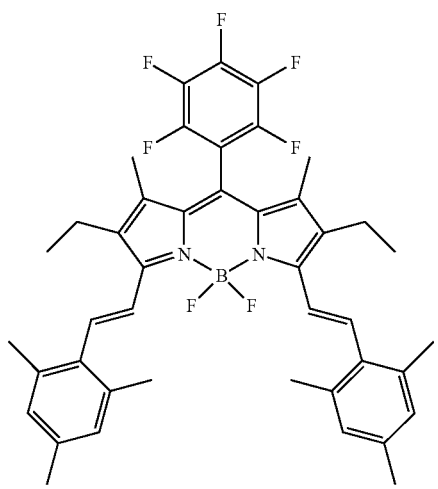
Compound (3)
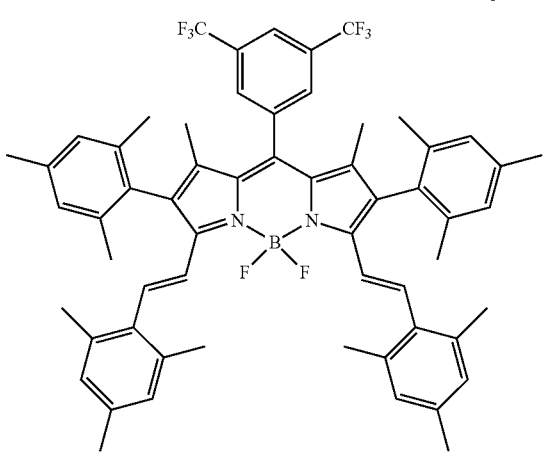
Compound (4)
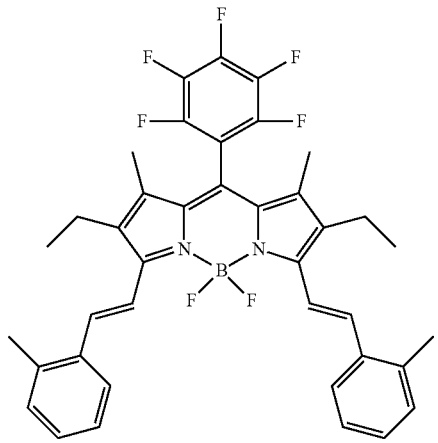
Compound (5)
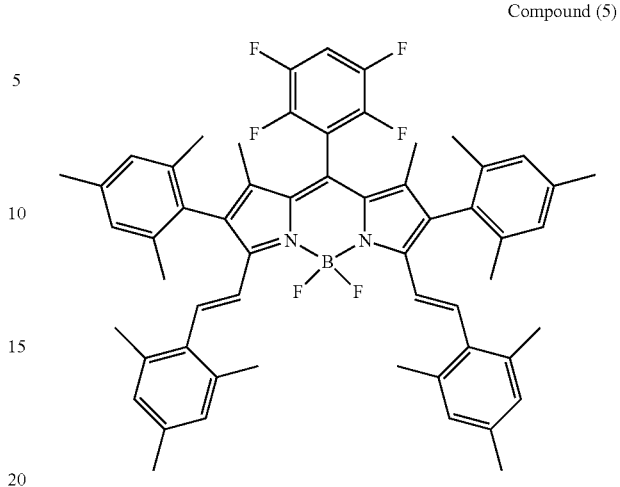
Compound (6)
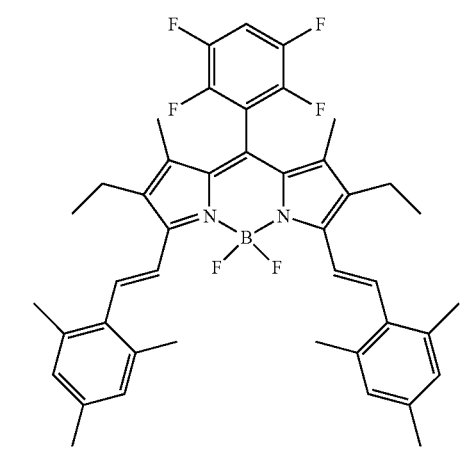
Compound (7)
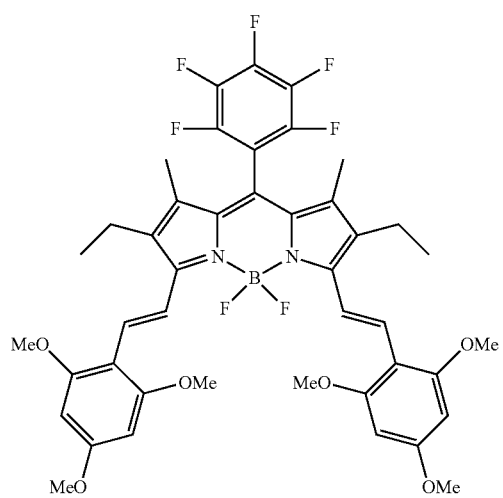

-continued
Compound (8)
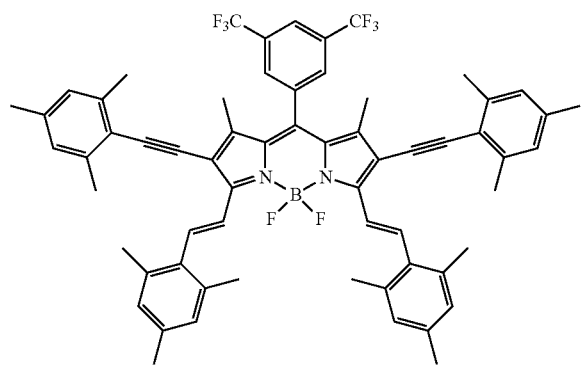
Comparative Compound (1)
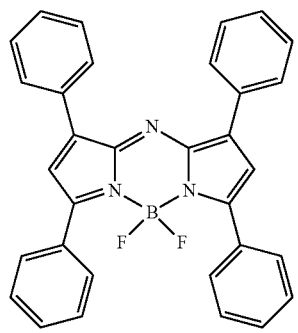
Compound (9)
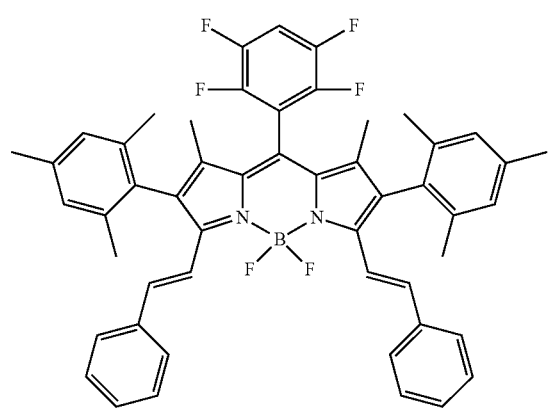
Compound (10)
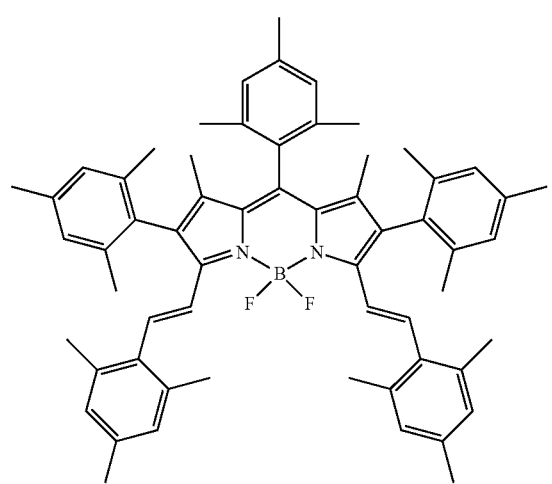
Compound (11)
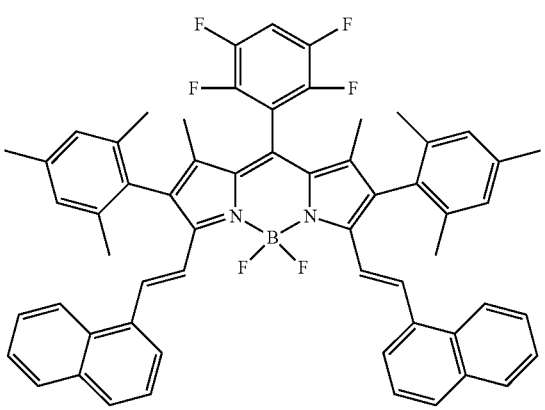
Compound (12)
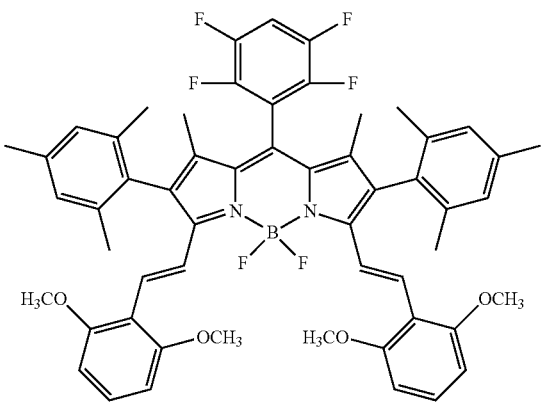
Compound (13)
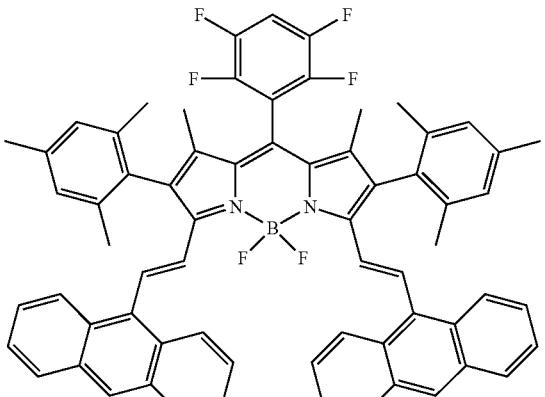

Compound (15)

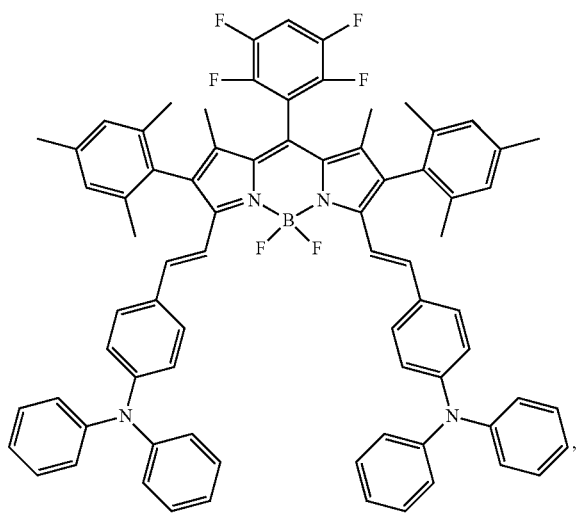

<Synthesis Example 1> Synthesis of Compound (1)

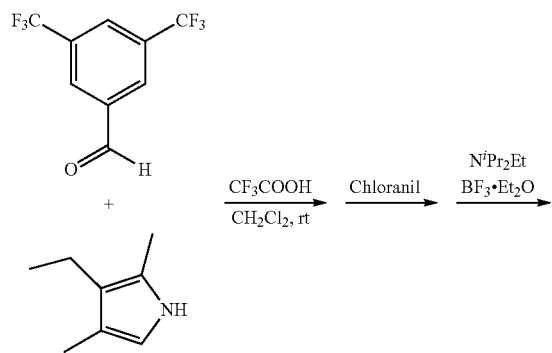

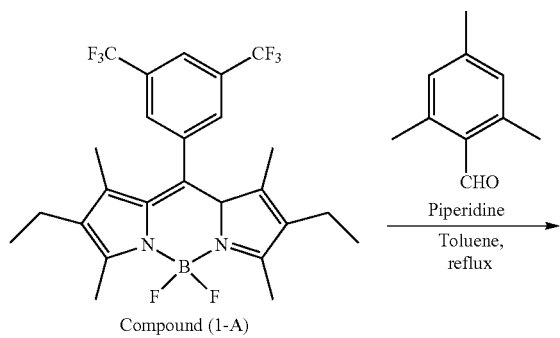

Compound (1-A)

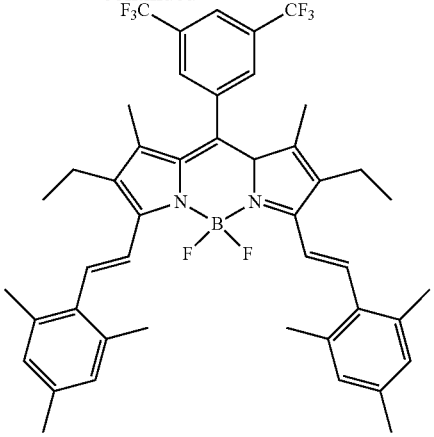

Compound (1)

Synthesis of Compound (1-A)

1.00 g of 3,5-bis(trifluoromethyl)benzaldehyde and 20 mL of dichloromethane were introduced into a 100 mL three-neck flask under a nitrogen atmosphere, followed by stirring at room temperature. While cooling with water, 0.98 g of 3-ethyl-2,4-dimethylpyrrole was added dropwise, followed by addition of two drops of trifluoroacetic acid and then stirring at room temperature for 30 minutes. 1.0 g of chloranil was added while cooling with water, followed by stirring at room temperature for 10 minutes, and then 3.67 g of diisopropylethylamine (N$^i$Pr$_2$Et) was added dropwise while cooling with water, followed by stirring at room temperature for 15 minutes. Subsequently, 5.6 mL of a boron trifluoride-diethyl ether complex was added dropwise while cooling with water, followed by stirring at room temperature for 30 minutes. Saturated sodium hydrogencarbonate and toluene were added dropwise, and the organic layer obtained by extraction and liquid separation was preliminarily dried over anhydrous sodium sulfate and then concentrated under reduced pressure. The resulting crude product was purified by silica gel column chromatography (developing solvent: hexane/ethyl acetate) and recrystallized from methanol to obtain 1.28 g of Compound (I-A).

$^1$H NMR(CDCl$_3$, 400 MHz): δ 8.03 (s, 1H), 7.83 (s, 2H), 2.54 (s, 6H), 2.31 (q, J=7.6 Hz, 4H), 1.21 (s, 6H), 1.00 (t, J=7.6 Hz, 6H).

Synthesis of Compound (1)

100 mg of Compound (1-A), 115 mg of 2,4,6-trimethylbenzaldehyde and 5 mL of dehydrated toluene were introduced into a 100 mL three-neck flask, followed by stirring at room temperature. 1 mL of piperidine and one piece of p-toluenesulfonic acid monohydrate (manufactured by Wako Pure Chemical Industries, Ltd., special grade chemical) were added, followed by stirring for 1 hour while distilling off the solvent at 140° C. After allowing to cool, 5 mL of dehydrated toluene was added, followed by stirring for 1 hour while distilling off the solvent at 140° C. The crude product obtained by concentrating the reaction liquid under reduced pressure was purified by preparative TLC (developing solvent: hexane/ethyl acetate) and recrystallized from methanol to obtain 71 mg of Compound (1). Identification of the compound was carried out by $^1$H-NMR and ESI-MS.

1H NMR(CDCl3, 400 MHz): δ 8.06 (s, 1H), 7.87 (s, 2H), 7.38 (d, J=17.2 Hz, 2H), 7.32 (d, J=17.2 Hz, 2H), 6.93 (s,

4H), 2.63 (q, J=7.6 Hz, 4H), 2.44 (s, 12H), 2.30 (s, 6H), 1.27 (s, 6H), 1.17 (t, J=7.6 Hz, 6H).

ESI-MS: [M–H]⁻=775.8

<Synthesis Example 2> Synthesis of Compound (3)

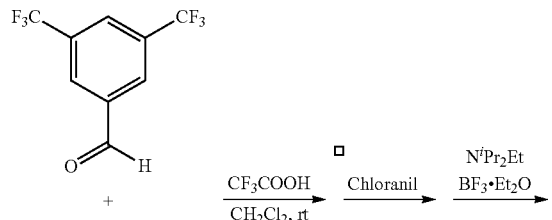

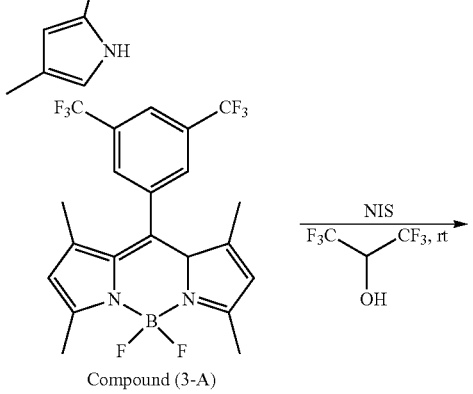

Compound (3-A)

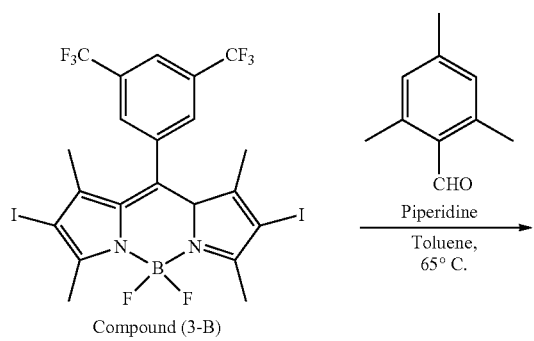

Compound (3-B)

Compound (3-C)

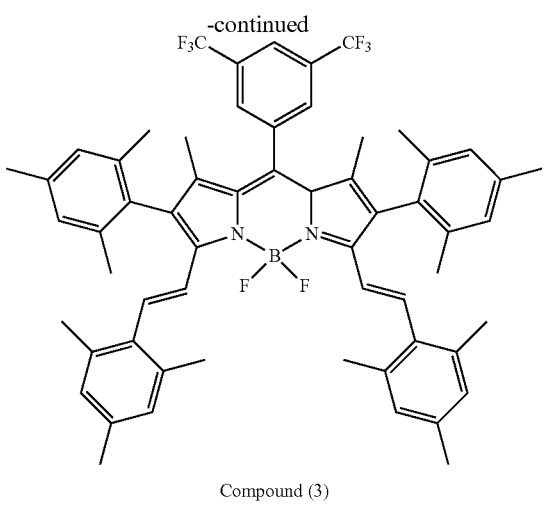

Compound (3)

Synthesis of Compound (3-A)

16.22 g of 3,5-bis(trifluoromethyl)benzaldehyde and 200 mL of dichloromethane were introduced into a 1 L three-neck flask under a nitrogen atmosphere, followed by stirring at room temperature. 15.75 g of 2,4-dimethylpyrrole was added dropwise while cooling with water, followed by adding five drops of trifluoroacetic acid and then stirring at room temperature for 30 minutes. 19.45 g of chloranil was added while cooling with water, followed by stirring at room temperature for 30 minutes, and 80 mL of diisopropylethylamine (NiPr₂Et) was added dropwise while cooling with water, followed by stirring at room temperature for 30 minutes. Subsequently, 85 mL of a boron trifluoride-diethyl ether complex (BF₃·Et₂O) was added dropwise while cooling with water, followed by stirring at room temperature for 30 minutes. 400 mL of saturated sodium hydrogen carbonate was added dropwise, and the organic layer obtained by extraction and liquid separation was preliminarily dried over anhydrous sodium sulfate and then concentrated under reduced pressure. The resulting crude product was purified by silica gel column chromatography (developing solvent: hexane/ethyl acetate) and then recrystallized from ethanol to obtain 4.40 g of Compound (3-A).

Synthesis of Compound (3-B)

3.05 g of Compound (3-A) and 60 mL of 1,1,1,3,3,3-hexafluoro-2-propanol were introduced into a 300 mL three-neck flask, followed by stirring at room temperature. 3.60 g of N-iodosuccinimide was introduced, followed by stirring at room temperature for 1.5 hours. After concentrating the reaction liquid under reduced pressure, 50 mL of an aqueous sodium thiosulfate solution (10 g of sodium thiosulfate dissolved therein) and 100 mL of methylene chloride were added, and the organic layer obtained by extraction and liquid separation was preliminarily dried over anhydrous sodium sulfate and then concentrated under reduced pressure. The resulting crude product was recrystallized from ethanol to obtain 3.90 g of Compound (3-B).

Synthesis of Compound (3-C)

2.2 g of Compound (3-B), 2.6 g of 2,4,6-trimethylbenzaldehyde and 40 mL of dehydrated toluene were introduced into a 100 mL three-neck flask, followed by stirring at room temperature. 4 mL of piperidine was introduced, followed by stirring at 65° C. for 1 hour. The crude product obtained by concentrating the reaction liquid under reduced pressure was purified by silica gel column chromatography (developing solvent: hexane/ethyl acetate) and recrystallized from ethanol to obtain 2.4 g of Compound (3-C).
Synthesis of Compound (3)

96 mg of Compound (3-C), 64 mg of 2,4,6-trimethylphenylboronic acid, 130 mg of cesium fluoride, and 10 mL of methoxycyclopentane were introduced into a 100 mL three-neck flask, followed by degassing under reduced pressure while stirring at room temperature, and the reaction system was set to a nitrogen atmosphere. 63 mg of SPhos Pd G3 (manufactured by Sigma-Aldrich, Inc.) was added thereto, followed by heating under reflux for 1 hour. 10 mL of a saturated aqueous ammonium chloride solution and 10 mL of ethyl acetate were added, and the organic layer obtained by extraction and liquid separation was preliminarily dried over anhydrous sodium sulfate and then concentrated under reduced pressure. The resulting crude product was purified by preparative TLC (developing solvent: hexane/ethyl acetate) and then recrystallized from ethanol to obtain 16 mg of Compound (3). Identification of the compound was carried out by $^1$H-NMR and ESI-MS.

1H NMR(CDCl3, 400 MHz): δ 8.02 (s, 1H), 8.00 (s, 2H), 7.42 (d, J=22.4 Hz, 2H), 6.92 (s, 4H), 6.80 (s, 4H), 6.67 (d, J=22.4 Hz, 2H), 2.27 (s, 6H), 2.17 (s, 6H), 2.16 (s, 6H), 2.11 (s, 12H), 2.01 (s, 12H).

ESI-MS: [M−H]$^-$=955.8

<Synthesis Example 3> Synthesis of Compound (2)

The synthesis was carried out in the same manner as in the synthesis of Compound (3), except that 3,5-bis(trifluoromethyl)benzaldehyde was replaced by 2,3,4,5,6-pentafluorobenzaldehyde and 2,4-dimethylpyrrole was replaced by 2,4-dimethyl-3-ethylpyrrole. The resulting crude product was purified by silica gel column chromatography (developing solvent: hexane/ethyl acetate) and then recrystallized from dichloromethane/methanol to obtain 8 mg of Compound (2). Identification of the compound was carried out by $^1$H-NMR measurement, thus confirming the same NMR spectrum as in Org. Biomol. Chem., 2010, Vol. 8, pp. 4546 to 4553.

<Synthesis Example 4> Synthesis of Compound (4)

Compound (4) was synthesized in the same manner as in the synthesis of Compound (2), except that 2,4,6-trimethylbenzaldehyde was replaced by o-tolualdehyde. Identification of the compound was carried out by $^1$H-NMR and ESI-MS. 400 MHz $^1$H-NMR spectrum is shown in FIG. 1.

ESI-MS: [M−H]$^-$=673.3

<Synthesis Example 5> Synthesis of Compound (5)

The synthesis was carried out in the same manner as in the synthesis of Compound (3), except that 3,5-bis(trifluoromethyl)benzaldehyde was replaced by 2,3,5,6-tetrafluorobenzaldehyde. The resulting crude product was purified by silica gel column chromatography (developing solvent: hexane/ethyl acetate) and then recrystallized from methanol to obtain 16 mg of Compound (5). Identification of the compound was carried out by $^1$H-NMR and ESI-MS.

1H NMR(CDCl$_3$, 400 MHz): δ 7.43 (s, 1H), 7.39 (s, 1H), 7.29-7.21 (m, 1H), 6.94 (s, 4H), 6.80 (s, 4H), 6.69 (s, 1H), 6.65 (s, 1H), 2.29 (s, 6H), 2.23 (s, 6H), 2.08 (s, 12H), 2.03 (s, 12H), 1.33 (s, 6H).

ESI-MS: [M−H]$^-$=891.4

Compound (5) was also synthesized by the following synthesis method.
<Synthesis of Compound (5)>

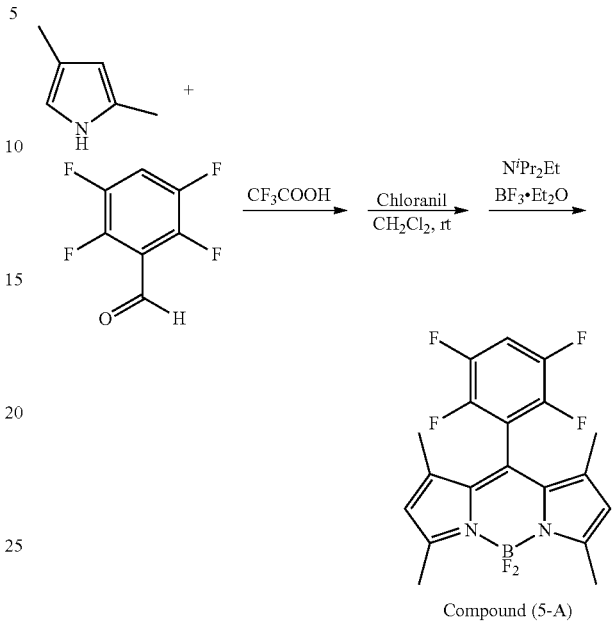

Compound (5-A)

Synthesis of Compound (5-A)

1.16 ml of 2,4-dimethylpyrrole and 140 mL of dichloromethane were introduced into a 500 mL three-neck flask under a nitrogen atmosphere, followed by stirring at room temperature. 1.0 g of 2,3,5,6-tetrafluorobenzaldehyde and one drop of trifluoroacetic acid were added, followed by stirring at room temperature for 15 minutes. 1.38 g of chloranil was added, followed by stirring at room temperature for 15 minutes, and then 6.8 mL of diisopropylethylamine (NiPr$_2$Et) was added dropwise while cooling with water, followed by stirring at room temperature for 20 minutes. Subsequently, 7.8 mL of a boron trifluoride-diethyl ether complex (BF$_3$·Et$_2$O) was added dropwise while cooling with water, followed by stirring at room temperature for 30 minutes. 400 mL of saturated sodium hydrogen carbonate was added dropwise, and the organic layer obtained by dichloromethane extraction and liquid separation was preliminarily dried over anhydrous sodium sulfate and then concentrated under reduced pressure. The resulting crude product was purified by silica gel column chromatography (developing solvent: hexane/ethyl acetate) and then recrystallized from methanol to obtain 360 mg of Compound (5-A).

Synthesis of Compound (5-B)

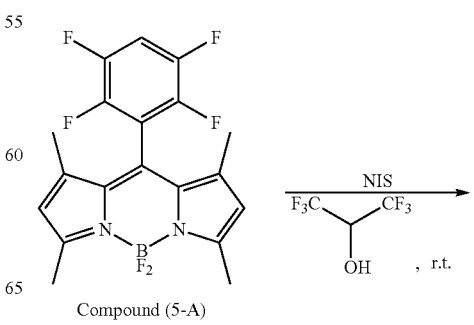

Compound (5-A)

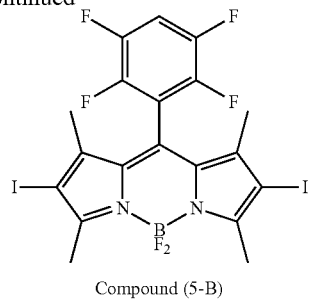

Compound (5-B)

300 mg of Compound (5-A) and 8 mL of 1,1,1,3,3,3-hexafluoro-2-propanol were introduced into a 300 mL three-neck flask, followed by stirring at room temperature. 409 mg of N-iodosuccinimide was introduced, followed by stirring at room temperature for 1.5 hours. After concentrating the reaction liquid under reduced pressure, 40 mL of methylene chloride was added, and the organic layer obtained by extraction and liquid separation was preliminarily dried over anhydrous sodium sulfate, filtered and concentrated under reduced pressure. Ethanol was added to the resulting crude product, followed by dispersion, washing and filtration to obtain 382 mg of Compound (5-B).

Synthesis of Compound (5-C)

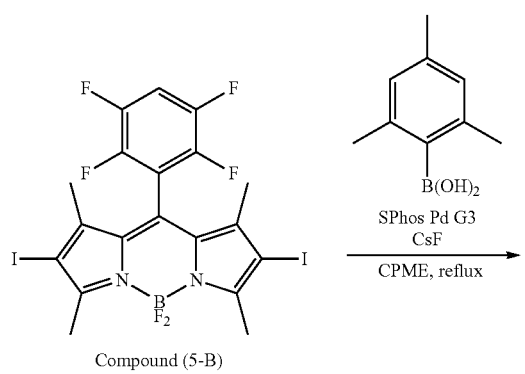

Compound (5-B)

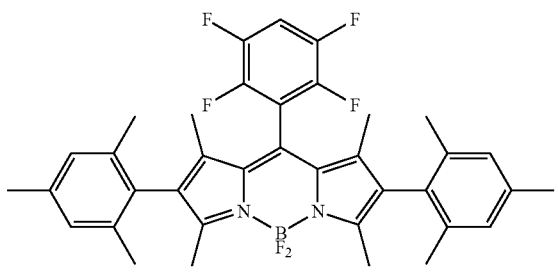

Compound (5-C)

278 mg of Compound (5-B), 564 mg of 2,4,6-trimethylphenylboronic acid, 653 mg of cesium fluoride, and 43 mL of methoxycyclopentane were introduced into a 100 mL three-neck flask, followed by degassing under reduced pressure while stirring at room temperature, and the reaction system was set to a nitrogen atmosphere. 269 mg of SPhos Pd G3 (manufactured by Sigma-Aldrich, Inc.) was added thereto, followed by heating under reflux for 1 hour. 250 mL of ethyl acetate was added, and the organic layer obtained by extraction and liquid separation was preliminarily dried over anhydrous sodium sulfate and then concentrated under reduced pressure. The resulting crude product was purified by silica gel column chromatography (developing solvent: hexane/ethyl acetate) and then dissolved in 5 ml of dichloromethane, 15 ml of methanol was further added, and then dichloromethane was distilled off, followed by reprecipitation. The precipitate was filtered to obtain 206 mg of Compound (5-C).

Synthesis of Compound (5)

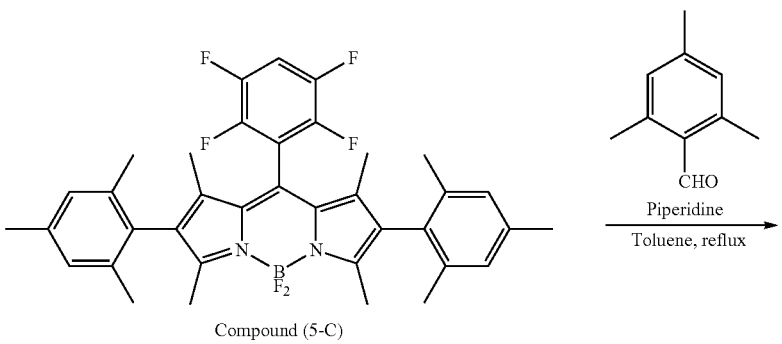

Compound (5-C)

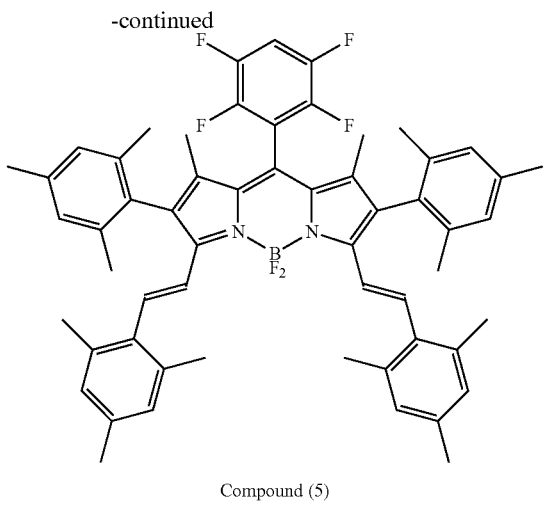

Compound (5)

50 mg of Compound (5-C), 5 ml of toluene, 46 μl of 2,4,6-trimethylbenzaldehyde, 400 IA of piperidine and one piece of p-toluenesulfonic acid were introduced into a 100 mL three-neck flask, followed by heating under reflux under nitrogen for 1 hour. After further adding 46 μl of 2,4,6-trimethylbenzaldehyde, followed by heating under reflux for 1 hour, 200 μl of piperidine was further added, followed by heating under reflux for another 1 hour. After completion of the reaction, the reaction liquid was concentrated under reduced pressure. The resulting crude product was purified by silica gel column chromatography (developing solvent: hexane/toluene) and then dissolved in 3 ml of dichloromethane, 15 ml of methanol was added, and then dichloromethane was distilled off, followed by reprecipitation to obtain 15 mg of Compound (5). Identification of the compound was carried out by $^1$H-NMR and ESI-MS.

<Synthesis Example 6> Synthesis of Compound (6)

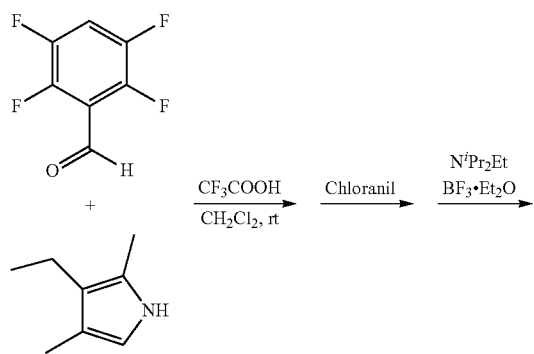

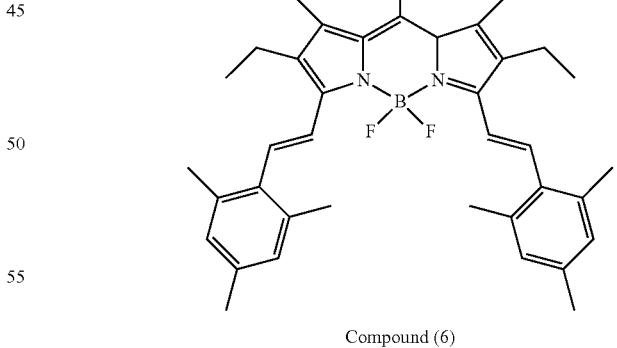

Compound (6-A)

Compound (6)

Synthesis of Compound (6-A)

1.00 g of 2,3,5,6-tetrafluorobenzaldehyde and 20 mL of dichloromethane were introduced into a 100 mL three-neck flask under a nitrogen atmosphere, followed by stirring at room temperature. 0.98 g of 3-ethyl-2,4-dimethylpyrrole was added dropwise while cooling with water, followed by addition of two drops of trifluoroacetic acid and then stirring at room temperature for 15 minutes. 1.0 g of chloranil was added while cooling with water, followed by stirring at room temperature for 10 minutes, and 3.67 g of diisopropylethylamine was added dropwise while cooling with water, followed by stirring at room temperature for 15 minutes. Subsequently, 5.6 mL of a boron trifluoride-diethyl ether complex was added dropwise while cooling with water, followed by stirring at room temperature for 60 minutes. Saturated sodium hydrogen carbonate and toluene were added dropwise, and the organic layer obtained by extraction and liquid separation was preliminarily dried over anhydrous sodium sulfate and then concentrated under reduced pressure. The resulting crude product was purified by silica gel column chromatography (developing solvent: toluene) and recrystallized from methanol to obtain 0.76 g of Compound (6-A).

1H NMR(CDCl3, 400 MHz): δ 7.20-7.30 (m, 1H), 2.54 (s, 6H), 2.33 (q, J=7.6 Hz, 4H), 1.51 (s, 6H), 1.01 (t, J=7.6 Hz, 6H).

Synthesis of Compound (6)

181 mg of Compound (6-A), 237 mg of 2,4,6-trimethylbenzaldehyde and 10 mL of dehydrated toluene were introduced into a 100 mL three-neck flask, followed by stirring at room temperature. 2 mL of piperidine and two pieces of p-toluenesulfonic acid monohydrate (manufactured by Wako Pure Chemical Industries, Ltd., special grade chemical) were added, followed by stirring for 1 hour while distilling off the solvent at 140° C. The crude product obtained by concentrating the reaction liquid under reduced pressure was purified by silica gel column chromatography (developing solvent: toluene) and then recrystallized from acetonitrile to obtain 194 mg of Compound (6). Identification of the compound was carried out by $^1$H-NMR and ESI-MS.

$^1$H NMR(CDCl3, 400 MHz): δ 7.40 (d, J=17.2 Hz, 2H), 7.32 (d, J=17.2 Hz, 2H), 7.20-7.30 (m, 1H), 6.93 (s, 4H), 2.66 (q, J=7.6 Hz, 4H), 2.44 (s, 12H), 2.30 (s, 6H), 1.55 (s, 6H), 1.19 (t, J=7.6 Hz, 6H).

ESI-MS: [M−H]$^−$=711.7

<Synthesis Example 7> Synthesis of Compound (7)

Figure 2:
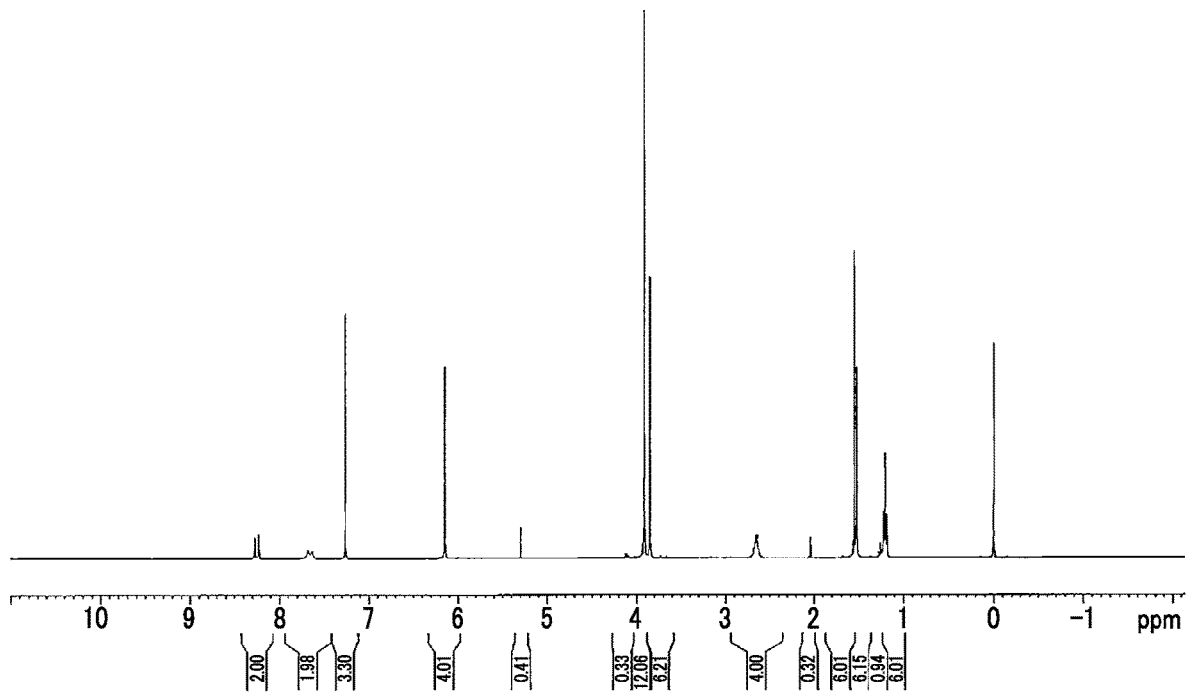
FIG. 2 shows a 400 MHz $^1$H NMR spectrum of Compound (7).

Compound (7) was synthesized in the same manner as in the synthesis of Compound (2), except that 2,4,6-trimethylbenzaldehyde was replaced by 2,4,6-trimethoxybenzaldehyde. Identification of the compound was carried out by $^1$H-NMR and ESI-MS. 400 MHz $^1$H-NMR spectrum is shown in FIG. 2.

ESI-MS: [M+H]$^+$=825.3

<Synthesis Example 8> Synthesis of Compound (8)

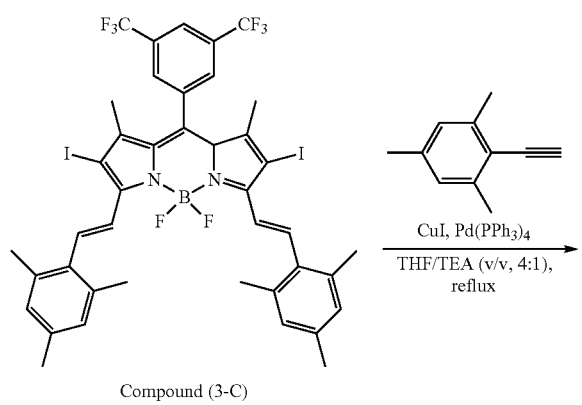

Compound (3-C)

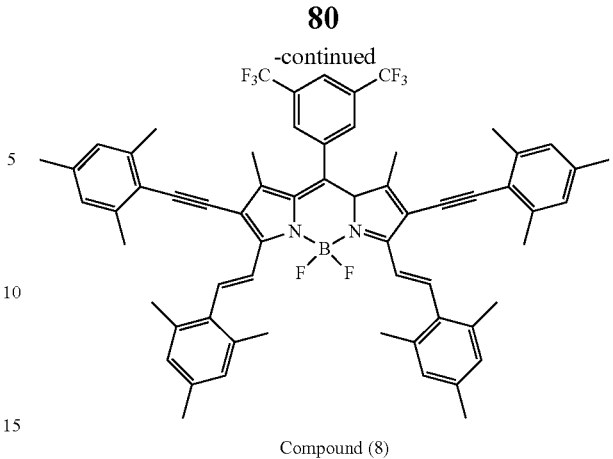

Compound (8)

Synthesis of Compound (8)

97 mg of Compound (3-C), 58 mg of 2-ethynyl-1,3,5-trimethylbenzene, 3.8 mg of copper (I) iodide, 4 mL of THF, and 1 mL of triethylamine were introduced into a 50 mL two-neck flask, followed by degassing under reduced pressure while stirring at room temperature, and the reaction system was set to a nitrogen atmosphere. Tetrakis(triphenylphosphine)palladium (0) (Pd(PPh$_3$)$_4$) was added thereto, followed by heating under reflux for 2 hours. The solvent was removed by distillation under reduced pressure, and 30 mL of dichloromethane was added thereto, followed by washing with 20 mL of water and 20 mL of a saturated aqueous sodium chloride solution. The organic layer was preliminarily dried over anhydrous sodium sulfate and concentrated under reduced pressure. The resulting crude product was purified by silica gel column chromatography (developing solvent: hexane/toluene) and then recrystallized from methanol to obtain 26 mg of Compound (8). Identification of the compound was carried out by $^1$H-NMR and ESI-MS.

$^1$H NMR(CDCl3, 400 MHz): δ 8.60 (s, 1H), 8.56 (s, 1H), 8.09 (s, 1H), 7.90 (s, 2H), 7.41 (s, 1H), 7.37 (s, 1H), 6.88 (s, 4H), 6.85 (s, 4H), 2.36 (s, 12H), 2.34 (s, 12H), 2.28 (s, 6H), 2.27 (s, 6H).

ESI-MS: [M−H]$^−$=1003.5

Synthesis of Compound (9)

Compound (9) was synthesized in the same manner as in the method of synthesizing Compound (5) through Compounds (5-A) to (5-C), except that 2,4,6-trimethylbenzaldehyde in the synthesis of Compound (5) was replaced by benzaldehyde.

Synthesis of Compound (10)

Compound (10) was synthesized in the same manner as in the method of synthesizing Compound (5) through Compounds (5-A) to (5-C), except that 2,3,5,6-tetrafluorobenzaldehyde in the synthesis of Compound (5) was replaced by 2,4,6-trimethylbenzaldehyde.

Synthesis of Compound (11)

Compound (11) was synthesized in the same manner as in the method of synthesizing Compound (5) through Compounds (5-A) to (5-C), except that 2,4,6-trimethylbenzaldehyde in the synthesis of Compound (5) was replaced by 2-formylnaphthalene.

Synthesis of Compound (12)

Compound (12) was synthesized in the same manner as in the method of synthesizing Compound (5) through Compounds (5-A) to (5-C), except that 2,4,6-trimethylbenzaldehyde in the synthesis of Compound (5) was replaced by 2,6-dimethoxybenzaldehyde.

Synthesis of Compound (13)

Compound (13) was synthesized in the same manner as in the method of synthesizing Compound (5) through Compounds (5-A) to (5-C), except that 2,4,6-trimethylbenzaldehyde in the synthesis of Compound (5) was replaced by 9-anthraldehyde.

Synthesis of Compound (14)

Compound (14) was synthesized in the same manner as in the method of synthesizing Compound (5) through Compounds (5-A) to (5-C), except that 2,4,6-trimethylbenzaldehyde in the synthesis of Compound (5) was replaced by 4-(N,N-diphenylamino)benzaldehyde.

Comparative Compound (1) is Compound 5 of JP3442777B.

(Preparation of Fluorescent Latex Dispersion Liquid)

Fluorescent latex particles were prepared. As the latex particles, particles having an average particle diameter of 150 nm prepared by polymerization in a state that a 9/1 (mass ratio) mixture of styrene and acrylic acid was dispersed in water were used. The average particle diameter was measured by a dynamic light scattering method. THF (5 mL) was added dropwise to the above-prepared latex dispersion liquid having a solid content of 2% (25 mL, 500 mg in terms of solids), followed by stirring for 10 minutes. A THF solution (2.5 mL) of the test compound (any one of Compound (1), Compound (2), Compound (3), Compound (4), Compound (5), Compound (6), Compound (7), Compound (8), Compound (9), Compound (10), Compound (11), Compound (12) or Comparative Compound (1)) was added dropwise thereto over 15 minutes. The amounts of the compounds used for each sample are summarized in Table 1. The amount of the compound in Table 1 in terms of μmol/g represents the number of moles of the compound used relative to 1 g of the solids in the latex. Completion of the dropwise addition of the test compound was followed by stirring for 30 minutes and concentration under reduced pressure to remove THF. Thereafter, the particles were precipitated by centrifugation, followed by addition of ultrapure water, and then dispersed again to produce a fluorescent latex dispersion liquid having a solid content concentration of 2%.

(Evaluation of Fluorescent Latex Dispersion Liquid)

The emission maximum wavelength and the quantum yield of the above-prepared fluorescent latex dispersion liquid having a solid content concentration of 2% by mass were evaluated. A latex dispersion liquid diluted 200-fold with ultrapure water was used. Evaluation was carried out using a fluorescence spectrophotometer RF-5300 PC (manufactured by Shimadzu Corporation) for the measurement of the emission maximum wavelength and the relative fluorescence intensity, and using an absolute PL quantum yield measuring apparatus C9920-02 (manufactured by Hamamatsu Photonics K.K.) for the measurement of the quantum yield. The results evaluated according to the following standards are summarized in Table 1, Table 2, and Table 3. The relative fluorescence intensity indicates the ratio of the fluorescence intensities at the emission maximum wavelength.

The evaluation standards for the emission maximum wavelength are shown below.

S: 720 nm or longer
A: 700 nm or longer and shorter than 720 nm
B: 680 nm or longer and shorter than 700 nm
C: 650 nm or longer and shorter than 680 nm
D: Shorter than 650 nm The evaluation standards for the quantum yield are shown below.

SS: 0.7 or more
SA: 0.6 or more and less than 0.7
S: 0.5 or more and less than 0.6
A: 0.4 or more and less than 0.5
B: 0.25 or more and less than 0.4
C: Less than 0.25

TABLE 1

|  | Compound | Amount of compound (μmol/g) | Emission maximum wavelength | Quantum yield | Remarks |
| --- | --- | --- | --- | --- | --- |
| Example 1 | Compound (1) | 6 | B | S | Present invention |
| Example 2 | Compound (1) | 12 | B | S | Present invention |
| Example 3 | Compound (2) | 12 | A | A | Present invention |
| Example 4 | Compound (3) | 12 | A | A | Present invention |
| Example 5 | Compound (4) | 6 | A | A | Present invention |
| Example 6 | Compound (5) | 6 | A | SS | Present invention |
| Example 7 | Compound (5) | 12 | A | SS | Present invention |
| Example 8 | Compound (6) | 6 | A | A | Present invention |
| Example 9 | Compound (6) | 12 | A | A | Present invention |
| Example 10 | Compound (7) | 6 | S | B | Present invention |
| Example 11 | Compound (8) | 6 | S | B | Present invention |
| Comparative Example 1 | Comparative Compound (1) | 6 | B | C | Comparative Example |
| Comparative Example 2 | Comparative Compound (1) | 12 | B | C | Comparative Example |

TABLE 2

| | Compound | Amount of compound (µmol/g) | Emission maximum wavelength | Quantum yield | Remarks |
|---|---|---|---|---|---|
| Example 12 | Compound (9) | 6 | B | S | Present invention |
| Example 13 | Compound (9) | 12 | B | A | Present invention |
| Example 14 | Compound (10) | 6 | C | SS | Present invention |
| Example 15 | Compound (10) | 12 | C | SA | Present invention |
| Example 16 | Compound (11) | 6 | S | B | Present invention |
| Example 17 | Compound (11) | 12 | S | B | Present invention |
| Example 18 | Compound (12) | 6 | S | B | Present invention |
| Example 19 | Compound (12) | 12 | S | B | Present invention |
| Example 34 | Compound (13) | 6 | S | B | Present invention |
| Example 35 | Compound (13) | 12 | S | B | Present invention |
| Example 36 | Compound (14) | 6 | S | B | Present invention |
| Example 37 | Compound (14) | 12 | S | B | Present invention |

TABLE 3

| | Compound | Amount of compound (µmol/g) | Emission maximum wavelength | Relative fluorescence intensity |
|---|---|---|---|---|
| Example 20 | Compound (5) | 12 | A | - (standard) |
| Example 21 | Compound (5) | 24 | A | 2-fold as compared to Example 20 |
| Example 22 | Compound (5) | 48 | A | 4-fold as compared to Example 20 |
| Example 23 | Compound (5) | 100 | A | 6-fold as compared to Example 20 |
| Example 24 | Compound (6) | 12 | A | - (standard) |
| Example 25 | Compound (6) | 100 | A | 1.5-fold as compared to Example 24 |
| Example 26 | Compound (9) | 12 | B | - (standard) |
| Example 27 | Compound (9) | 24 | B | 1.5-fold as compared to Example 26 |
| Example 28 | Compound (9) | 48 | B | 2-fold as compared to Example 26 |
| Example 29 | Compound (10) | 12 | C | - (standard) |
| Example 30 | Compound (10) | 24 | C | 2-fold as compared to Example 29 |
| Example 31 | Compound (10) | 48 | C | 4-fold as compared to Example 29 |

Fluorescent latex particles were prepared using particles having an average particle diameter of 100 nm. As the latex particles, particles having an average particle diameter of 100 nm prepared by polymerization in a state where a 9/1 (mass ratio) mixture of styrene and acrylic acid and sodium dodecyl sulfate were dispersed in water were used. The average particle diameter was measured by a dynamic light scattering method. Fluorescent latex particles were prepared in the same manner as in the method for preparing fluorescent latex particles used in Examples 1 to 12, for the above-prepared latex dispersion liquid having a solid content of 2% (25 mL, 500 mg in terms of solids). The same measurements as those in Examples 1 to 12 were carried out and the evaluation was carried out according to the same standards. The results are shown in Table 4.

TABLE 4

| | Compound | Amount of compound (µmol/g) | Emission maximum wavelength | Quantum yield |
|---|---|---|---|---|
| Example 32 | Compound (5) | 12 | A | SA |
| Example 33 | Compound (5) | 24 | A | S |

It was found that Compounds (1) to (12) of the present invention have an emission maximum wavelength in a long wavelength range and exhibit a high quantum yield in the particles, as compared with Comparative Compound (1).

What is claimed is:

1. A compound represented by Formula (3):

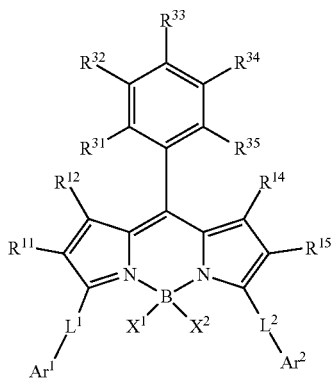

(3)

in the formula, $R^{11}$ and $R^{15}$ each independently represent an aryl group which may have a substituent; $R^{12}$ and $R^{14}$ each independently represent a hydrogen atom, a halogen atom, an alkyl group, an aryl group, a heterocyclic group, an ethenyl group, an ethynyl group, an amino group, an acyl group, an alkoxy group, an aryloxy group, an alkylthio group, or an arylthio group, each of which may have a substituent; $X^1$ and $X^2$ each independently represent a halogen atom, an alkyl group, an aryl group, a heterocyclic group, a hydroxy group, an alkoxy group, an aryloxy group, an alkylthio group, an arylthio group, an ethenyl group, or an ethynyl group, each of which may have a substituent, and $X^1$ and $X^2$ may be bonded to each other to form a ring; $Ar^1$ and $Ar^2$ each independently represent an aryl group or a heterocyclic group, each of which may have a substituent; $R^{31}$, $R^{32}$, $R^{34}$ and $R^{35}$ each represent a fluorine atom, and $R^{33}$ represents a hydrogen atom or a fluorine atom; and $L^1$ and $L^2$ each represent Formula (L-1):

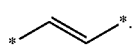

Formula (L-1)

2. A compound represented by Formula (6):

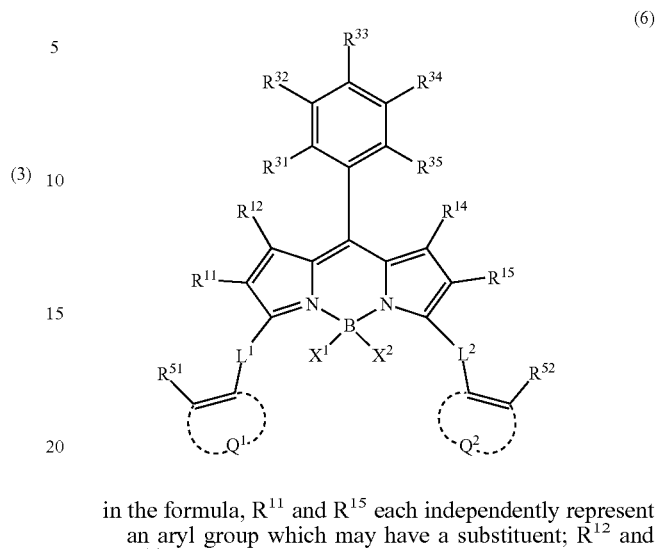

(6)

in the formula, $R^{11}$ and $R^{15}$ each independently represent an aryl group which may have a substituent; $R^{12}$ and $R^{14}$ each independently represent a hydrogen atom, a halogen atom, an alkyl group, an aryl group, a heterocyclic group, an ethenyl group, an ethynyl group, an amino group, an acyl group, an alkoxy group, an aryloxy group, an alkylthio group, or an arylthio group, each of which may have a substituent; $X^1$ and $X^2$ each independently represent a halogen atom, an alkyl group, an aryl group, a heterocyclic group, a hydroxy group, an alkoxy group, an aryloxy group, an alkylthio group, an arylthio group, an ethenyl group, or an ethynyl group, each of which may have a substituent, and $X^1$ and $X^2$ may be bonded to each other to form a ring; $R^{31}$ to $R^{35}$ each independently represent a hydrogen atom, a halogen atom, an alkyl group, an aryl group, a heterocyclic group, an ethenyl group, an ethynyl group, an amino group, an acyl group, a cyano group, an alkoxy group, an aryloxy group, an alkylthio group, or an arylthio group, each of which may have a substituent, and any one of $R^{31}$, $R^{32}$, $R^{33}$, $R^{34}$ or $R^{35}$ is a hydrogen atom; $R^{51}$ and $R^{52}$ each independently represent an alkyl group, an aryl group, a heteroaryl group, an amino group, an acyl group, an alkoxy group, an aryloxy group, an alkylthio group, or an arylthio group, each of which may have a substituent; $Q^1$ and $Q^2$ each independently represent an aromatic hydrocarbon ring or an aromatic heterocyclic ring, each of which may have a substituent; and $L^1$ and $L^2$ each represent Formula (L-1):

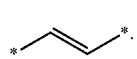

Formula (L-1)

* * * * *